(12) United States Patent
Katsumata et al.

(10) Patent No.: US 10,735,641 B2
(45) Date of Patent: Aug. 4, 2020

(54) IN-VEHICLE DISPLAY CONTROL DEVICE, IN-VEHICLE DISPLAY SYSTEM, IN-VEHICLE DISPLAY CONTROL METHOD, AND PROGRAM

(71) Applicant: JVC KENWOOD Corporation, Yokohama-shi, Kanagawa (JP)

(72) Inventors: Noboru Katsumata, Yokohama (JP); Hideaki Okamura, Yokohama (JP); Izumi Saeki, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 112 days.

(21) Appl. No.: 15/967,713

(22) Filed: May 1, 2018

(65) Prior Publication Data

US 2018/0249066 A1 Aug. 30, 2018

Related U.S. Application Data

(63) Continuation of application No. PCT/JP2017/009105, filed on Mar. 7, 2017.

(30) Foreign Application Priority Data

Apr. 27, 2016 (JP) .................................. 2016-089784
Apr. 28, 2016 (JP) .................................. 2016-090269
Jun. 21, 2016 (JP) .................................. 2016-122658

(51) Int. Cl.
*H04N 5/232* (2006.01)
*B60R 1/00* (2006.01)
(Continued)

(52) U.S. Cl.
CPC ........... *H04N 5/23212* (2013.01); *B60R 1/00* (2013.01); *G06K 9/00744* (2013.01);
(Continued)

(58) Field of Classification Search
None
See application file for complete search history.

(56) References Cited

U.S. PATENT DOCUMENTS

2003/0122930 A1* 7/2003 Schofield .................. B60R 1/00
348/148
2011/0043634 A1* 2/2011 Stegmann ................. B60R 1/00
348/148
(Continued)

FOREIGN PATENT DOCUMENTS

JP 2012-170127 9/2012
WO 2014-129026 8/2014

OTHER PUBLICATIONS

International Search Report and Written Opinion for International Patent Application No. PCT/JP20171009105 dated May 30, 2017, 8 pages.

*Primary Examiner* — Michael J Hess
(74) *Attorney, Agent, or Firm* — Amin, Turocy & Watson LLP

(57) ABSTRACT

An in-vehicle display control device includes a display video data generating unit 31 that obtains captured video data from a rear camera 2 used in capturing the rearward portion of a vehicle, and generates display video data to be displayed in a rearview monitor 3 meant for displaying rearward videos of the vehicle; a range setting unit 35 that sets a first-type range and a second type range with respect to the display video data, the second-type range being placed on either side of the first-type range and positioned in each side portion of the display video data; a video processing unit 36 that, with respect to the video data in the second-type range set by the range setting unit 35, performs an information volume reduction operation for reducing the volume of information to be provided to the driver; and a display control unit 40.

17 Claims, 41 Drawing Sheets

(51) Int. Cl.
*H04N 7/18* (2006.01)
*G06K 9/00* (2006.01)

(52) U.S. Cl.
CPC ..... *G06K 9/00805* (2013.01); *G06K 9/00825* (2013.01); *H04N 5/23296* (2013.01); *H04N 7/18* (2013.01); *H04N 7/183* (2013.01); *B60R 2300/30* (2013.01); *B60R 2300/8046* (2013.01); *B60R 2300/8066* (2013.01); *G06K 2209/23* (2013.01)

(56) References Cited

U.S. PATENT DOCUMENTS

| | | | |
|---|---|---|---|
| 2015/0302259 A1 | 10/2015 | Oshida et al. | |
| 2017/0001578 A1* | 1/2017 | Buschmann | B60R 11/04 |
| 2017/0129405 A1* | 5/2017 | Oba | B60R 1/00 |
| 2017/0274827 A1* | 9/2017 | Lewis | G08G 1/167 |

* cited by examiner

FIG.46

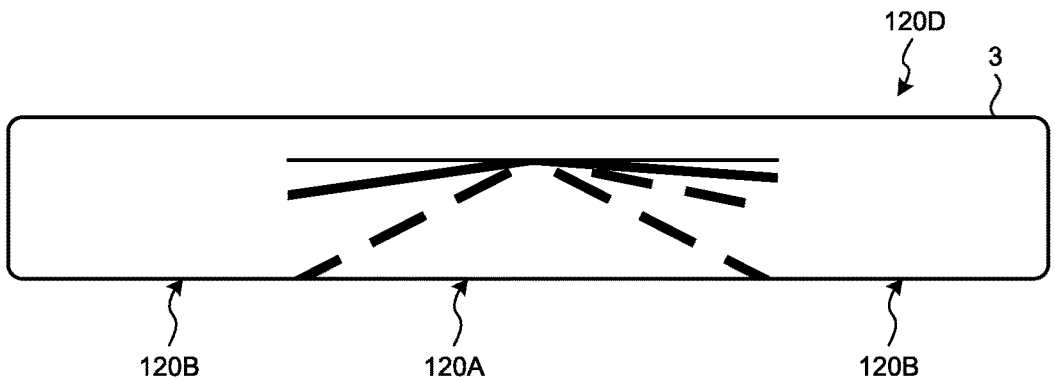

FIG.47

| | INFORMATION VOLUME REDUCTION OPERATION WITH RESPECT TO SECOND-TYPE RANGES | | |
|---|---|---|---|
| RECOGNIZED-VEHICLE COUNT IN DISPLAY VIDEO DATA (SECOND-TYPE RANGES) | PATTERN EXAMPLE 1 | PATTERN EXAMPLE 2 | PATTERN EXAMPLE 3 |
| ZERO | TO PERFORM | LARGE REDUCTION DEGREE | TO NOT DISPLAY |
| ONE OR MORE BUT LESS THAN THREE | | MODERATE REDUCTION DEGREE | TO PERFORM |
| THREE OR MORE | TO NOT PERFORM | TO NOT PERFORM | TO NOT PERFORM |

FIG.51

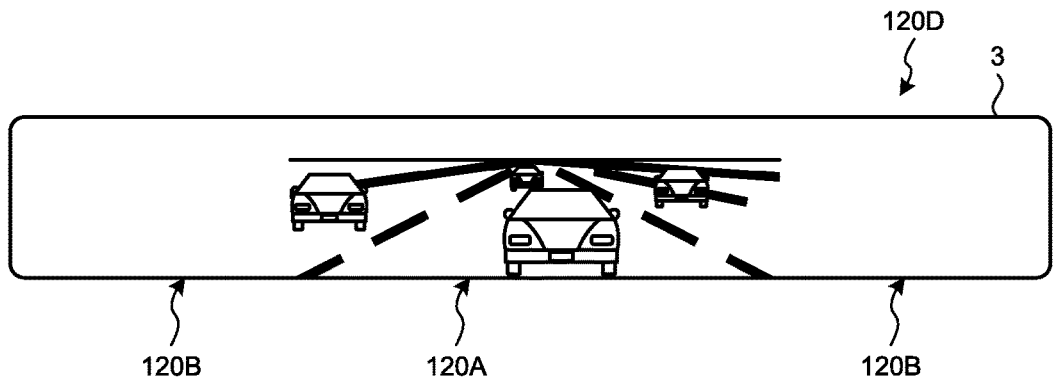

FIG.52

| | INFORMATION VOLUME REDUCTION OPERATION WITH RESPECT TO SECOND-TYPE RANGES | | |
|---|---|---|---|
| RECOGNIZED-VEHICLE COUNT IN DISPLAY VIDEO DATA (EITHER LEFT-SIDE SECOND-TYPE RANGE OR RIGHT-SIDE SECOND-TYPE RANGE) | PATTERN EXAMPLE 1 | PATTERN EXAMPLE 2 | PATTERN EXAMPLE 3 |
| ZERO | TO PERFORM | LARGE REDUCTION DEGREE | TO NOT DISPLAY |
| ONE OR MORE BUT LESS THAN THREE | | MODERATE REDUCTION DEGREE | TO PERFORM |
| THREE OR MORE | TO NOT PERFORM | TO NOT PERFORM | TO NOT PERFORM |

FIG.59

| | RANGE FOR PERFORMING INFORMATION VOLUME REDUCTION OPERATION WITH RESPECT TO SECOND-TYPE RANGES 22A | |
|---|---|---|
| RECOGNIZED-VEHICLE COUNT IN DISPLAY VIDEO DATA (FIRST-TYPE RANGE) | PATTERN EXAMPLE 1 | PATTERN EXAMPLE 2 |
| ZERO | NO CHANGE | NO CHANGE |
| ONE OR MORE BUT LESS THAN FIVE | | MODERATE NARROWING DEGREE |
| FIVE OR MORE | MODERATE NARROWING DEGREE | LARGE NARROWING DEGREE |

IN-VEHICLE DISPLAY CONTROL DEVICE, IN-VEHICLE DISPLAY SYSTEM, IN-VEHICLE DISPLAY CONTROL METHOD, AND PROGRAM

CROSS-REFERENCE TO RELATED APPLICATION(S)

This application is a continuation of International Application No. PCT/JP2017/009105, filed on Mar. 7, 2017 which claims the benefit of priority of the prior Japanese Patent Application No. 2016-089784, filed on Apr. 27, 2016, Japanese Patent Application No. 2016-090269, filed on Apr. 28, 2016 and Japanese Patent Application No. 2016-122658, filed on Jun. 21, 2016, the entire contents of which are incorporated herein by reference.

BACKGROUND

The present disclosure relates to an in-vehicle display control device, an in-vehicle display system, an in-vehicle display control method, and a program.

Instead of using a conventional optical rearview mirror, a technology is known in which the rearward surrounding area of a vehicle is captured using a rear camera and the images are displayed in a rearview monitor (for example, see Japanese Laid-open Patent Publication No. 2012-170127 A).

A rear camera is capable of taking images over a wider range than the range appearing in a rearview mirror. If a wider range than the range appearing in a rearview mirror is displayed in a rearview monitor, then the volume of information about the surrounding situation of the vehicle as obtained by the driver from the rearview monitor happens to increase as compared to the volume of information obtained from a rearview mirror. Meanwhile, while driving a vehicle, the driver can properly recognize only a limited volume of information. Hence, if an excessive volume of information is obtained, then it may become difficult for the driver to properly recognize the obtained information and the period of focusing on the rearview monitor may be longer because it takes time for recognizing the information. In that regard, there may be a demand for displaying an appropriate volume of information that is properly recognizable for the driver.

The present disclosure has been made in view of the issues mentioned above, and it is an object to display an appropriate volume of information for the driver.

SUMMARY

It is an object of the present disclosure to at least partially solve the problems in the conventional technology.

An in-vehicle display control device according to one aspect includes a display video data generating unit that obtains captured video data from a rear camera used in capturing rearward portion of a vehicle, and generates display video data to be displayed in a display device meant for displaying rearward video of the vehicle, a range setting unit that sets a first-type range and a second-type range with respect to the display video data, the second-type range being placed on either side of the first-type range and positioned in each side portion of the display video data, a video processing unit that, with respect to video data in the second-type range set by the range setting unit, performs an information volume reduction operation for reducing volume of information to be provided to driver, and a display control unit that causes the display device to display the display video data containing the second-type range which has been subjected to the information volume reduction operation.

An in-vehicle display system according to one aspect includes the in-vehicle display control device described above, and at least either the display device having a display width in which at least either the first-type range or the second-type range is displayable, or the rear camera.

An in-vehicle display control method according to one aspect includes a display video data generation step that includes obtaining captured video data from a rear camera used in capturing rearward portion of a vehicle, and generating display video data to be displayed in a display device meant for displaying rearward video of the vehicle, a video processing step that includes performing an information volume reduction operation with respect to video data in a second-type range which is placed on either side of a first-type range of the display video data and which is positioned in each side portion of the display video data, the information volume reduction operation being for reducing volume of information to be provided to driver, and a display control step that causes the display device to display the display video data containing the second-type range which has been subjected to the information volume reduction operation.

A non-transitory computer readable recording medium storing therein a program according to one aspect that causes a computer operating as an in-vehicle display control device, to execute, a display video data generation step that includes obtaining captured video data from a rear camera used in capturing rearward portion of a vehicle, and generating display video data to be displayed in a display device meant for displaying rearward video of the vehicle, a video processing step that includes performing an information volume reduction operation with respect to video data in a second-type range which is placed on either side of a first-type range of the display video data and which is positioned in each side portion of the display video data, the information volume reduction operation being for reducing volume of information to be provided to driver, and a display control step that causes the display device to display the display video data containing the second-type range which has been subjected to the information volume reduction operation.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 46 is a diagram illustrating an example of the video displayed in the rearview monitor of the in-vehicle display system according to the eighth embodiment;

FIG. 47 is a diagram illustrating an example of an operation definition table in the in-vehicle display system according to a ninth embodiment;

FIG. 51 is a diagram illustrating another example of the video displayed in the rearview monitor of the in-vehicle display system according to the ninth embodiment;

FIG. 52 is a diagram illustrating an example of an operation definition table in the in-vehicle display system according to a 10-th embodiment;

FIG. 59 is a diagram illustrating an example of a range definition table in the in-vehicle display system according to a 12-th embodiment;

DETAILED DESCRIPTION

Preferred embodiments of an in-vehicle display control device 10, an in-vehicle display system 1, an in-vehicle display control method, and a program according to the present disclosure are described below in detail with reference to the accompanying drawings. However, the present disclosure is not limited to the embodiments described below.

First Embodiment

Figure 1:
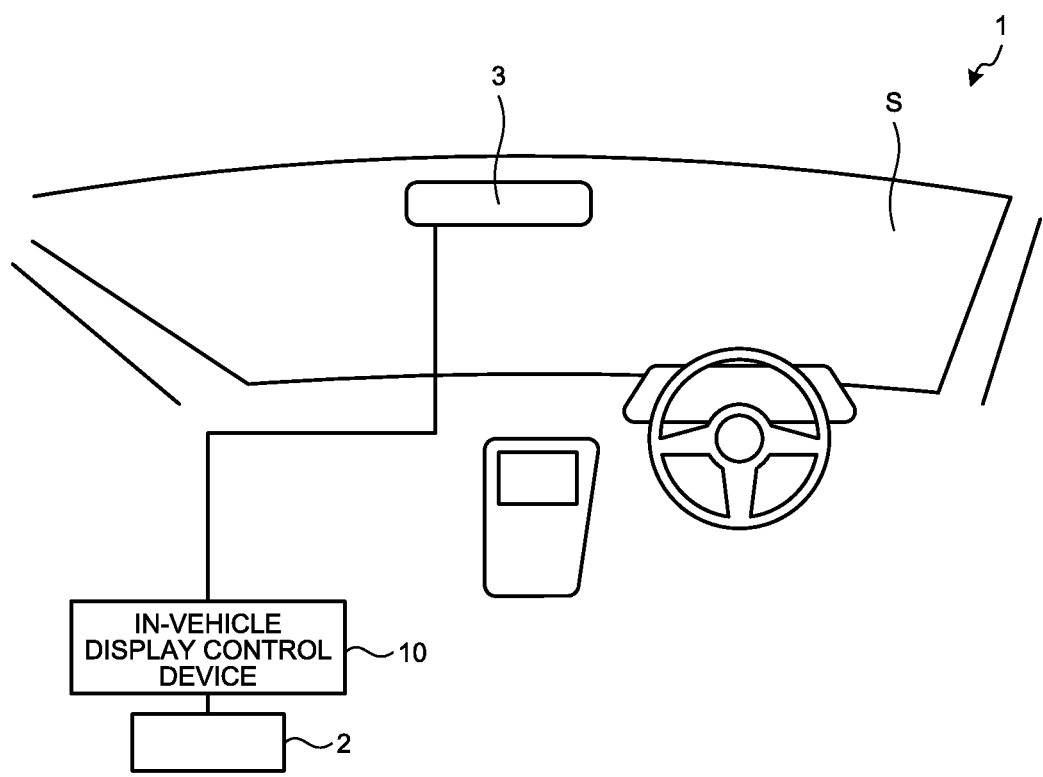
FIG. 1 is a schematic diagram illustrating an exemplary configuration of an in-vehicle display system according to a first embodiment.
Figure 2:
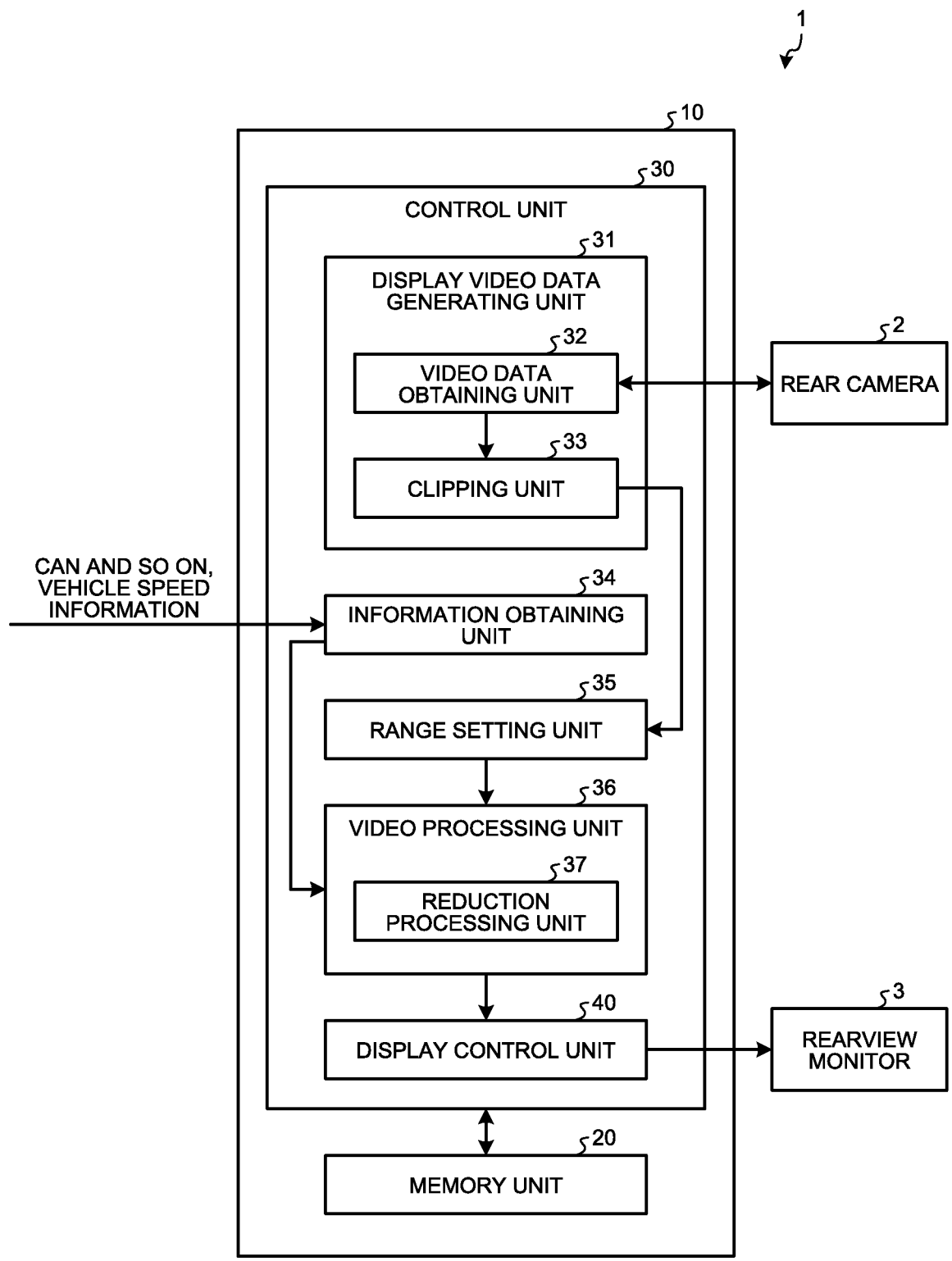
FIG. 2 is a block diagram illustrating an exemplary configuration of the in-vehicle display system according to the first embodiment.

The in-vehicle display system 1 is installed in a vehicle and displays videos in which the rearward portion of the vehicle is captured. FIG. 1 is a schematic diagram illustrating an exemplary configuration of the in-vehicle display system according to a first embodiment. FIG. 2 is a block diagram illustrating an exemplary configuration of the in-vehicle display system according to the first embodiment. The rearward portion of a vehicle includes the posterior portion with reference to the direction of travel and the lateral posterior portions with reference to the vehicle width direction. In the first embodiment, although the explanation is given about the posterior portion, the first embodiment is also applicable to the lateral posterior portions.

As illustrated in FIGS. 1 and 2, the in-vehicle display system 1 includes a rear camera 2, a rearview monitor 3, and the in-vehicle display control device 10.

Figure 3:
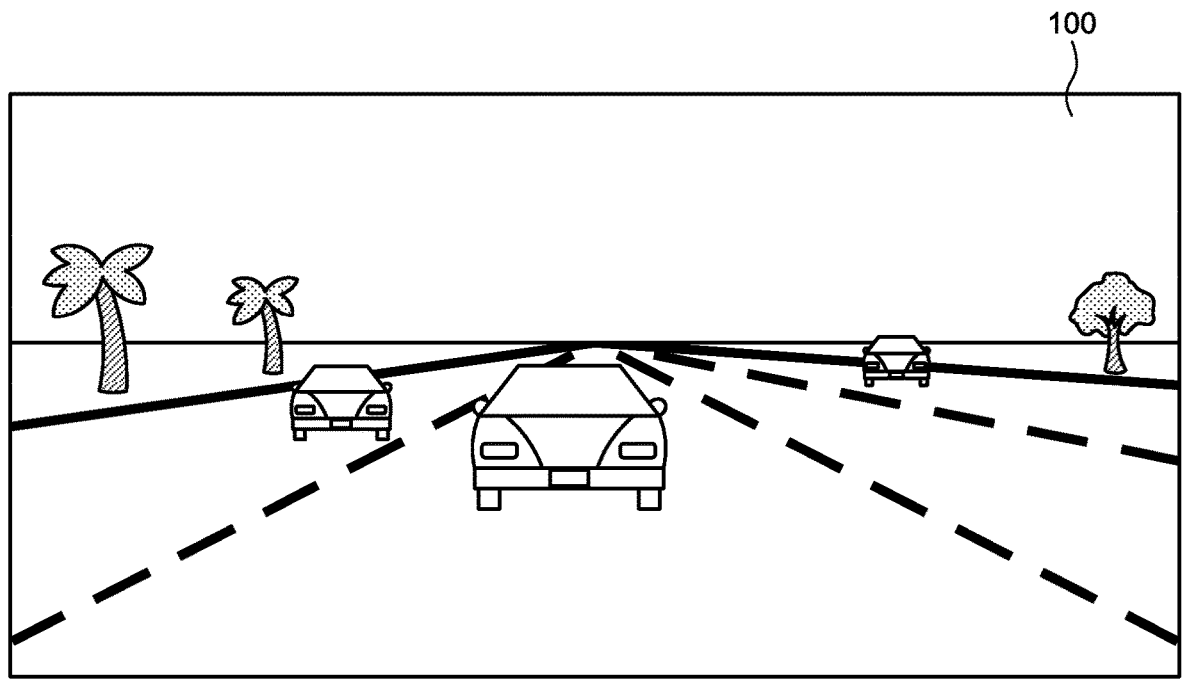
FIG. 3 is a diagram illustrating an example of video data captured by a rear camera of the in-vehicle display system according to the first embodiment.
Figure 4:
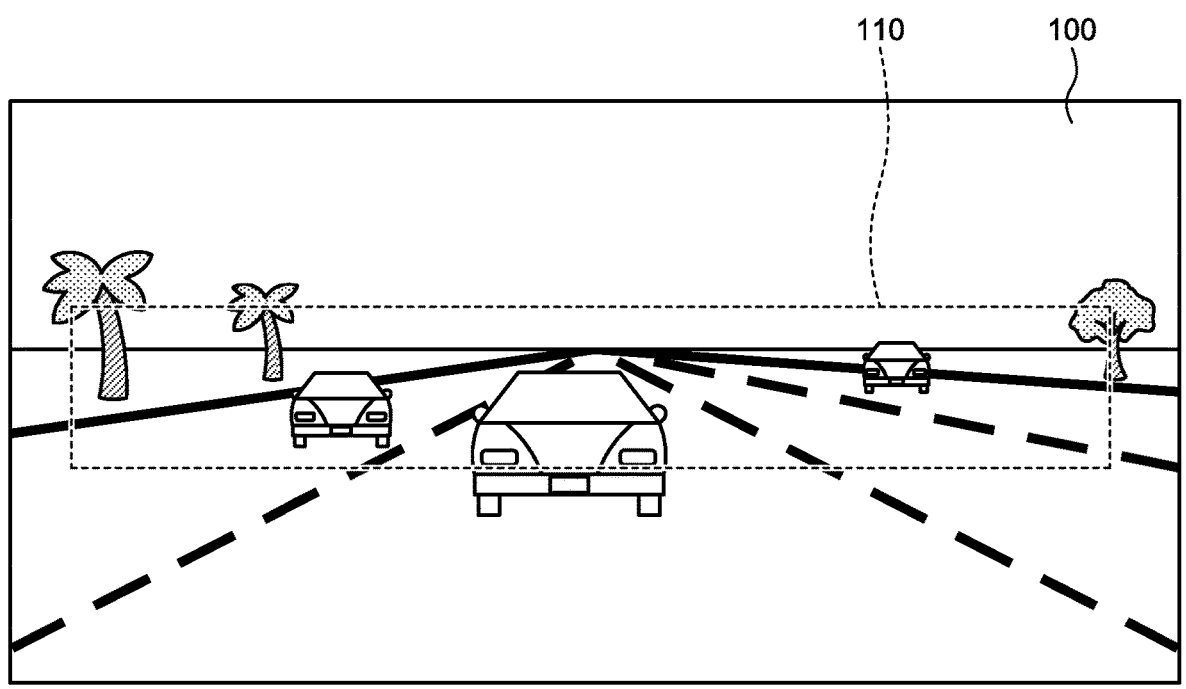
FIG. 4 is a diagram illustrating an example of the video data captured by the rear camera and an example of the video displayed in a rearview monitor of the in-vehicle display system according to the first embodiment.

The rear camera 2 is positioned in the backside of the vehicle for capturing the rearward portion. FIG. 3 is a diagram illustrating an example of video data captured by the rear camera of the in-vehicle display system according to the first embodiment. FIG. 4 is a diagram illustrating an example of the video data captured by the rear camera and an example of the video displayed in the rearview monitor of the in-vehicle display system according to the first embodiment. As illustrated in FIGS. 3 and 4, the rear camera 2 captures a range including a range for confirmation in the rearview monitor 3. In other words, the rear camera 2 captures a range including a range not displayed in the rearview monitor 3. The rear camera 2 has the horizontal angle of view in the range of, for example, 90° to 180° and has the vertical angle of view in the range of, for example, 45° to 90°. Thus, the rear camera 2 is capable of capturing videos over a wider range than the range displayed in the rearview monitor 3. In that regard, a clipping unit 33 in a control unit 30 of the in-vehicle display control device 10 clips, from the video captured by the rear camera 2, a range enabling the driver to properly recognize the rearward portion of the vehicle using the rearview monitor 3; and displays the clipped range in the rearview monitor 3. Herein, the rear camera 2 outputs captured video data 100 to a video data obtaining unit 32 of the control unit 30 of the in-vehicle display control device 10.

The rearview monitor 3 is an electronic rearview mirror as an example. When an electronic rearview mirror is used as the rearview monitor 3, it does not matter whether or not a half mirror meant for confirming the rearward portion using optical reflection is installed. The rearview monitor 3 is a display including, for example, a liquid crystal display (LCD) or an organic EL (Organic Electro-Luminescence) display.

Figure 5:
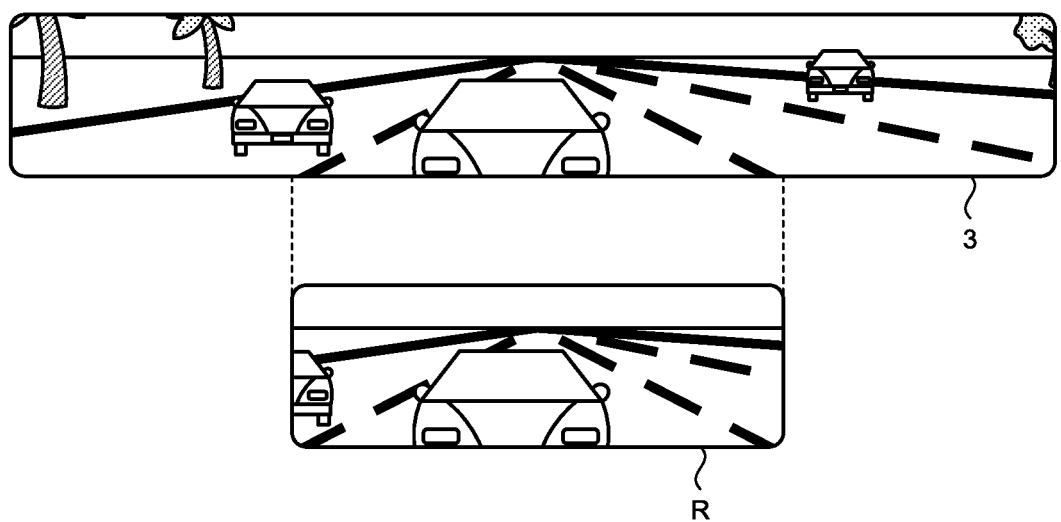
FIG. 5 is a schematic diagram for explaining the comparison between the rearview monitor of the in-vehicle display system according to the first embodiment and a conventional optical rearview mirror.

Explained below with reference to FIG. 5 is the comparison between the rearview monitor 3 and a conventional optical rearview mirror R. FIG. 5 is a schematic diagram for explaining the comparison between the rearview monitor of the in-vehicle display system according to the first embodiment and a conventional optical rearview mirror. The rearview monitor 3 has a greater width in the vehicle width direction as compared to the conventional optical rearview mirror R. In the first embodiment, for example, the rearview monitor 3 has the width of 400 mm in the vehicle width direction and the width of 50 mm in the height direction. In contrast, the conventional optical rearview mirror R has, for example, the width of 200 mm in the vehicle width direction and the width of 50 mm in the height direction.

Figure 6:
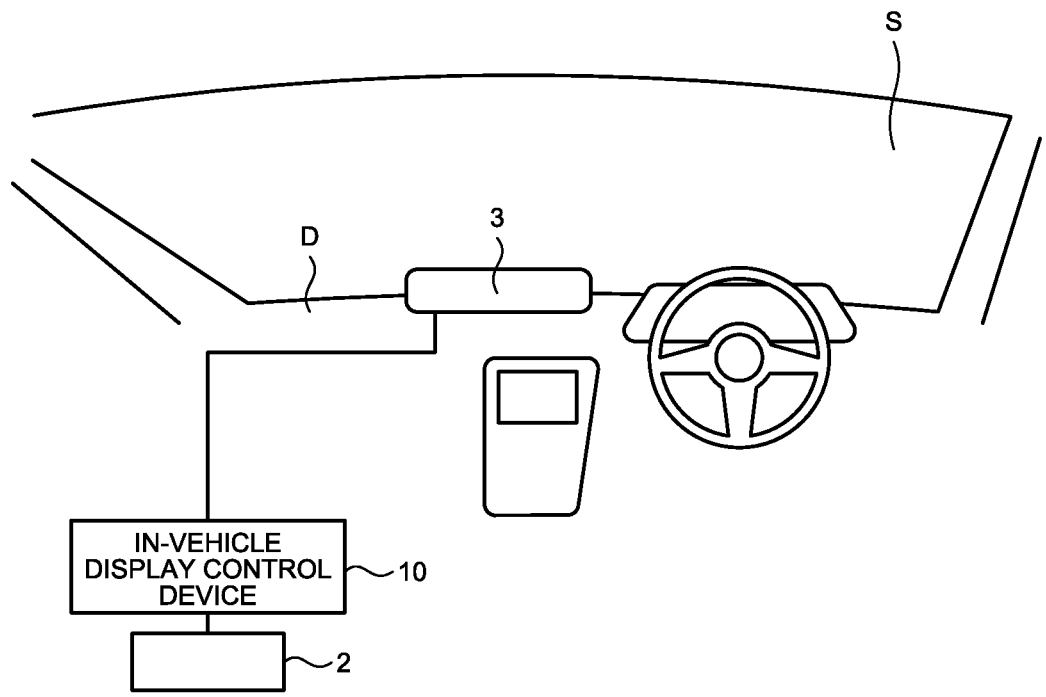
FIG. 6 is a schematic diagram illustrating another exemplary configuration of the in-vehicle display system according to the first embodiment.

The rearview monitor 3 is installed at an easily-viewable position for the driver. In the first embodiment, as illustrated in FIG. 1, the rearview monitor 3 is positioned in the upper part of the center in the vehicle width direction of a windshield S. Alternatively, as illustrated in FIG. 6, the rearview monitor 3 can be positioned in the upper part of the center in the vehicle width direction of a dashboard D. FIG. 6 is a schematic diagram illustrating another exemplary configuration of the in-vehicle display system according to the first embodiment.

Figure 7:
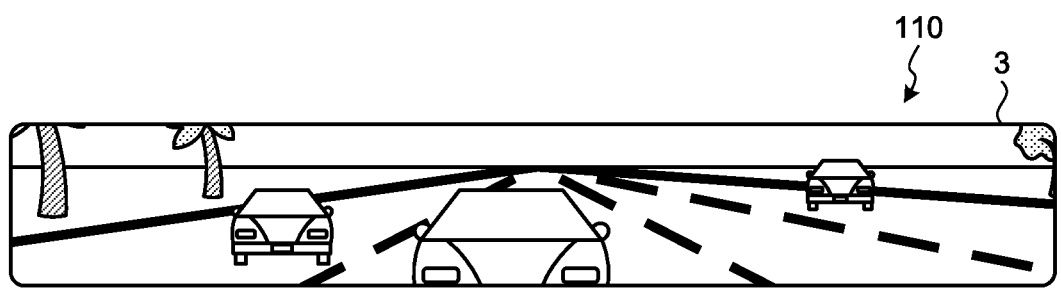
FIG. 7 is a diagram illustrating an example of the video displayed in the rearview monitor of the in-vehicle display system according to the first embodiment.

The rearview monitor 3 displays rearward videos of the vehicle based on video signals output from a display control unit 40 of the control unit 30 of the in-vehicle display control device 10. More particularly, the rearview monitor 3 displays a rearward video as illustrated in FIG. 7. Herein, FIG. 7 is a diagram illustrating an example of the video displayed in the rearview monitor of the in-vehicle display system according to the first embodiment. In the captured video data 100 illustrated in FIG. 7, captured objects such as trailing vehicles, the road, and roadside trees are captured.

Returning to the explanation with reference to FIG. 2, the in-vehicle display control device 10 includes a memory unit 20 and the control unit 30.

The memory unit 20 is used to store the data required in various operations performed in the in-vehicle display control device 10, and to store various processing results. Examples of the memory unit 20 include a semiconductor memory device such as a RAM (Random Access Memory), a ROM (Read Only Memory), or a flash memory; a hard disk; an optical disk; and an external memory device connected via a network. Alternatively, the memory unit 20 can be an external memory device that is wirelessly connected via a communication device (not illustrated).

Examples of the control unit 30 include an arithmetic processing unit configured with a CPU (Central Processing Unit). The control unit 30 includes a display video data generating unit 31, an information obtaining unit 34, a range setting unit 35, a video processing unit 36, and the display control unit 40. The control unit 30 executes the instructions written in a program that is stored in the memory unit 20.

The display video data generating unit 31 obtains the captured video data 100 from the rear camera 2, and generates display video data 110 to be displayed in the rearview monitor 3. The display video data generating unit 31 includes the video data obtaining unit 32 and the clipping unit 33.

The video data obtaining unit 32 obtains the video capturing the rearward portion of the vehicle. The captured video data 100 that is obtained by the video data obtaining unit 32 represents, for example, data of a video in which images having 60 frames per second are successively captured. In the first embodiment, the video data obtaining unit 32 obtains the captured video data 100 that is output by the rear camera 2. The video data obtaining unit 32 then outputs the captured video data 100 to the clipping unit 33.

The clipping unit 33 clips, from the captured video data 100, the range to be displayed in the rearview monitor 3. The range to be clipped from the captured video data 100 as the range to be displayed in the rearview monitor 3 is stored in advance in the memory unit 20. In the first embodiment, the clipping unit 33 clips, as the display video data 110, the central part of the captured video data 100 as enclosed by dashed lines illustrated in FIG. 4. The clipping unit 33 then outputs the clipped display video data 110 to the range setting unit 35.

The information obtaining unit 34 obtains vehicle speed information, which is meant for determining the speed of the vehicle, from an ECU (Electronic Control Unit) or a CAN (Control Area Network). More particularly, the information obtaining unit 34 obtains vehicle speed signals. Then, the information obtaining unit 34 outputs the obtained information to the video processing unit 36.

Figure 8:
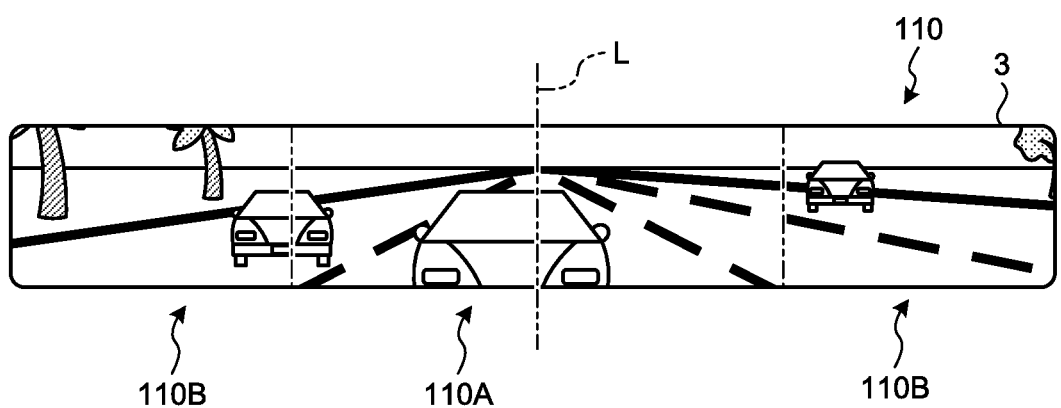
FIG. 8 is a diagram for explaining a first-type range and second-type ranges of the video displayed in the rearview monitor of the in-vehicle display system according to the first embodiment.

The range setting unit 35 sets, with respect to the display video data 110, a first-type range 110A and second-type ranges 110B that are placed on both sides of the first-type range 110A and are positioned in the side portions of the display video data 110. In the first embodiment, as illustrated in FIG. 8, the first-type range 110A is set as a range in which a center line L of the display video data 110 serves as the central axis line. FIG. 8 is a diagram for explaining the first-type range and the second-type ranges of the video displayed in the rearview monitor of the in-vehicle display system according to the first embodiment. In the first embodiment, the first-type range 110A has the width of 200 mm in the vehicle width direction. The second-type ranges 110B have the width of 100 mm in the vehicle width direction. The first-type range 110A represents the viewable range when the driver looks straight at the conventional optical rearview mirror R. The second-type ranges 110B are not viewable when the driver looks straight at the conventional optical rearview mirror R, and include the ranges that are viewable when the frame of reference is changed or when the viewing angle is adjusted as well as include the ranges that are further on the outer side. The range setting unit 35 outputs, to the video processing unit 36, the display video data 110 in which the first-type range 110A and the second-type ranges 110B are set.

The video processing unit 36 performs an information volume reduction operation with respect to the second-type ranges 110B of the display video data 110 so as to generate display video data 120 having a reduced volume of information, and outputs the display video data 120 to the display control unit 40. The display video data 120 contains a first-type range 120A not subjected to reduction in the volume of information, and contains second-type ranges 120B subjected to reduction in the volume of information.

Herein, the volume of information implies the volume of information about the surrounding situation of the vehicle as obtained by the driver from the video displayed in the rearview monitor 3. Greater the display dimensions of the video displayed in the rearview monitor 3, the greater becomes the volume of information. Moreover, greater the number of captured objects displayed in the rearview monitor 3, the greater becomes the volume of information. Furthermore, greater the number of colors included in the video displayed in the rearview monitor 3, the greater becomes the volume of information. Moreover, higher the brightness of the video displayed in the rearview monitor 3, the greater becomes the volume of information.

Meanwhile, it is known that, while driving a vehicle, the driver can properly recognize only a limited volume of information; and it is known that, greater the acceleration of the vehicle, the smaller becomes the volume of information that is properly recognizable by the driver and the narrower becomes the recognizable range. Moreover, greater the acceleration of the vehicle, the shorter becomes the period of time of viewing the rearview monitor 3. More specifically, greater the acceleration of the vehicle; as far as the range within which the driver can properly recognize the rearward portion is concerned, the range recognizable in the conventional optical rearview mirror R, that is, the first-type range 110A in the display video data 110 is the most suitable range. In other words, when the speed of the vehicle is slow, even if the volume of information increases as compared to the volume of information recognizable in the conventional optical rearview mirror R, the increased volume of information is properly recognizable.

In that regard, when the speed of the vehicle is equal to or higher than a predetermined speed, the video processing unit 36 generates the display video data 120 in which the volume of information of the second-type ranges 110B is reduced with the aim of narrowing down on the recognizable information that is required by the driver. More specifically, when the speed of the vehicle as obtained by the information obtaining unit 34 is equal to or higher than a predetermined speed, the video processing unit 36 performs an information volume reduction operation so as to generate the display video data 120 in which, for example, as illustrated in FIG.

Figure 9:
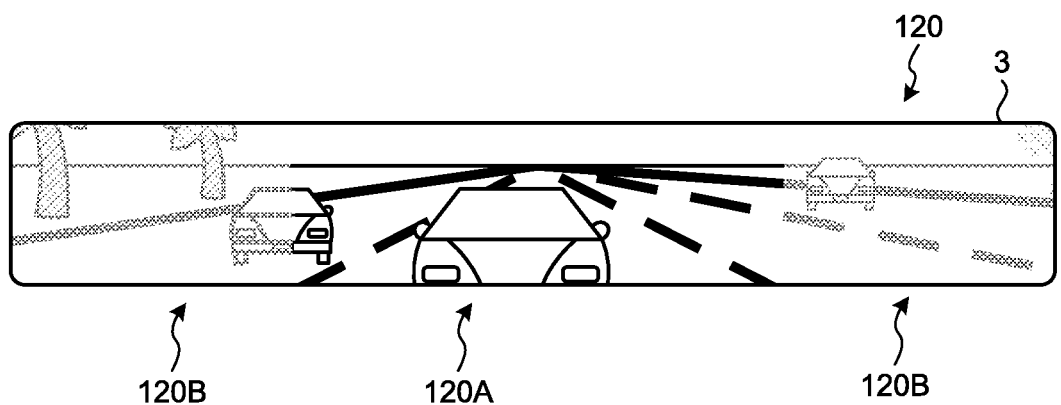
FIG. 9 is a diagram illustrating another example of the video displayed in the rearview monitor of the in-vehicle display system according to the first embodiment.

9, the volume of information of the second-type ranges 110B of the display video data 110 is reduced; and then outputs the display video data 120 to the display control unit 40. FIG. 9 is a diagram illustrating another example of the video displayed in the rearview monitor of the in-vehicle display system according to the first embodiment. The display video data 120 has the volume of information reduced to such an extent that the driver can recognize the presence or absence of the captured objects from the second-type ranges 120B.

Meanwhile, when the speed of the vehicle is lower than the predetermined speed, the video processing unit 36 outputs the display video data 110 to the display control unit 40. The video processing unit 36 includes a reduction processing unit 37.

The reduction processing unit 37 performs the information volume reduction operation that includes, for example, a color information reduction operation for reducing color information and a brightness reduction operation for reducing the brightness.

The color information reduction operation includes generating the display video data 120 by reducing the color information of the second-type ranges 110B of the display video data 110, and then outputting the display video data 120 to the display control unit 40. For example, in the color information reduction operation, the display video data 120 is generated by reducing the chromatic value of each of the RGB colors of the second-type ranges 110B of the display video data 110 by a predetermined amount or a predetermined ratio, and the display video data 120 is output to the display control unit 40. Alternatively, for example, in the color information reduction operation, the display video data 120 having simple colors or black and white colors is generated by reducing the chromatic value of each of the RGB colors of the second-type ranges 110B of the display video data 110 by a predetermined amount or a predetermined ratio, and the display video data 120 is output to the display control unit 40.

The brightness reduction operation includes generating the display video data 120 by reducing the brightness of the second-type ranges 110B of the display video data 110, and then outputting the display video data 120 to the display control unit 40. For example, in the brightness reduction operation, the display video data 120 is generated by reducing the luminosity of each pixel in the second-type ranges 110B of the display video data 110 by a predetermined amount or a predetermined ratio, and the display video data 120 is output to the display control unit 40. Alternatively, for example, in the brightness reduction operation, instead of generating the display video data 120, a control signal can be generated that is meant for setting the backlight of the rearview monitor 3 corresponding to the first-type range 110A to the normal brightness and meant for reducing the backlight of the rearview monitor 3 corresponding to the second-type ranges 110B by a predetermined amount or a predetermined ratio than the normal brightness, and the control signal can be output along with the display video data 110 to the display control unit 40.

The reduction processing unit 37 either can perform the color information reduction operation, or can perform the brightness reduction operation, or can perform the color information reduction operation and the brightness reduction operation in combination.

The display control unit 40 causes the rearview monitor 3 to display the display video data 110 or the display video data 120 as output from the video processing unit 36.

Figure 10:
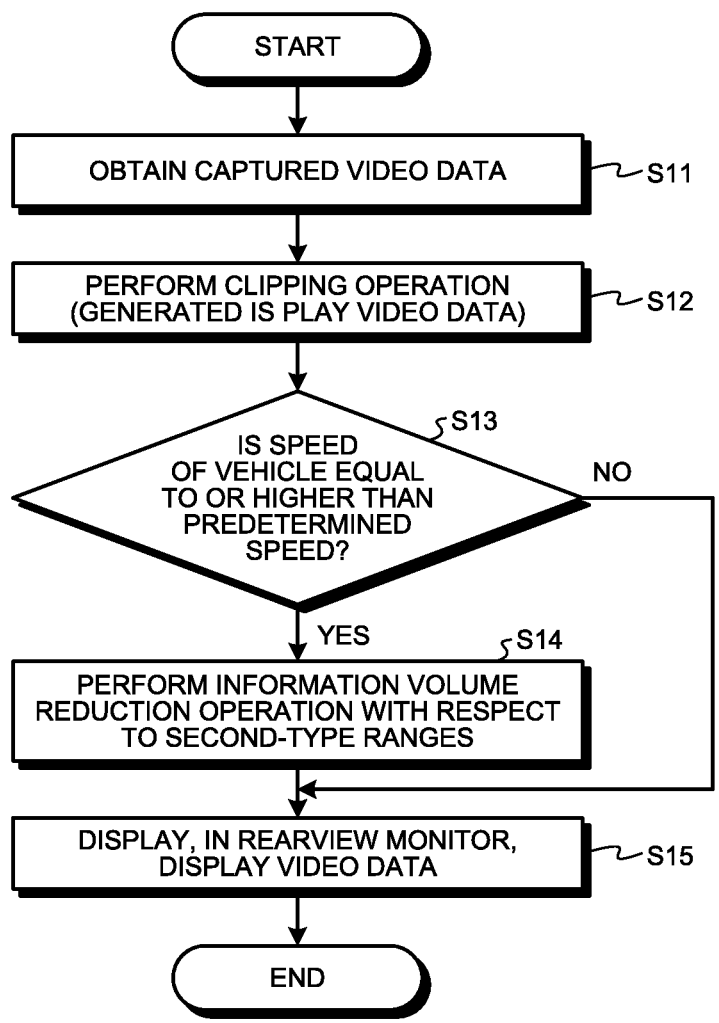
FIG. 10 is a flowchart for explaining a flow of operations performed in the in-vehicle display system according to the first embodiment.

Explained below with reference to FIG. 10 is a flow of operations performed by the control unit 30. FIG. 10 is a flowchart for explaining a flow of operations performed in the in-vehicle display system according to the first embodiment.

The video data obtaining unit 32 in the control unit 30 obtains the captured video data 100 (Step S11).

The clipping unit 33 in the control unit 30 performs a clipping operation (Step S12). More specifically, the clipping unit 33 in the control unit 30 clips, from the captured video data 100, the display video data 110 representing the range to be displayed in the rearview monitor 3.

The video processing unit 36 of the control unit 30 determines whether or not the speed of the vehicle is equal to or higher than a predetermined speed (Step S13). More specifically, in the control unit 30, based on the information obtained by the information obtaining unit 34, the video processing unit 36 determines whether or not the speed of the vehicle is equal to or higher than a predetermined speed. In the first embodiment, examples of the predetermined speed include 20 km/h and 40 km/h. It is desirable to set the predetermined speed to such a speed that the display not involving any reduction in the volume information of the second-type ranges 110B has the volume of information within the information volume range that enables the driver to properly recognize the rearward portion at the set speed. For example, when the driving speed is lower than 20 km/h or 40 km/h, the period of viewing the rearview monitor 3 is longer than in the case of driving at high speeds, and the information about the second-type ranges 110B is required more often. When the driving speed is equal to or higher than the predetermined speed, the period of viewing the rearview monitor 3 also becomes shorter than the period of viewing in the case of driving at a speed lower than the predetermined speed, and the information about the second-type ranges 110B is not required as often.

If the video processing unit 36 of the control unit 30 determines that the speed of the vehicle is not equal to or higher than the predetermined speed (No at Step S13), then the system control proceeds to Step S15. Moreover, the video processing unit 36 of the control unit 30 outputs the display video data 110 to the display control unit 40.

If the video processing unit 36 of the control unit 30 determines that the speed of the vehicle is equal to or higher than the predetermined speed (Yes at Step S13), then the system control proceeds to Step S14.

The reduction processing unit 37 in the control unit 30 performs an information volume reduction operation with respect to the second-type ranges 110B of the display video data 110 (Step S14). More specifically, the reduction processing unit 37 in the control unit 30 reduces the volume of information of the second-type ranges 110B of the display video data 110.

For example, the reduction processing unit 37 of the control unit 30 generates the display video data 120 by reducing the chromatic value of each of the RGB colors of the second-type ranges 110B of the display video data 110, and outputs the display video data 120 to the display control unit 40.

Alternatively, for example, the reduction processing unit 37 of the control unit 30 can generate the display video data 120 by setting, for example, simple colors or black and white colors of low chromatic values in the second-type ranges 110B of the display video data 110, and output the display video data 120 to the display control unit 40.

Still alternatively, for example, the reduction processing unit 37 in the control unit 30 can generate the display video data 120 by reducing the luminosity of each pixel in the second-type ranges 110B of the display video data 110 by a predetermined amount or a predetermined ratio, and output the display video data 120 to the display control unit 40.

Still alternatively, for example, the reduction processing unit 37 in the control unit 30 can output, along with outputting the display video data 110, a control signal to the display control unit 40 for setting the backlight of the rearview monitor 3 corresponding to the first-type range 110A to the normal brightness and for reducing the backlight of the rearview monitor 3 corresponding to the second-type ranges 110B by a predetermined amount or a predetermined ratio than the normal brightness.

The display control unit 40 of the control unit 30 causes the rearview monitor 3 to display either the display video data 110 or the display video data 120 (Step S15). More specifically, when the speed of the vehicle is lower than the predetermined speed, the display control unit 40 of the control unit 30 causes the rearview monitor 3 to display the display video data 110 as illustrated in FIG. 7. However, when the speed of the vehicle is equal to or higher than the predetermined speed, the display control unit 40 of the control unit 30 causes the rearview monitor 3 to display the display video data 120 having a reduced volume of information as illustrated in FIG. 9.

The control unit 30 repeatedly performs such operations, for example, on a frame-by-frame basis or at predetermined intervals such as after every predetermined number of frames.

As described above, according to the first embodiment, when the speed of the vehicle is equal to or higher than the predetermined speed, the display video data 120 having a reduced volume of information of the second-type ranges 120B is displayed in the rearview monitor 3. When the speed of the vehicle is lower than the predetermined speed, the display video data 110 not subjected to reduction in the volume of information is displayed in the rearview monitor 3. Thus, depending on the speed of the vehicle, either the display video data 110 or the display video data 120 having an easily-recognizable volume of information for the driver is displayed in the rearview monitor 3. In this way, according to the first embodiment, an appropriate volume of information for the driver can be displayed according to the speed of the vehicle. As a result, according to the first embodiment, regardless of the speed of the vehicle, the driver can confirm the surroundings of the vehicle in a proper manner.

According to the first embodiment, when the speed of the vehicle is equal to or higher than the predetermined speed, an information volume reduction operation is performed with respect to the second-type ranges 110B of the display video data 110. In other words, according to the first embodiment, the first-type range 110A, which is recognizable when the driver looks straight at the conventional optical rearview mirror R, is not subjected to any reduction in the volume of information regardless of the speed of the vehicle. Hence, in the first embodiment, the rearward portion can be confirmed at any time in an identical manner to the case of looking at the conventional optical rearview mirror R.

According to the first embodiment, the second-type ranges 120B of the display video data 120 are subjected to reduction in the volume of information to such an extent that the driver can still recognize the presence or absence of the captured objects in the second-type ranges 120B as well as can recognize the difference between the volume of information of the first-type range 120A and the volume of information of the second-type ranges 120B. For that reason, in the first embodiment, even if the volume of information of the second-type ranges 120B is reduced, the driver can obtain the desired information from the second-type ranges 120B as may be necessary. Hence, the driver is able to take a proper evasive action as may be necessary.

Second Embodiment

Figure 11:
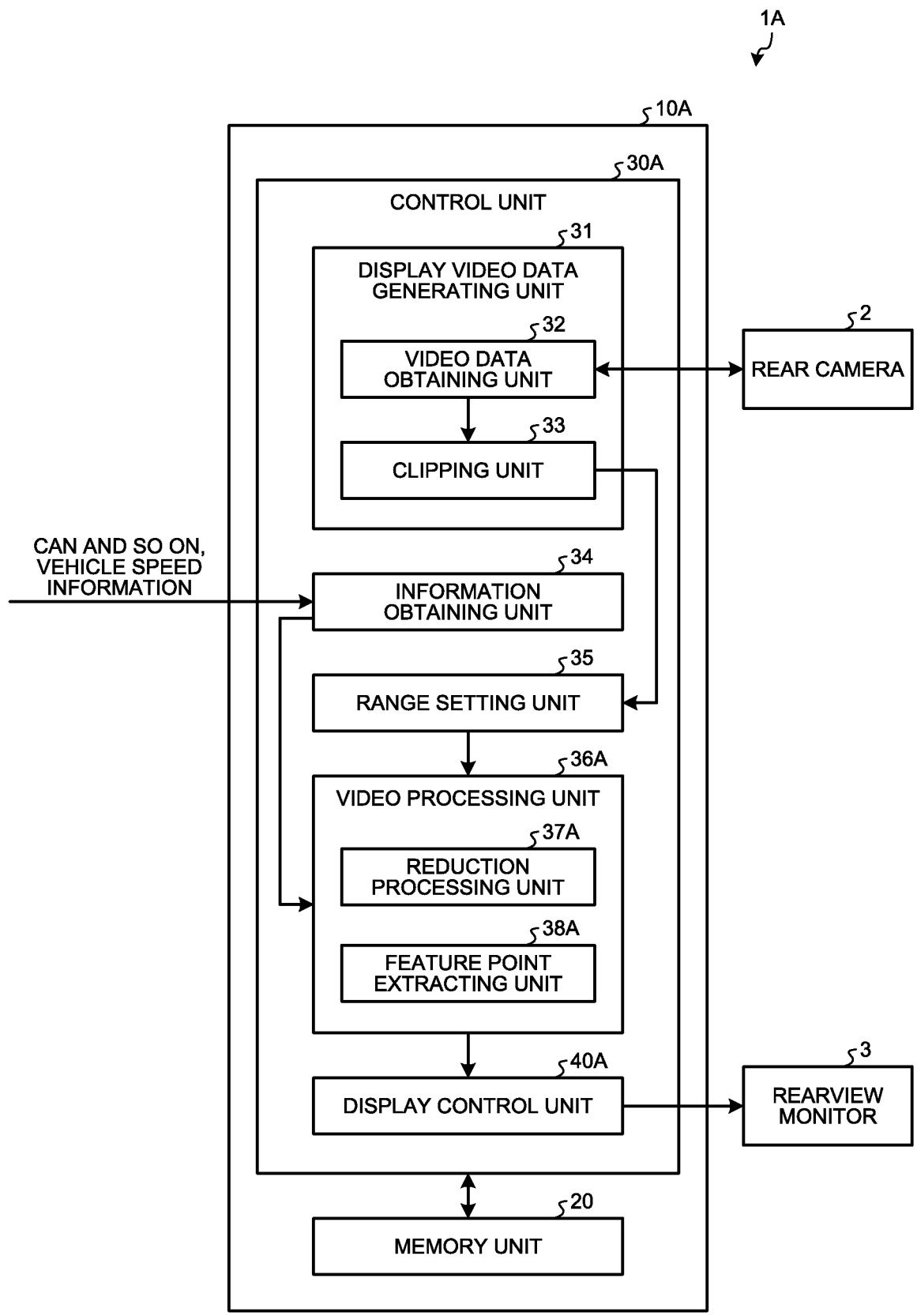
FIG. 11 is a schematic diagram illustrating an exemplary configuration of the in-vehicle display system according to a second embodiment.
Figure 12:
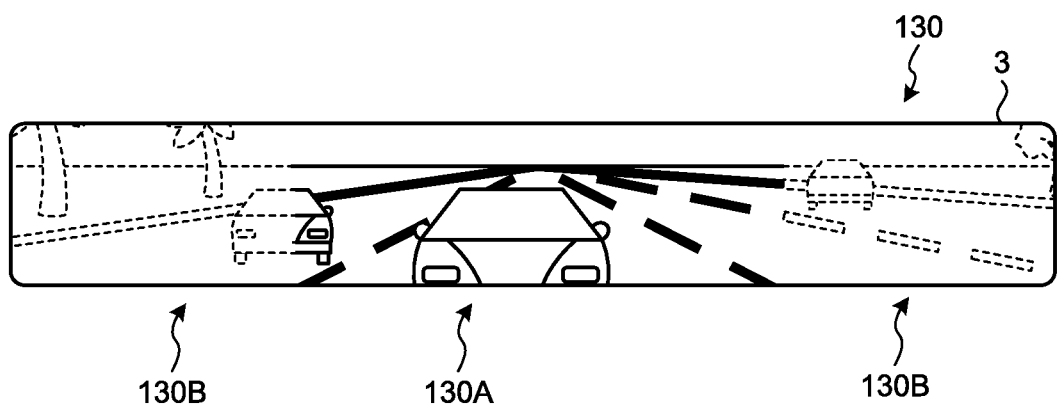
FIG. 12 is a diagram illustrating an example of the video displayed in the rearview monitor of the in-vehicle display system according to the second embodiment.
Figure 13:
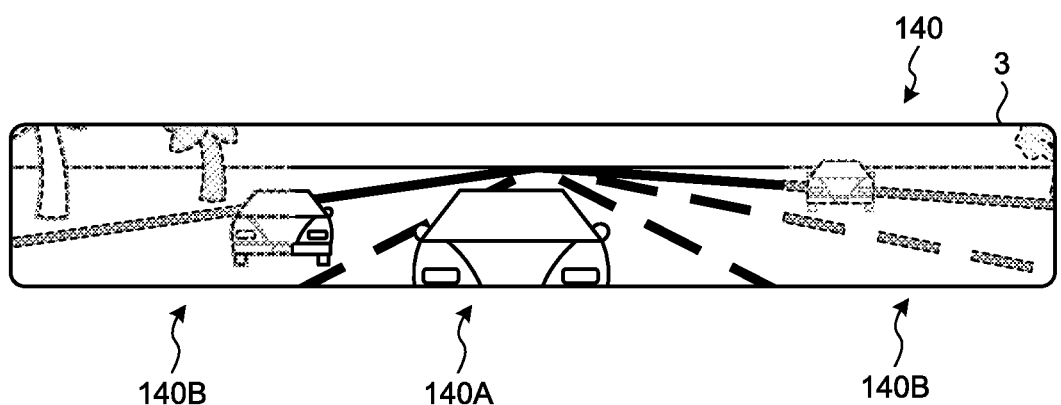
FIG. 13 is a diagram illustrating another example of the video displayed in the rearview monitor of the in-vehicle display system according to the second embodiment.

Explained below with reference to FIGS. 11 to 13 is an in-vehicle display system 1A according to a second embodiment. FIG. 11 is a schematic diagram illustrating an exemplary configuration of the in-vehicle display system according to the second embodiment. FIG. 12 is a diagram illustrating an example of the video displayed in the rearview monitor of the in-vehicle display system according to the second embodiment. FIG. 13 is a diagram illustrating another example of the video displayed in the rearview monitor of the in-vehicle display system according to the second embodiment.

As illustrated in FIG. 11, the in-vehicle display system 1A has an identical fundamental configuration to the in-vehicle display system 1 according to the first embodiment. In the following explanation, the constituent elements identical to the constituent elements in the in-vehicle display system 1 are referred to by the same or corresponding reference numerals, and the detailed explanation thereof is not given again. In the in-vehicle display system 1A according to the second embodiment, a control unit 30A of an in-vehicle display control device 10A is different than that in the in-vehicle display system 1 according to the first embodiment.

A video processing unit 36A includes a reduction processing unit 37A and a feature point extracting unit 38A.

The feature point extracting unit 38A performs an information volume reduction operation that includes generating display video data 130 in which the feature points of the captured objects are extracted from the second-type ranges 110B of the display video data 110 and are then illustrated, and outputting the display video data 130 to a display control unit 40A. Herein, the feature point extracting unit 38A implements a known feature point extraction method and, for example, extracts angles as the feature points of the captured objects from the second-type ranges 110B of the display video data 110. Then, the feature point extracting unit 38A generates the display video data 130 in which dashed lines joining the extracted angles and representing the contours of the captured objects are illustrated (see FIG. 12). The display video data 130 contains a first-type range 130A that is not subjected to reduction in the volume of information, and contains second-type ranges 130B in which the feature points are illustrated. Meanwhile, if the feature points of the captured objects are extracted in detail, then the difference between the volume of information of the display video data 130 and the volume of information of the display video data 110 becomes smaller, thereby likely requiring a longer period of time for recognizing the captured objects. On the other hand, if the feature points of the captured objects are coarsely extracted, then the difference between the volume of information of the display video data 130 and the volume of information of the display video data 110 increases, and the captured objects may not be correctly recognizable. Hence, in the feature point extracting unit 38A, a threshold value is set to ensure that the feature points are appropriately extracted. More specifically, the threshold value represents the value for enabling extraction of the bare minimum contour required for recognition of the outer shape of an object.

Explained below with reference to FIG. 12 is an example of the display video data 130. The display video data 130 is generated from the display video data 110 illustrated in FIG. 7. In the display video data 130, the feature points of trailing vehicles, the feature points of the road and the guardrail, and the feature points of roadside trees are illustrated using dashed lines.

The feature point extracting unit 38A outputs the generated display video data 130 as display video data to the display control unit 40A.

Meanwhile, as far as the information volume reduction operation is concerned, the information volume reduction operation according to the second embodiment can be independently performed or can be combined with the information volume reduction operation according to the first embodiment.

The following explanation is given for a case in which the information volume reduction operation according to the second embodiment is independently performed and the display video data 130 generated by extracting the feature points of the captured objects is displayed in the rearview monitor 3. More specifically, at Step S14 in the flowchart illustrated in FIG. 10, the feature point extracting unit 38A in the control unit 30A outputs the display video data 130, in which the feature points in the second-type ranges 110B of the display video data 110 are extracted as illustrated in FIG. 12, to the display control unit 40A. Then, the display control unit 40A in the control unit 30A causes the rearview monitor 3 to display the display video data 130.

The following explanation is given for a case in which the information volume reduction operation according to the second embodiment is performed in combination with the information volume reduction operation according to the first embodiment, and the display video data 120 having a reduced volume of information and the display video data 130 having the feature points extracted therein is displayed in an overlapping manner in the rearview monitor 3. More specifically, at Step S14 in the flowchart illustrated in FIG. 10, the reduction processing unit 37A in the control unit 30A generates the display video data 120 by reducing the volume of information of the second-type ranges 110B of the display video data 110. Moreover, the feature point extracting unit 38A in the control unit 30A generates the display video data 130 in which the feature points of the second-type ranges 110B of the display video data 110 are extracted as illustrated in FIG. 12. Then, the feature point extracting unit 38A in the control unit 30A outputs display video data 140, which is illustrated in FIG. 13 and which is generated by overlapping the display video data 120 having a reduced volume of information with the display video data 130, to the display control unit 40A. The display video data 140 contains a first-type range 140A not subjected to reduction in the volume of information, and contains second-type ranges 140B in which the color information or the brightness is reduced and in which the feature points are illustrated. Subsequently, the display control unit 40A in the control unit 30A causes the rearview monitor 3 to display the display video data 140.

As described above, according to the second embodiment, when the speed of the vehicle is equal to or higher than the predetermined speed, the display video data 130 in which the volume of information of the second-type ranges 130B is reduced and in which the feature points of the second-type ranges 110B of the display video data 110 are illustrated using dashed lines is displayed in the rearview monitor 3. When the speed of the vehicle is lower than the predetermined speed, the display video data 110 that is not subjected to reduction in the volume of information is displayed in the rearview monitor 3. Thus, depending on the speed of the vehicle, either the display video data 110 or the display video data 130 having an easily-recognizable volume of information for the driver is displayed in the rearview monitor 3. In this way, according to the second embodiment, an appropriate volume of information for the driver can be displayed. As a result, according to the second embodiment, regardless of the speed of the vehicle, the driver can confirm the surroundings of the vehicle in a proper manner.

Moreover, according to the second embodiment, when the speed of the vehicle is equal to or higher than the predetermined speed, the display video data 140, which is obtained when the display video data 120 having a reduced volume of information of the second-type ranges 110B of the display video data 110 is overlapped with the display video data 130 generated by extracting the feature points of the second-type ranges 110B of the display video data 110, is displayed in the rearview monitor 3. As a result, according to the second embodiment, the captured objects can be made to be easily recognizable even if the volume of information is reduced. Moreover, according to the second embodiment, since the feature points representing the contours of the captured objects are illustrated in the display video data 140, the driver is able to easily recognize the presence or absence of objects.

Third Embodiment

Figure 14:
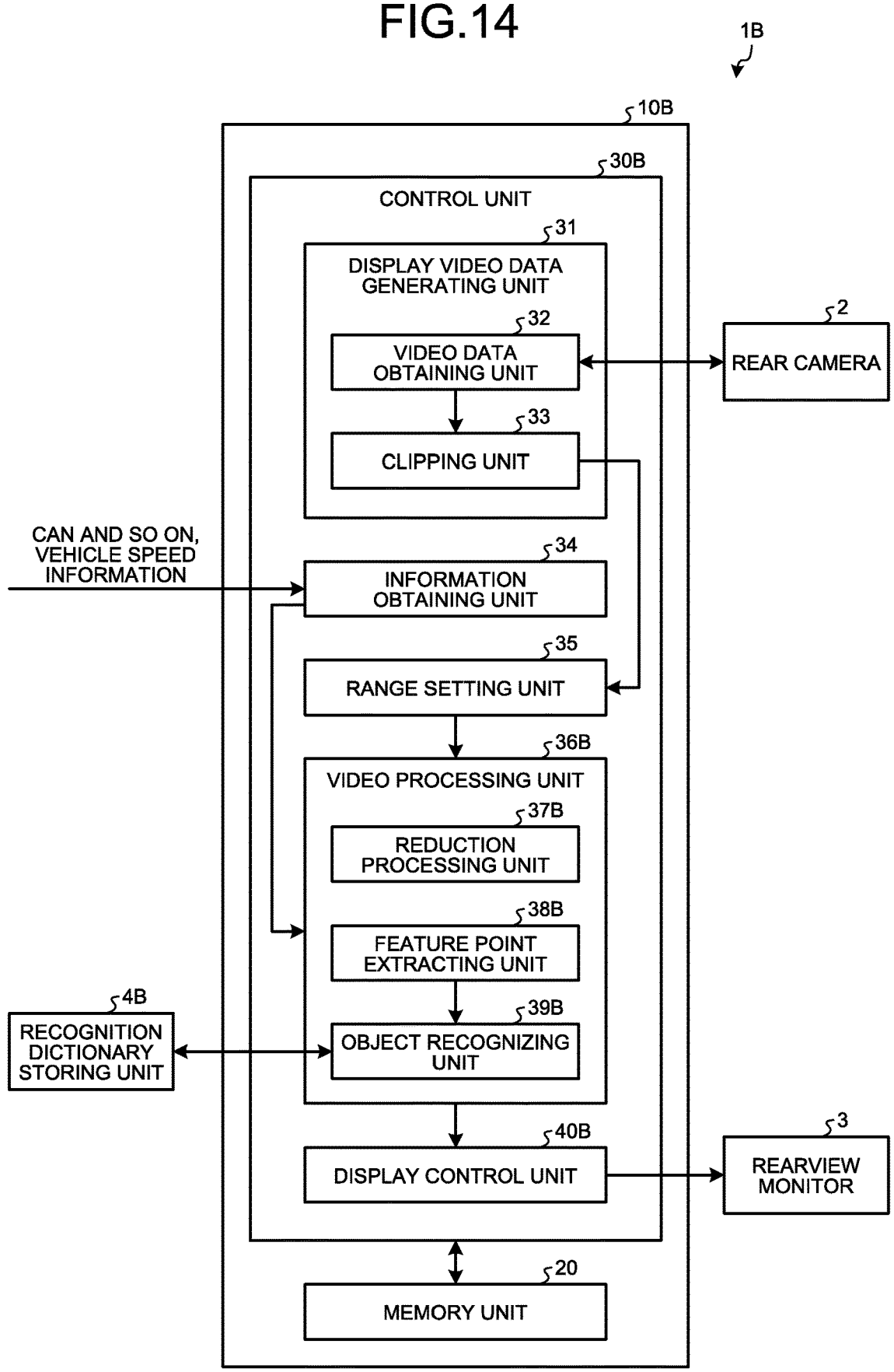
FIG. 14 is a schematic diagram illustrating an exemplary configuration of the in-vehicle display system according to a third embodiment.
Figure 15:
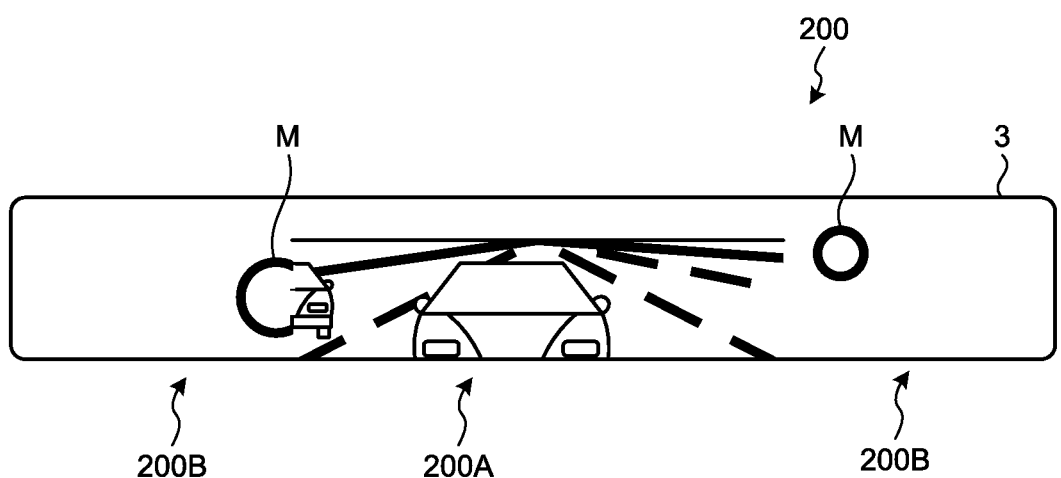
FIG. 15 is a diagram illustrating an example of the video displayed in the rearview monitor of the in-vehicle display system according to the third embodiment.
Figure 16:
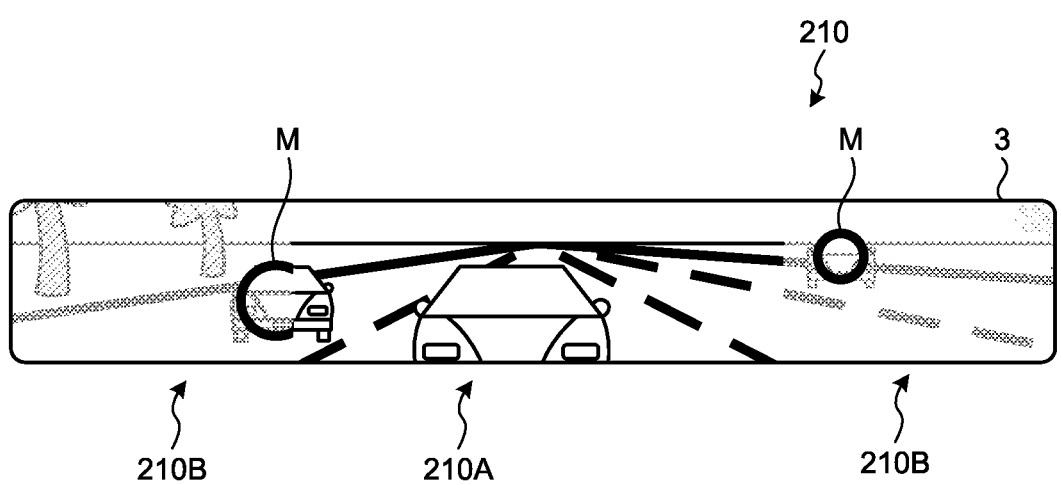
FIG. 16 is a diagram illustrating another example of the video displayed in the rearview monitor of the in-vehicle display system according to the third embodiment.
Figure 17:
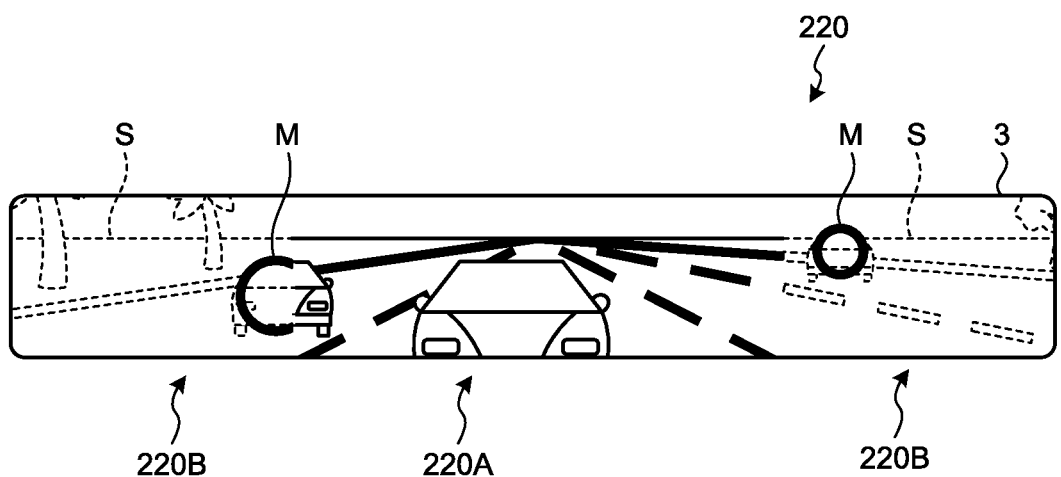
FIG. 17 is a diagram illustrating another example of the video displayed in the rearview monitor of the in-vehicle display system according to the third embodiment.
Figure 18:
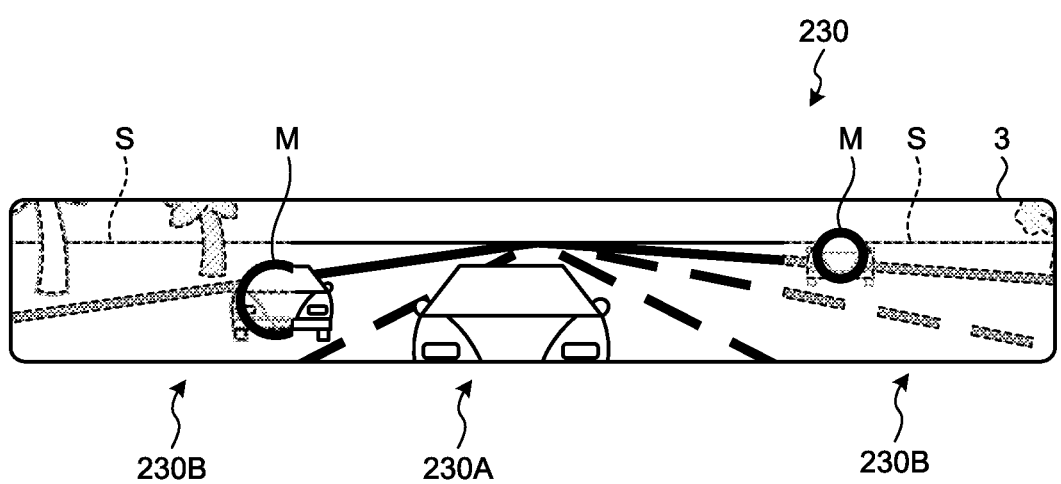
FIG. 18 is a diagram illustrating another example of the video displayed in the rearview monitor of the in-vehicle display system according to the third embodiment.

Explained below with reference to FIGS. 14 to 18 is an in-vehicle display system 1B according to a third embodiment. FIG. 14 is a schematic diagram illustrating an exemplary configuration of the in-vehicle display system according to the third embodiment. FIG. 15 is a diagram illustrating an example of the video displayed in the rearview monitor of the in-vehicle display system according to the third embodiment. FIG. 16 is a diagram illustrating another example of the video displayed in the rearview monitor of the in-vehicle display system according to the third embodiment. FIG. 17 is a diagram illustrating another example of the video displayed in the rearview monitor of the in-vehicle display system according to the third embodiment. FIG. 18 is a diagram illustrating another example of the video displayed in the rearview monitor of the in-vehicle display system according to the third embodiment.

As illustrated in FIG. 14, as compared to the in-vehicle display system 1A according to the second embodiment, the in-vehicle display system 1B according to the third embodiment differs in the way of including a recognition dictionary storing unit 4B and having a different configuration of a control unit 30B of an in-vehicle display control device 10B.

The recognition dictionary storing unit 4B is used to store a dictionary for enabling collation of patterns such as shapes, sizes, and colors of objects such as four-wheel vehicles, two-wheel vehicles, and persons. Examples of the recognition dictionary storing unit 4B include a semiconductor flash memory such as a RAM, a ROM, or a flash memory; and a memory device such as a hard disc, an optical disc, or an external memory device connected via a network.

A video processing unit 36B includes a reduction processing unit 37B, a feature point extracting unit 38B, and an object recognizing unit 39B.

The feature point extracting unit 38B performs identical operations to the feature point extracting unit 38A according to the second embodiment. The feature point extracting unit 38B outputs the display video data 130, in which the feature points are extracted as illustrated in FIG. 12, to the object recognizing unit 39B.

The object recognizing unit 39B performs an information volume reduction operation that includes generating display video data in which the objects present in the second-type ranges 130B of the display video data 130 are either substituted with or overlapped by icons M (representing a display for indicating vehicles), and outputting the display video data to a display control unit 40B. In the third embodiment, the object recognizing unit 39B recognizes vehicles as objects. Moreover, in the third embodiment, the icons M are circular rings. Alternatively, the icons M can be of some other shape such as a drawing of a vehicle. More specifically, with respect to the second-type ranges 130B of the display video data 130, the object recognizing unit 39B performs pattern matching using the recognition dictionary stored in the recognition dictionary storing unit 4B, and detects the existence of objects. Then, the object recognizing unit 39B generates display video data either by substituting the objects with the icons M or overlapping the icons M on the objects, and outputs the display video data to the display control unit 40B. Since the object recognizing unit 39B performs pattern matching with respect to the display video data 130 having a reduced volume of information as compared to the display video data 110, it becomes possible to reduce the load and the time required for the processing.

Meanwhile, as far as the information volume reduction operation is concerned, the information volume reduction operation according to the third embodiment can be independently performed or can be appropriately combined with the information volume reduction operation according to the first embodiment and the information volume reduction operation according to the second embodiment.

The following explanation is given for a case in which the information volume reduction operation according to the third embodiment is independently performed and only the icons M are displayed. More specifically, at Step S14 in the flowchart illustrated in FIG. 10, the feature point extracting unit 38B in the control unit 30B generates the display video data 130 by extracting the feature points of the second-type ranges 110B of the display video data 110. Then, the object recognizing unit 39B in the control unit 30B recognizes the objects in the second-type ranges 130B of the display video data 130. Subsequently, the object recognizing unit 39B in the control unit 30B generates display video data 200 by substituting the second-type ranges 130B of the display video data 130 with a video in which the icons M are displayed at the positions corresponding to the objects as illustrated in FIG. 15, and outputs the display video data 200 to the display control unit 40B. The display video data 200 contains a first-type range 200A not subjected to reduction in the volume of information and contains second-type ranges 200B in which the icons M are displayed. Then, the display control unit 40B in the control unit 30B causes the rearview monitor 3 to display the display video data 200.

The following explanation is given for a case in which the information volume reduction operation according to the third embodiment is performed in combination with the information volume reduction operation according to the first embodiment, and the icons M are displayed in an overlapping manner on the display video data 120 in which the volume of information has been reduced. More specifically, at Step S14 in the flowchart illustrated in FIG. 10, the reduction processing unit 37 in the control unit 30B generates the display video data 120 by reducing the volume of information of the second-type ranges 110B of the display video data 110. Then, the feature point extracting unit 38B in the control unit 30B generates the display video data 130 by extracting the feature points of the second-type ranges 110B of the display video data 110. Subsequently, the object recognizing unit 39B in the control unit 30B recognizes the objects in the second-type ranges 130B of the display video data 130 from which the feature points are extracted. Then, the object recognizing unit 39B in the control unit 30B generates display video data 210 by overlapping the icons M on the second-type ranges 120B of the display video data 120 having a reduced volume of information as illustrated in FIG. 16, and outputs the display video data 210 to the display control unit 40B. The display video data 210 contains a first-type range 210A not subjected to reduction in the volume of information, and contains second-type ranges 210B in which the color information or the brightness has been reduced and the icons M are displayed in an overlapping manner. Subsequently, the display control unit 40B of the control unit 30B causes the rearview monitor 3 to display the display video data 210.

The following explanation is given for a case in which the information volume reduction operation according to the third embodiment is performed in combination with the information volume reduction operation according to the second embodiment, and the feature points and the icons M are displayed in an overlapping manner. More specifically, at Step S14 in the flowchart illustrated in FIG. 10, the feature point extracting unit 38B in the control unit 30B generates the display video data 130 by extracting the feature points of the second-type ranges 110B of the display video data 110. Then, the object recognizing unit 39B in the control unit 30B recognizes the objects in the second-type ranges 130B of the display video data 130. Subsequently, the object recognizing unit 39B in the control unit 30B generates display video data 220 by overlapping the icons M in the second-type ranges 130B of the display video data 130 as illustrated in FIG. 17, and outputs the display video data 220 to the display control unit 40B. The display video data 220 contains a first-type range 220A not subjected to reduction in the volume of information, and contains second-type ranges 220B in which the feature points and the icons M are displayed in an overlapping manner. Then, the display control unit 40B of the control unit 30B causes the rearview monitor 3 to display the display video data 220.

Meanwhile, the information volume reduction operation according to the third embodiment can be performed in combination with the information volume reduction operation according to the first embodiment and the information volume reduction operation according to the second embodiment; and the feature points and the icons M can be displayed in an overlapping manner on the display video data 120 in which the volume of information has been reduced. More specifically, at Step S14 in the flowchart illustrated in FIG. 10, the reduction processing unit 37B in the control unit 30B generates the display video data 120 by reducing the volume of information of the second-type ranges 110B of the display video data 110. Then, the feature point extracting unit 38B in the control unit 30B generates the display video data 130 by extracting the feature points of the second-type ranges 110B of the display video data 110. Subsequently, the object recognizing unit 39B in the control unit 30B recognizes the objects in the second-type ranges 130B of the display video data 130. Then, the object recognizing unit 39B in the control unit 30B generates display video data 230 in which the display video data 120, the display video data 130, and the icons M are displayed in an overlapping manner as illustrated in FIG. 18, and outputs the display video data 230 to the display control unit 40B. The display video data 230 contains a first-type range 230A not subjected to reduction in the volume of information, and contains second-type ranges 230B in which the color information or the brightness is reduced as well as the feature points and the icons M are displayed in an overlapping manner. Subsequently, the display control unit 40B in the control unit 30B causes the rearview monitor 3 to display the display video data 230.

As described above, according to the third embodiment, when the speed of the vehicle is equal to or higher than the predetermined speed, either the display video data 200, or the display video data 210, or the display video data 220, or the display video data 230 in which the objects in the second-type ranges 110B of the display video data 110 are illustrated using the icons M is displayed in the rearview monitor 3. As a result, when the speed of the vehicle is equal to or higher than the predetermined speed, either the display video data 200 having the icons M displayed in the second-type ranges 200B, or the display video data 210 having the icons M displayed in the second-type ranges 210B, or the display video data 220 having the icons M displayed in the second-type ranges 220B, or the display video data 230 having the icons M displayed in the second-type ranges 230B is displayed in the rearview monitor 3. Hence, in the third embodiment, in the second-type ranges 200B, or the second-type ranges 210B, or the second-type ranges 220B, or the second-type ranges 230B having a reduced volume of information; the objects can be displayed in an easily-recognizable manner. As a result, in the third embodiment, even if the color information or the brightness is reduced, the captured objects can be made easily recognizable. In this way, according to the third embodiment, depending on the speed of the vehicle, an appropriate volume of information for the driver can be displayed. As a result, according to the third embodiment, the driver can confirm the surroundings of the vehicle in a proper manner.

Fourth Embodiment

Figure 19:
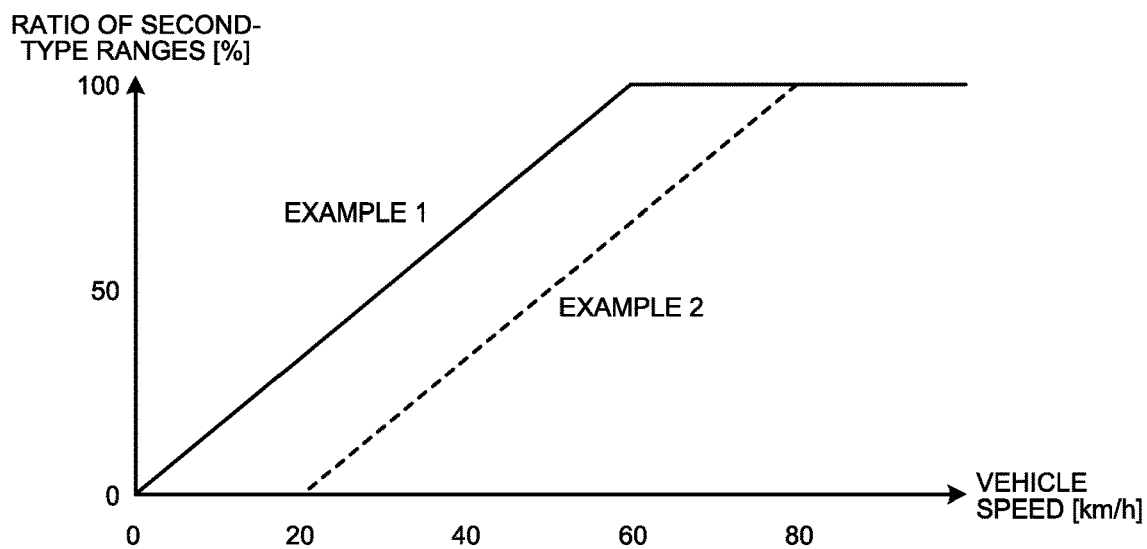
FIG. 19 is a diagram illustrating an example of a second-type range ratio table in the in-vehicle display system according to a fourth embodiment.
Figure 20:
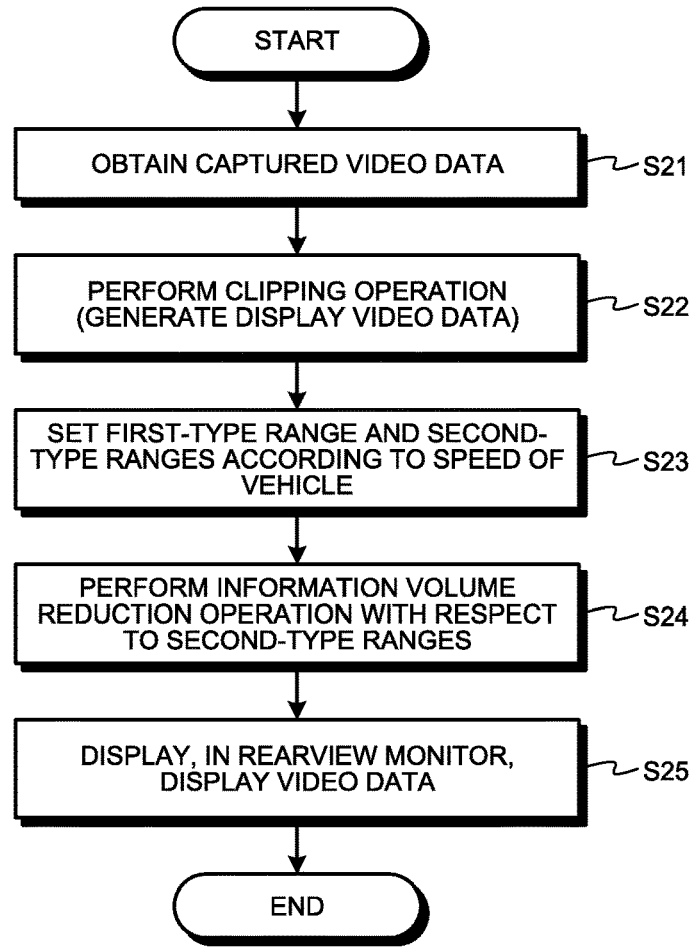
FIG. 20 is a flowchart for explaining a flow of operations performed in the in-vehicle display system according to the fourth embodiment.
Figure 21:
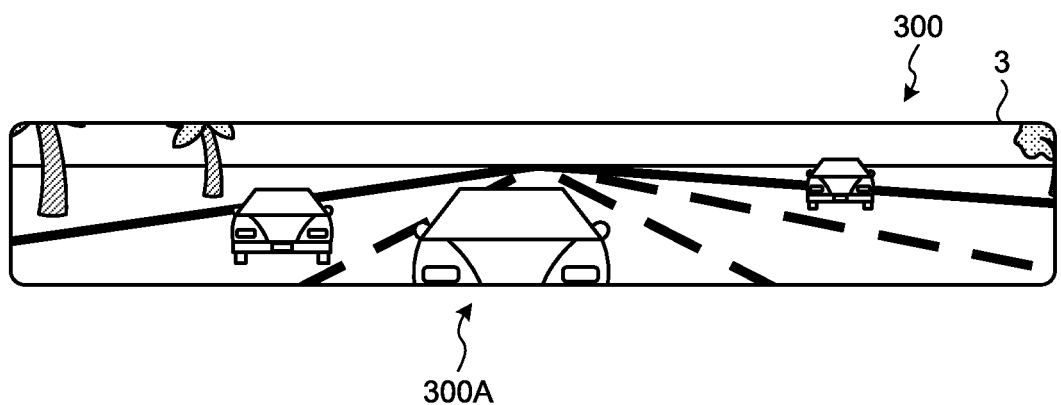
FIG. 21 is a diagram illustrating an example of the video displayed in the rearview monitor of the in-vehicle display system according to the fourth embodiment.
Figure 22:
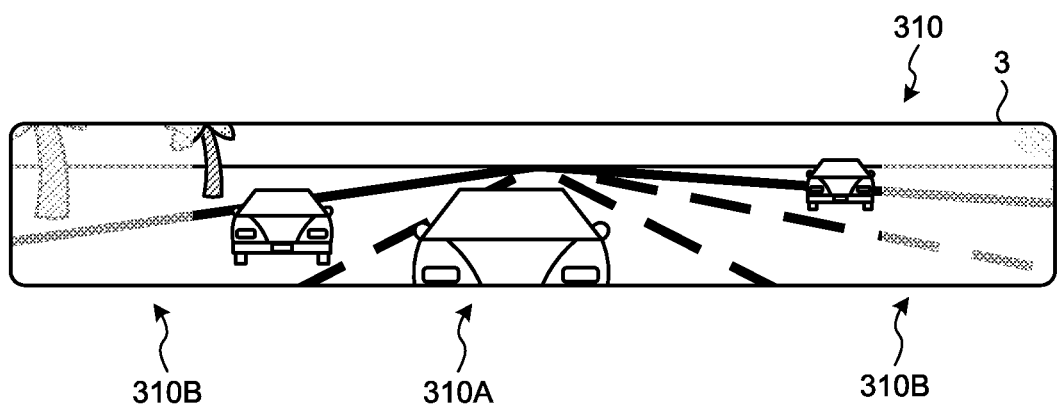
FIG. 22 is a diagram illustrating another example of the video displayed in the rearview monitor of the in-vehicle display system according to the fourth embodiment.
Figure 23:
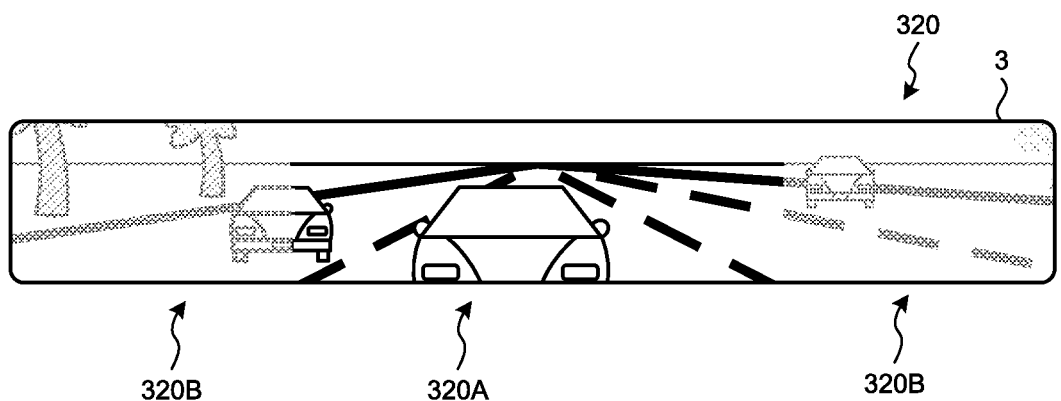
FIG. 23 is a diagram illustrating another example of the video displayed in the rearview monitor of the in-vehicle display system according to the fourth embodiment.

Explained below with reference to FIGS. 19 to 23 is an in-vehicle display system according to a fourth embodiment. FIG. 19 is a diagram illustrating an example of a second-type range ratio table in the in-vehicle display system according to the fourth embodiment. FIG. 20 is a flowchart for explaining a flow of operations performed in the in-vehicle display system according to the fourth embodiment. FIG. 21 is a diagram illustrating an example of the video displayed in the rearview monitor of the in-vehicle display system according to the fourth embodiment. FIG. 22 is a diagram illustrating another example of the video displayed in the rearview monitor of the in-vehicle display system according to the fourth embodiment. FIG. 23 is a diagram illustrating another example of the video displayed in the rearview monitor of the in-vehicle display system according to the fourth embodiment.

In the in-vehicle display system according to the fourth embodiment, the operations performed by the control unit 30 are different than the operations performed in the in-vehicle display system 1 according to the first embodiment. Apart from that, the configuration is identical to the in-vehicle display system 1 according to the first embodiment.

The range setting unit 35 sets the first-type range 110A and the second-type ranges 110B of the display video data 110 according to the speed of the vehicle. Based on vehicle speed information obtained by the information obtaining unit 34; lower the speed of the vehicle, the wider is the first-type range 110A set by the range setting unit 35. For example, based on the second-type range ratio table stored in advance in the memory unit 20, the range setting unit 35 can set the ratio of the second-type ranges 110B.

The second-type range ratio table indicates the relationship between the speed of the vehicle and the ratio of the second-type ranges 110B. In the fourth embodiment, the ratio of the second-type ranges 110B of the display video data 110 is assumed to be 0% when the second-type ranges 110B have the width of 0 mm in the vehicle width direction and is assumed to be 100% when the second-type ranges 110B have the width of 100 mm in the vehicle width direction. As the second-type ranges 110B become smaller, the first-type range 110A becomes wider toward the outer side in the vehicle width direction. More specifically, when the ratio of the second-type ranges 110B is 0%, the first-type range 110A has the width of 400 mm in the vehicle width direction. When the ratio of the second-type ranges 110B is 100%, the first-type range 110A has the width of 200 mm in the vehicle width direction.

Explained below with reference to FIG. 19 is an example of the second-type range ratio table. In the second-type range ratio table illustrated in FIG. 19, a linearly-varying relationship of two patterns of the speed of the vehicle, namely, a pattern example 1 and a pattern example 2, with the ratio of the second-type ranges 110B is defined. More specifically, in the pattern example 1, in the range from 0 km/h to 60 km/h of the speed of the vehicle, the ratio of the second-type ranges 110B undergoes linear variation between 0% and 100%. At the vehicle speed equal to or higher than 60 km/h, the ratio of the second-type ranges 110B becomes constant at 100%. In the pattern example 2, in the range from 20 km/h to 80 km/h of the speed of the vehicle, the ratio of the second-type ranges 110B undergoes linear variation between 0% and 100%. At the vehicle speed equal to or higher than 80 km/h, the ratio of the second-type ranges 110B becomes constant at 100%.

Alternatively, in the second-type range ratio table, the vehicle speed and the ratio of the second-type ranges 110B can undergo variation in a staircase pattern. Still alternatively, in the second-type range ratio table, the vehicle speed and the ratio of the second-type ranges 110B can undergo nonlinear variation.

For example, the range setting unit 35 selects, according to the running condition of the vehicle and the characteristics of the driver, the pattern example 1 or the pattern example 2 from the second-type range ratio table illustrated in FIG. 19; and, based on the relationship between the speed of the vehicle and the second-type ranges 110B in the selected pattern, sets the first-type range 110A and the second-type ranges 110B according to the speed of the vehicle.

The range setting unit 35 can have different ratios of the second-type ranges 110B at the time of deceleration and at the time of acceleration. For example, the range setting unit 35 can select the pattern example 1 in the second-type range ratio table illustrated in FIG. 19 at the time of deceleration; can select the pattern example 2 in the second-type range ratio table illustrated in FIG. 19 at the time of acceleration; and can set the first-type range 110A and the second-type ranges 110B according to the speed of the vehicle.

Explained below with reference to FIG. 20 is a flow of operations performed by the control unit 30.

The video data obtaining unit 32 of the control unit 30 obtains the captured video data 100 (Step S21). The operation performed at Step S21 is identical to the operation performed at Step S11.

The clipping unit 33 of the control unit 30 performs a clipping operation (Step S22). The operation performed at Step S22 is identical to the operation performed at Step S12.

The range setting unit 35 of the control unit 30 sets the first-type range 110A and the second-type ranges 110B according to the speed of the vehicle (Step S23). More specifically, based on the second-type range ratio table and based on the information obtained by the information obtaining unit 34, the range setting unit 35 of the control unit 30 obtains the ratio of the second-type ranges 110B corresponding to the speed of the vehicle. Then, the range setting unit 35 of the control unit 30 sets the second-type ranges 110B of the display video data 110 to have the obtained ratio of the second-type ranges 110B.

The video processing unit 36 of the control unit 30 performs the information volume reduction operation with respect to the second-type ranges 110B of the display video data 110 (Step S24). The operation performed at Step S24 is identical to the operation performed at Step S14.

The display control unit 40 of the control unit 30 causes the rearview monitor 3 to display the display video data 110 (Step S25). The operation performed at Step S25 is identical to the operation performed at Step S15.

More particularly, the explanation is given for a case in which, at the time of setting the first-type range 110A and the second-type ranges 110B of the display video data 110, the range setting unit 35 uses the pattern example 1 from the second-type range ratio table illustrated in FIG. 19 according to the speed of the vehicle.

For example, when the speed of the vehicle is 0 km/h, at Step S23, the range setting unit 35 of the control unit 30 sets the ratio of the second-type ranges 110B of the display video data 110 to 0%. Then, at Step S25, the display control unit 40 of the control unit 30 causes the rearview monitor 3 to display video data 300 as illustrated in FIG. 21. As a result, the display video data 300 not containing second-type ranges and only containing a first-type range 300A is displayed in the rearview monitor 3. In other words, the display video data 300 displayed in the rearview monitor 3 is not subjected to any reduction in the volume of information.

For example, when the speed of the vehicle is 40 km/h, at Step S23, the range setting unit 35 of the control unit 30 sets the ratio of the second-type ranges 110B of the display video data 110 to 60%. Then, at Step S24, the reduction processing unit 37 in the control unit 30 performs the information volume reduction operation with respect to the second-type ranges 110B set to have the ratio of 60%. Subsequently, at Step S25, the display control unit 40 of the control unit 30 causes the rearview monitor 3 to display video data 310 as illustrated in FIG. 22. As a result, the display video data 310, which contains a first-type range 310A that is wider than the conventional optical rearview mirror R and contains second-type ranges 310B set to have the ratio of 60%, gets displayed in the rearview monitor 3.

For example, when the speed of the vehicle is 80 km/h, at Step S23, the range setting unit 35 in the control unit 30 sets the ratio of the second-type ranges 110B of the display video data 110 to 100%. Then, at Step S24, the reduction processing unit 37 in the control unit 30 performs the information volume reduction operation with respect to the second-type ranges 110B set to have the ratio of 100%. Subsequently, at Step S25, the display control unit 40 of the control unit 30 causes the rearview monitor 3 to display video data 320 as illustrated in FIG. 23. As a result, the display video data 320, which contains a first-type range 320A that has the same width as the conventional optical rearview mirror R and contains second-type ranges 320B set to have the ratio of 100%, is displayed in the rearview monitor 3.

As described above, in the fourth embodiment, the ratio of the second-type ranges 110B in the display video data 110 is varied and set according to the speed of the vehicle. Then, either the display video data 310 or the display video data 320 generated by reducing the volume of information of the second-type ranges 110B having the set ratio is displayed in the rearview monitor 3. In the fourth embodiment, as the speed of the vehicle increases, the ratio of the second-type ranges 110B is increased. When the speed of the vehicle is 0 km/h, the display video data 300 containing only the first-type range 300A is displayed in the rearview monitor 3. When the speed of the vehicle is higher than 0 km/h, either the display video data 310 having a reduced volume of information of the second-type ranges 310B or the display video data 320 having a reduced volume of information of the second-type ranges 320B is displayed in the rearview monitor 3. Hence, either the display video data 300, or the display video data 310, or the display video data 320 having an easily-recognizable volume of information for the driver is displayed in the rearview monitor 3 according to the speed of the vehicle. In this way, according to the fourth embodiment, depending on the speed of the vehicle, an appropriate volume of information can be provided to the driver for enabling the driver to recognize the situation and take decisions. In this way, according to the fourth embodiment, an excessive volume of information is prevented from being provided to the driver, thereby enabling achieving reduction in the load of the driver. Thus, according to the fourth embodiment, the driver can confirm the surroundings of the vehicle in a proper manner.

Fifth Embodiment

Figure 24:
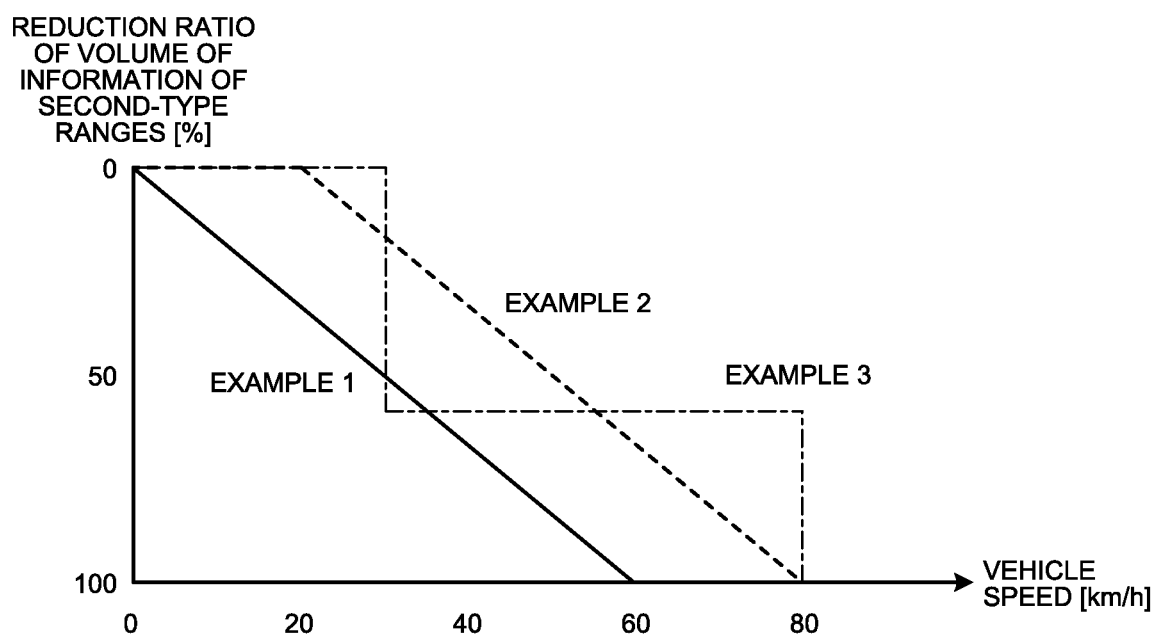
FIG. 24 is a diagram illustrating an example of a reduction ratio table in the in-vehicle display system according to a fifth embodiment.
Figure 25:
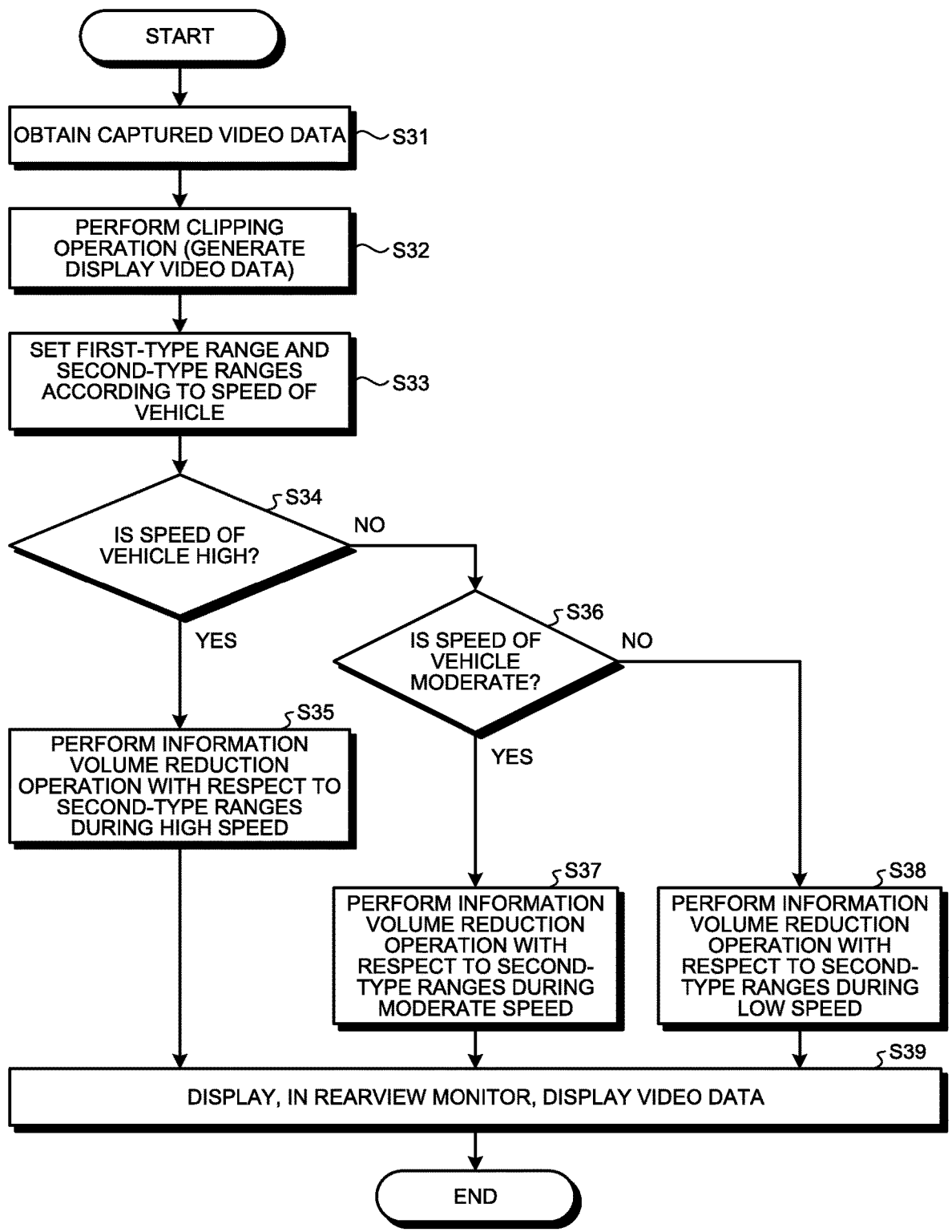
FIG. 25 is a flowchart for explaining a flow of operations performed in the in-vehicle display system according to the fifth embodiment.
Figure 26:
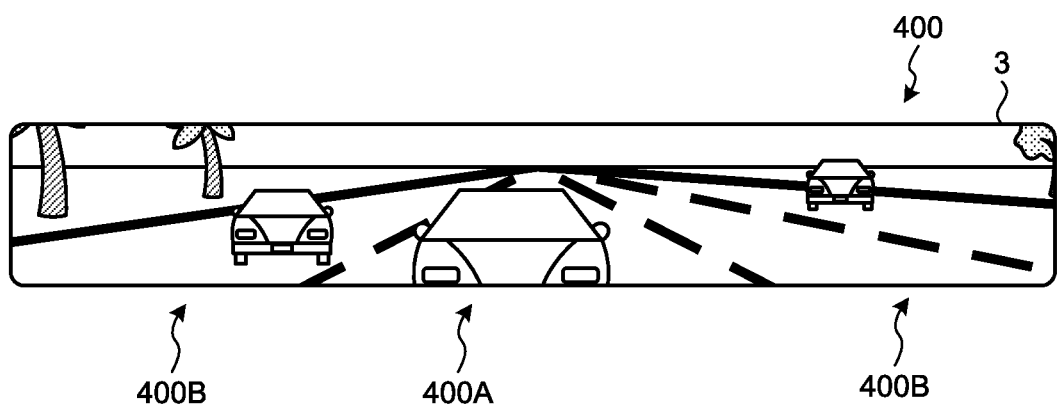
FIG. 26 is a diagram illustrating an example of the video displayed in the rearview monitor of the in-vehicle display system according to the fifth embodiment.
Figure 27:
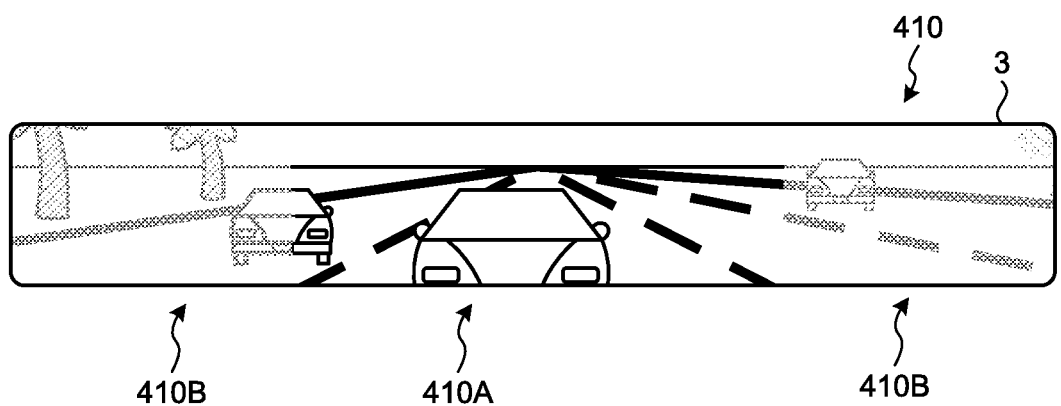
FIG. 27 is a diagram illustrating another example of the video displayed in the rearview monitor of the in-vehicle display system according to the fifth embodiment.
Figure 28:
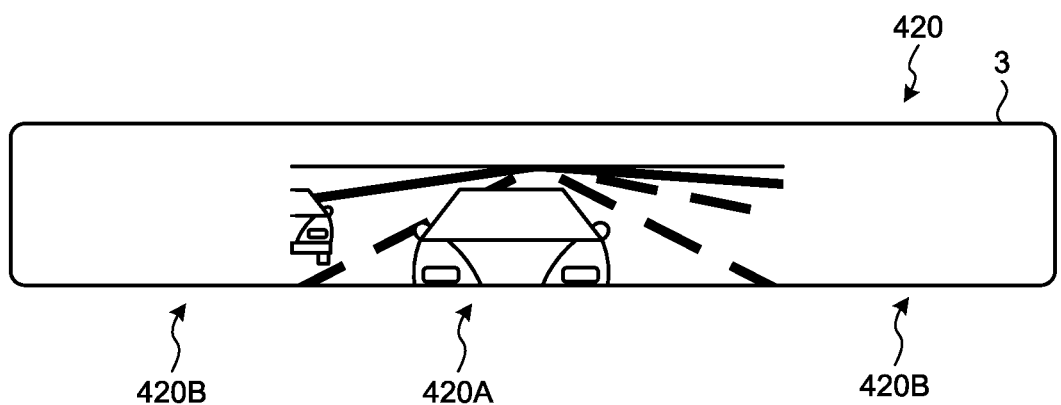
FIG. 28 is a diagram illustrating another example of the video displayed in the rearview monitor of the in-vehicle display system according to the fifth embodiment.

Explained below with reference to FIGS. 24 to 28 is an in-vehicle display system according to a fifth embodiment. FIG. 24 is a diagram illustrating an example of a reduction ratio table in the in-vehicle display system according to the fifth embodiment. FIG. 25 is a flowchart for explaining a flow of operations performed in the in-vehicle display system according to the fifth embodiment. FIG. 26 is a diagram illustrating an example of the video displayed in the rearview monitor of the in-vehicle display system according to the fifth embodiment. FIG. 27 is a diagram illustrating another example of the video displayed in the rearview monitor of the in-vehicle display system according to the fifth embodiment. FIG. 28 is a diagram illustrating another example of the video displayed in the rearview monitor of the in-vehicle display system according to the fifth embodiment.

In the in-vehicle display system according to the fifth embodiment, the operations performed by the control unit 30 are different than the in-vehicle display system according to the fourth embodiment. Apart from that, the configuration is identical to the in-vehicle display system according to the fourth embodiment.

At the time of performing the information volume reduction operation according to the first embodiment, the reduction processing unit 37 sets a reduction ratio for reducing the volume of information of the second-type ranges 110B of the display video data 110 according to the speed of the vehicle. The reduction processing unit 37 performs the information volume reduction operation in which, based on the vehicle speed information obtained by the information obtaining unit 34, higher the speed of the vehicle, the greater is the information volume reduction degree with respect to the video data in the second-type ranges 110B. Herein, the reduction processing unit 37 can set the reduction ratio for reducing the volume of information of the second-type ranges 110B based on a reduction ratio table stored in advance in the memory unit 20.

The reduction ratio table indicates the relationship between the vehicle speed and the reduction ratio of the volume of information of the second-type ranges 110B. In the fifth embodiment, the reduction ratio of the volume of information of the second-type ranges 110B is set to 0% in the case of no reduction in the volume of information, and is set to 100% in the case in which the volume of information is equal to zero and is non-displayable.

Explained below with reference to FIG. 24 is an example of the reduction ratio table. In the reduction ratio table illustrated in FIG. 24, a linearly-varying relationship of two patterns of the speed of the vehicle, namely, a pattern example 1 and a pattern example 2, with the reduction ratio of the volume of information of the second-type ranges is defined; and a relationship varying in a staircase pattern is defined as a pattern example 3. More specifically, in the pattern example 1, in the range from 0 km/h to 60 km/h of the speed of the vehicle, the reduction ratio of the volume of information of the second-type ranges 110B undergoes linear variation between 0% and 100%. At the vehicle speed equal to or higher than 60 km/h, the reduction ratio of the volume of information of the second-type ranges 110B becomes constant at 100%. In the pattern example 2, in the range from 20 km/h to 80 km/h of the speed of the vehicle, the reduction ratio of the volume of information of the second-type ranges 110B undergoes linear variation between 0% and 100%. At the vehicle speed equal to or higher than 80 km/h, the reduction ratio of the volume of information of the second-type ranges 110B becomes constant at 100%. In the pattern example 3, in the range from 0 km/h to 30 km/h of the speed of the vehicle, the reduction ratio of the volume of information of the second-type ranges 110B is set to 0%. In the range from 30 km/h to 80 km/h of the speed of the vehicle, the reduction ratio of the volume of information of the second-type ranges 110B is set to 50%. At the vehicle speed equal to or higher than 80 km/h, the reduction ratio of the volume of information of the second-type ranges 110B becomes constant at 100%.

Alternatively, in the reduction ratio table, the vehicle speed and the reduction ratio of the volume of information of the second-type ranges 110B can undergo variation in a staircase pattern. Still alternatively, in the reduction ratio table, the vehicle speed and the reduction ratio of the volume of information of the second-type ranges 110B can undergo nonlinear variation.

For example, the reduction processing unit 37 selects, according to the running condition of the vehicle and the characteristics of the driver, the pattern example 1 or the pattern example 2 from the reduction ratio table illustrated in FIG. 24; and, based on the relationship between the speed of the vehicle and the reduction ratio of the volume of information of the second-type ranges 110B in the selected pattern, sets the reduction ratio of the volume of information of the second-type ranges 110B according to the speed of the vehicle.

The reduction processing unit 37 can have different reduction ratios of the volume of information of the second-type ranges 110B at the time of deceleration and at the time of acceleration. For example, the reduction processing unit 37 can select the pattern example 1 from the reduction ratio table illustrated in FIG. 24 at the time of deceleration; can select the pattern example 2 from the reduction ratio table illustrated in FIG. 24 at the time of acceleration; and can set the reduction ratio of the volume of information of the second-type ranges 110B according to the speed of the vehicle.

For example, the reduction processing unit 37 selects, according to the running condition of the vehicle and the characteristics of the driver, the pattern example 1 or the pattern example 2 from the reduction ratio table illustrated in FIG. 24; and, based on the relationship between the speed of the vehicle and the reduction ratio in the volume of information of the second-type ranges 110B in the selected pattern, sets the reduction ratio of the volume of information of the second-type ranges 110B according to the speed of the vehicle. Then, the reduction processing unit 37 performs an identical operation to the information volume reduction operation according to the first embodiment.

Explained below with reference to FIG. 25 is a flow of operations performed by the control unit 30. The example given in FIG. 25 is an example of operations performed in the case in which the speed of the vehicle and the reduction ratio of the volume of information of the second-type ranges 110B is varied during a high speed, during a moderate speed, during a low speed, and in a staircase manner. However, the identical operations are performed also in the case of linear variation as illustrated in FIG. 24.

The video data obtaining unit 32 of the control unit 30 obtains the captured video data 100 (Step S31). The operation performed at Step S31 is identical to the operation performed at Step S21.

The clipping unit 33 of the control unit 30 performs a clipping operation (Step S32). The operation performed at Step S32 is identical to the operation performed at Step S22.

The range setting unit 35 of the control unit 30 sets the first-type range 110A and the second-type ranges 110B of the display video data 110 according to the speed of the vehicle (Step S33). The operation performed at Step S33 is identical to the operation performed at Step S23.

The video processing unit 36 of the control unit 30 determines whether or not the speed of the vehicle is high (Step S34). In the fifth embodiment, a speed of 80 km/h or higher is considered to be a high speed.

If the video processing unit 36 of the control unit 30 determines that the speed of the vehicle is high (Yes at Step S34), then the system control proceeds to Step S35.

If the video processing unit 36 of the control unit 30 determines that the speed of the vehicle is not high (No at Step S34), then the system control proceeds to Step S36.

The reduction processing unit 37 in the control unit 30 performs the information volume reduction operation with respect to the second-type ranges 110B of the display video data 110 in the case of a high speed (Step S35). More specifically, the reduction processing unit 37 in the control unit 30 sets the reduction ratio of the volume of information of the second-type ranges 110B in the case of a high speed. Then, the reduction processing unit 37 in the control unit 30 reduces the volume information of the second-type ranges 110B of the display video data 110 by the reduction ratio that has been set.

The video processing unit 36 of the control unit 30 determines whether or not the speed of the vehicle is moderate (Step S36). In the fifth embodiment, for example, a speed of 30 km/h or higher and lower than 80 km/h is considered to be a moderate speed.

If the video processing unit 36 of the control unit 30 determines that the speed of the vehicle is moderate (Yes at Step S36), then the system control proceeds to Step S37.

If the video processing unit 36 of the control unit 30 determines that the speed of the vehicle is not moderate (No at Step S36), then the system control proceeds to Step S38.

The reduction processing unit 37 in the control unit 30 performs the information volume reduction operation with respect to the second-type ranges 110B of the display video data 110 in the case of a moderate speed (Step S37). More specifically, the reduction processing unit 37 in the control unit 30 sets, based on the relationship between the speed of the vehicle and the reduction ratio of the volume of information of the second-type ranges 110B as stored in the memory unit 20, the reduction ratio of the volume of information of the second-type ranges 110B in the case of a moderate speed. Then, the reduction processing unit 37 in the control unit 30 reduces the volume of information of the second-type ranges 110B of the display video data 110 by the reduction ratio that has been set.

The reduction processing unit 37 in the control unit 30 performs the information volume reduction operation with respect to the second-type ranges 110B of the display video data 110 in the case of a low speed (Step S38). More specifically, the reduction processing unit 37 in the control unit 30 sets, based on the relationship between the speed of the vehicle and the reduction ratio of the volume of information of the second-type ranges 110B as stored in the memory unit 20, the reduction ratio of the volume of information of the second-type ranges 110B in the case of a low speed. Then, the reduction processing unit 37 in the control unit 30 reduces the volume of information of the second-type ranges 110B of the display video data 110 by the reduction ratio that has been set.

The display control unit 40 of the control unit 30 causes the rearview monitor 3 to display the display video data 110 (Step S39). The operation performed at Step S39 is identical to the operation performed at Step S25.

More particularly, the explanation is given for a case in which, at the time of setting the reduction ratio of the volume of information of the second-type ranges 110B of the display video data 110, the reduction processing unit 37 uses the pattern example 1 in the reduction ratio table illustrated in FIG. 24 according to the speed of the vehicle.

For example, when the speed of the vehicle is 0 km/h, at Step S38, the reduction processing unit 37 in the control unit 30 sets the reduction ratio of the volume of information of the second-type ranges 110B to 0%. Then, the reduction processing unit 37 in the control unit 30 reduces the volume of information of the second-type ranges 110B by 0% as illustrated in FIG. 26. In other words, the second-type ranges 110B are not subjected to any reduction in the volume of information. Then, at Step S39, the display control unit 40 of the control unit 30 causes the rearview monitor 3 to display video data 400. In the display video data 400, neither a first-type range 400A nor second-type ranges 400B are subjected to any reduction in the volume of information.

For example, when the speed of the vehicle is 40 km/h, at Step S37, the reduction processing unit 37 sets the reduction rate of the volume of information of the second-type ranges 110B to 50%. Then, the reduction processing unit 37 in the control unit 30 reduces the volume of information of the second-type ranges 110B by 50% as illustrated in FIG. 27. Subsequently, the display control unit 40 of the control unit 30 causes the rearview monitor 3 to display video data 410. The display video data 410 contains a first-type range 410A not subjected to reduction in the volume of information, and contains second-type ranges 410B having 50% reduction in the volume of information.

For example, when the speed of the vehicle is 80 km/h, at Step S35, the reduction processing unit 37 sets the reduction rate of the volume of information of the second-type ranges 110B to 100%. Then, the reduction processing unit 37 in the control unit 30 reduces the volume of information of the second-type ranges 110B by 100% as illustrated in FIG. 28. Subsequently, the display control unit 40 of the control unit 30 causes the rearview monitor 3 to display video data 420. The display video data 420 contains a first-type range 420A not subjected to reduction in the volume of information, and contains second-type ranges 420B that have 100% reduction in the volume of information and that have the volume of information equal to zero and are non-displayable.

As described above, in the fifth embodiment, the reduction ratio of the volume of information of the second-type ranges 110B in the display video data 110 is varied according to the speed of the vehicle. Then, according to the set reduction ratio for the volume of information, the information volume reduction operation is performed with respect to the second-type ranges 110B; and either the display video data 400, or the display video data 410, or the display video data 420 is displayed in the rearview monitor 3. In the fifth embodiment, as the speed of the vehicle increases, the reduction ratio for the volume of information is increased. Hence, either the display video data 400, or the display video data 410, or the display video data 420 having an easily-recognizable volume of information for the drive is displayed in the rearview monitor 3. In this way, according to the fifth embodiment, according to the speed of the vehicle, an appropriate volume of information can be provided to the driver for enabling the driver to recognize the situation and take decisions. In this way, according to the fifth embodiment, an excessive volume of information is prevented from being provided to the driver, thereby enabling achieving reduction in the load of the driver. Thus, according to the fifth embodiment, the driver can confirm the surroundings of the vehicle in a proper manner.

Sixth Embodiment

Figure 29:
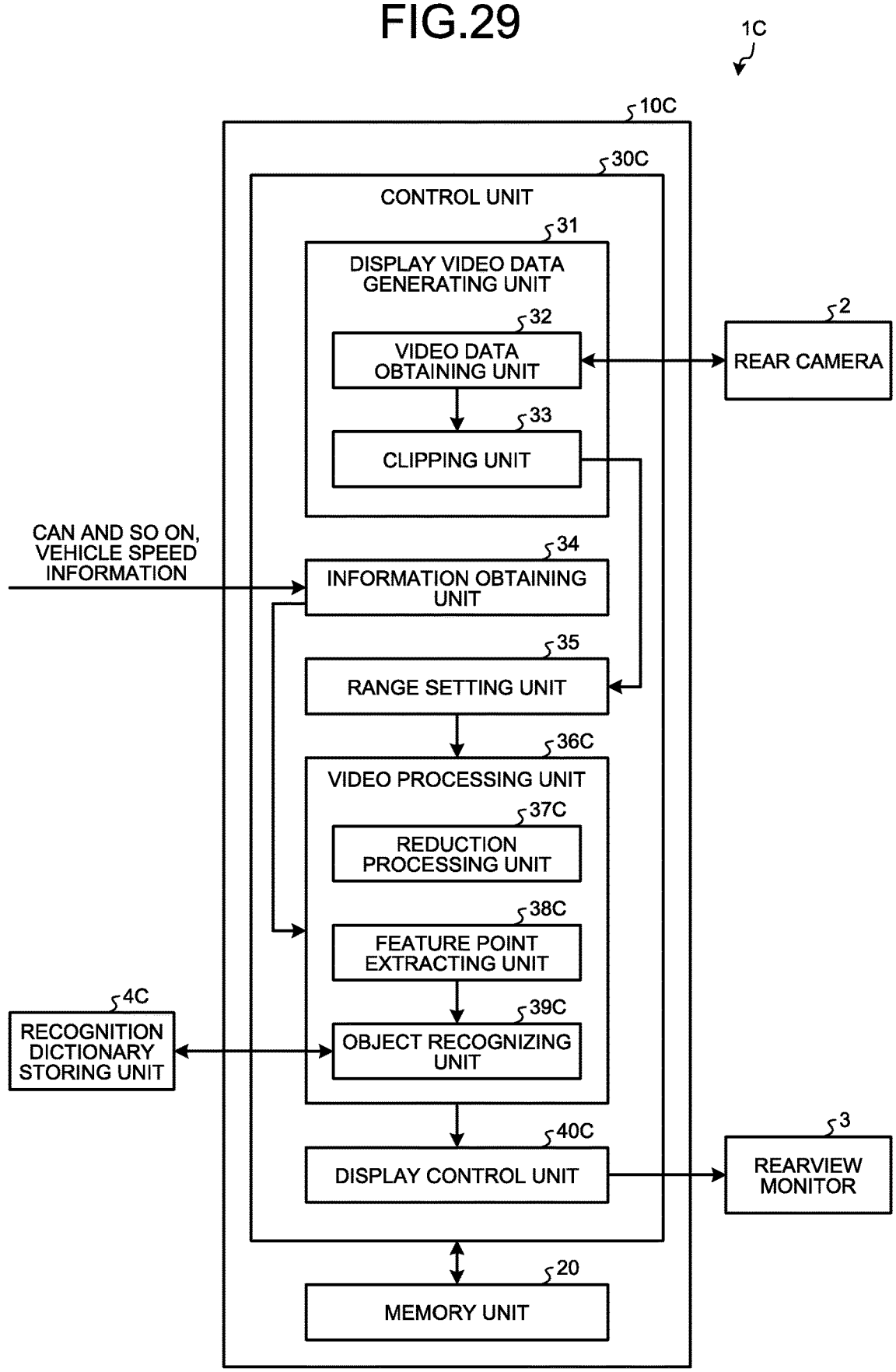
FIG. 29 is a block diagram illustrating an exemplary configuration of the in-vehicle display system according to a sixth embodiment.
Figure 30:
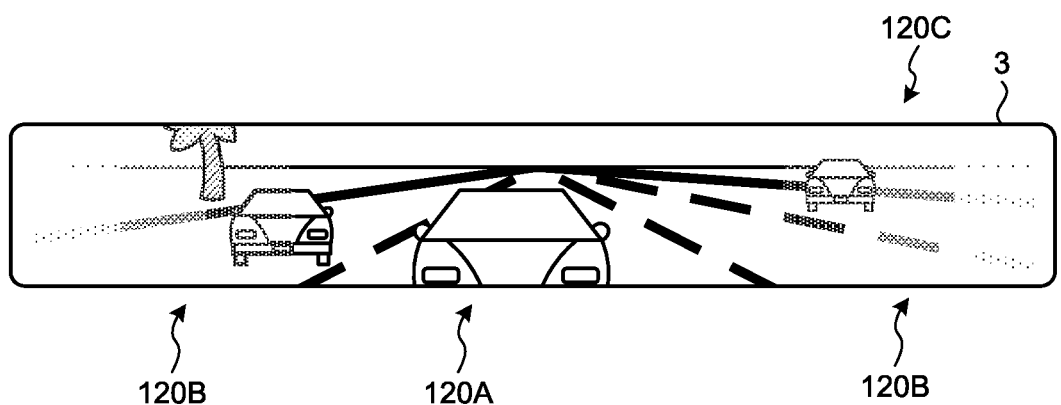
FIG. 30 is a diagram illustrating another example of the video displayed in the rearview monitor of the in-vehicle display system according to the sixth embodiment.
Figure 31:
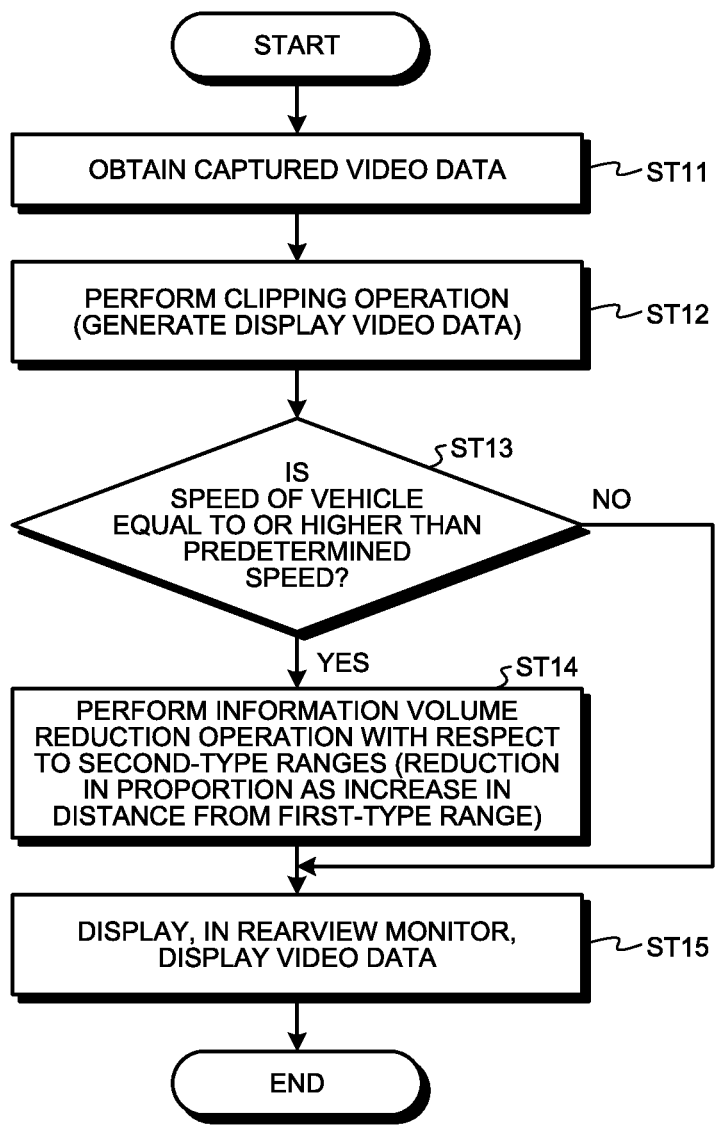
FIG. 31 is a flowchart for explaining a flow of operations performed in the in-vehicle display system according to the sixth embodiment.
Figure 32:
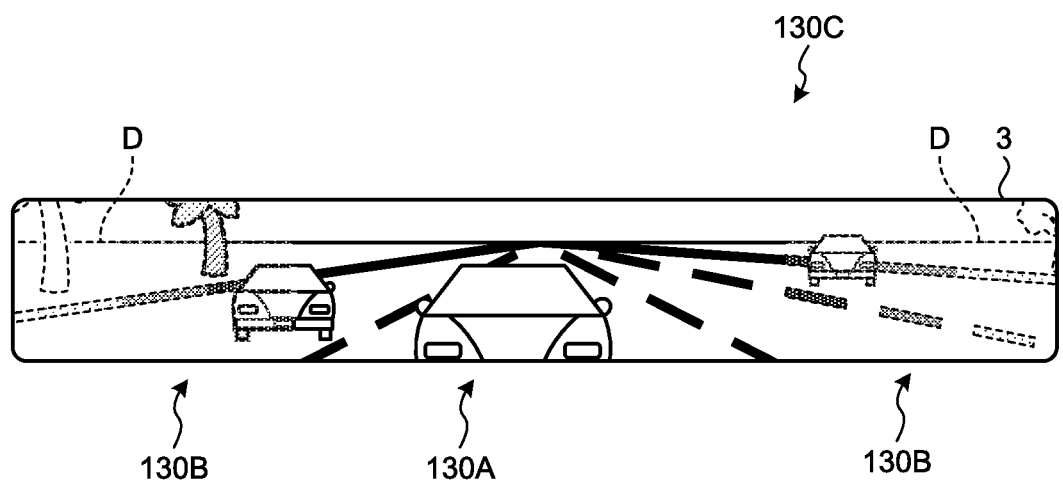
FIG. 32 is a diagram illustrating another example of the video displayed in the rearview monitor of the in-vehicle display system according to the sixth embodiment.
Figure 33:
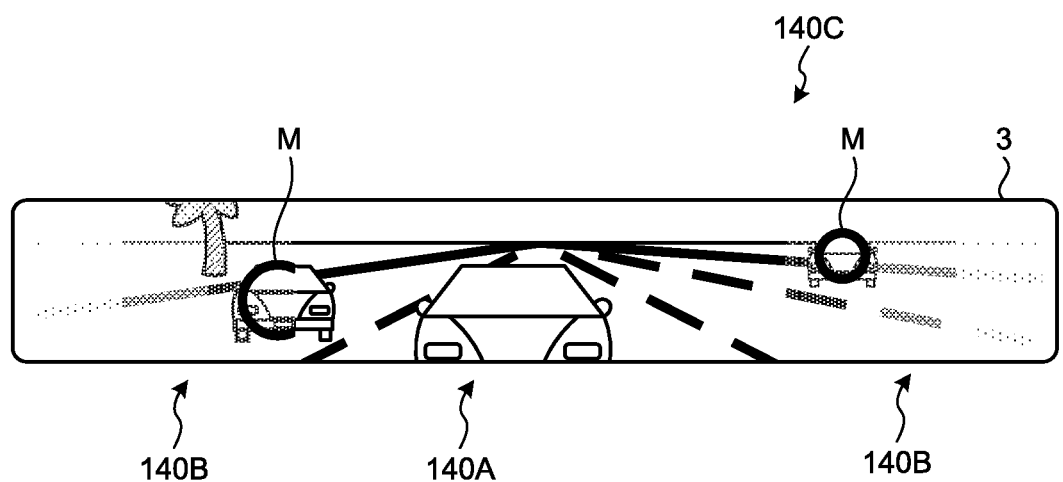
FIG. 33 is a diagram illustrating another example of the video displayed in the rearview monitor of the in-vehicle display system according to the sixth embodiment.

Explained below with reference to FIGS. 29 to 33 is an in-vehicle display system according to a sixth embodiment. FIG. 29 is a block diagram illustrating an exemplary configuration of the in-vehicle display system according to the sixth embodiment. FIG. 30 is a diagram illustrating another example of the video displayed in the rearview monitor of the in-vehicle display system according to the sixth embodiment. FIG. 31 is a flowchart for explaining a flow of operations performed in the in-vehicle display system according to the sixth embodiment. FIG. 32 is a diagram illustrating another example of the video displayed in the rearview monitor of the in-vehicle display system according to the sixth embodiment. FIG. 33 is a diagram illustrating another example of the video displayed in the rearview monitor of the in-vehicle display system according to the sixth embodiment.

An in-vehicle display system 1C includes the rear camera 2, the rearview monitor 3, a recognition dictionary storing unit 4C, and an in-vehicle display control device 10C.

A video processing unit 36C performs an information volume reduction operation that includes generating display video data 120C in which the volume of information of the second-type ranges 110B of the display video data 110 is reduced in proportion as an increase in the distance from the first-type range 110A, that is, reduced to a greater extent toward the outer side from the inner side in the vehicle width direction; and includes outputting the display video data 120C to a display control unit 40C. The display video data 120C contains the first-type range 120A not subjected to reduction in the volume of information, and contains the second-type ranges 120B having a reduced volume of information.

When the speed of the vehicle is equal to or higher than a predetermined speed, the video processing unit 36C generates the display video data 120C in which the volume of information of the second-type ranges 110B is reduced in proportion as an increase in the distance from the first-type range 110A, so that the information is narrowed down to the information required by and recognizable to the driver. More specifically, when the speed of the vehicle obtained by the information obtaining unit 34 is equal to or higher than the predetermined speed, the video processing unit 36C performs the information volume reduction operation that includes generating the display video data 120C in which, for example, as illustrated in FIG. 30, the volume of information of the second-type ranges 110B of the display video data 110 is reduced in proportion as an increase in the distance from the first-type range 110A; and includes outputting the display video data 120C to the display control unit 40C. In the display video data 120C, the volume of information is reduced to such an extent that the driver can recognize the presence or absence of the captured objects from the second-type ranges 120B.

When the speed of the vehicle is lower than the predetermined speed, the video processing unit 36C outputs the display video data 110 to the display control unit 40C. The video processing unit 36C includes a reduction processing unit 37C, a feature point extracting unit 38C, and an object recognizing unit 39C.

The reduction processing unit 37C performs the information volume reduction operation that includes, for example, a color information reduction operation for reducing color information of the second-type ranges 110B in proportion as an increase in the distance from the first-type range 110A and a brightness reduction operation for reducing brightness of the second-type ranges 110B in proportion as an increase in the distance from the first-type range 110A.

In the color information reduction operation, the display video data 120C is generated by reducing the color information of the second-type ranges 110B of the display video data 110 in proportion as an increase in the distance from the first-type range 110A, and the display video data 120C is output to the display control unit 40C. For example, in the color information reduction operation, the display video data 120C is generated in which the chromatic value of each of the RGB colors of the second-type ranges 110B of the display video data 110 is reduced by a predetermined ratio in proportion as an increase in the distance from the first-type range 110A, and the display video data 120C is output to the display control unit 40C. Alternatively, for example, in the color information reduction operation, the display video data 120C having simple colors or black and white colors can be generated in which the chromatic value of each of the RGB colors of the second-type ranges 110B of the display video data 110 is reduced by a predetermined ratio in proportion as an increase in the distance from the first-type range 110A, and the display video data 120C can be output to the display control unit 40C.

In the brightness reduction operation, the display video data 120C is generated in which the brightness of the second-type ranges 110B of the display video data 110 is reduced in proportion as an increase in the distance from the first-type range 110A, and the display video data 120C is output to the display control unit 40C. For example, in the brightness reduction operation, the display video data 120C is generated in which the luminosity of each pixel in the second-type ranges 110B of the display video data 110 is reduced by a predetermined ratio in proportion as an increase in the distance from the first-type range 110A, and the display video data 120C is output to the display control unit 40C. Alternatively, for example, in the brightness reduction operation, instead of generating the display video data 120C, a control signal can be generated that is meant for setting the backlight of the rearview monitor 3 corresponding to the first-type range 110A to the normal brightness and meant for reducing the backlight of the rearview monitor 3 corresponding to the second-type ranges 110B than the normal brightness by a predetermined ratio in proportion as an increase in the distance from the first-type range 110A, and the control signal can be output along with the display video data 110 to the display control unit 40C.

The feature point extracting unit 38C performs an information volume reduction operation that includes generating display video data 130C in which the feature points of the captured objects in the second-type ranges 120B are overlapped on the display video data 120C having a reduced volume of information, and includes outputting the display video data 130C to the display control unit 40C. The feature point extracting unit 38C implements a known feature point extraction method such as edge detection and, for example, extracts the contours of the captured objects as the feature points from the second-type ranges 110B of the display video data 110. Then, the feature point extracting unit 38C generates the display video data 130C in which, as illustrated in FIG. 32, dashed lines D representing the contours of the already-extracted captured objects are overlapped on the display video data 120C having a reduced volume of information. Then, the feature point extracting unit 38C outputs the display video data 130C to the object recognizing unit 39C.

The object recognizing unit 39C performs an information volume reduction operation that includes generating display video data 140C in which the objects present in the second-type ranges 120B of the display video data 120C, which has a reduced volume of information, are overlapped by the icons M (representing a display for indicating vehicles); and includes outputting the display video data 140C to the display control unit 40C. Then, the object recognizing unit 39C generates the display video data 140C in which the detected objects present in the display video data 120C, which has a reduced volume of information as illustrated in FIG. 33, are overlapped by the icons M; and outputs the display video data 140C to the display control unit 40C. Since the object recognizing unit 39C performs pattern matching with respect to the display video data 120C having a reduced volume of information, it becomes possible to reduce the load and the time required for the processing.

In the information volume reduction operation, at least either the color information reduction operation or the brightness reduction operation is appropriately combined with at least either the operation performed by the feature point extracting unit 38C or the operation performed by the object recognizing unit 39C.

The display control unit 40C causes the rearview monitor 3 to display either the display video data 110, or the display video data 120C, or the display video data 130C, or the display video data 140C as output from the video processing unit 36C.

Explained below with reference to FIG. 31 is a flow of operations performed by a control unit 30C.

The video data obtaining unit 32 of the control unit 30C obtains the captured video data 100 (Step ST11).

The clipping unit 33 of the control unit 30C performs a clipping operation (Step ST12). More specifically, the clipping unit 33 of the control unit 30C clips, from the captured video data 100, the range to be displayed in the rearview monitor 3 as the display video data 110.

The video processing unit 36C of the control unit 30C determines whether or not the speed of the vehicle is equal to or higher than a predetermined speed (Step ST13). More specifically, based on the information obtained by the information obtaining unit 34, the video processing unit 36C of the control unit 30C determines whether or not the speed of the vehicle is equal to or higher than the predetermined speed. In the sixth embodiment, the predetermined speed is set to, for example, 20 km/h.

If the video processing unit 36C of the control unit 30C determines that the speed of the vehicle is not equal to or higher than the predetermined speed (No at Step ST13), then the system control proceeds to Step ST15. Moreover, the video processing unit 36C of the control unit 30C outputs the display video data 110 to the display control unit 40C.

If the video processing unit 36C of the control unit 30C determines that the speed of the vehicle is equal to or higher than the predetermined speed (Yes at Step ST13), then the system control proceeds to Step ST14.

The video processing unit 36C of the control unit 30C performs the information volume reduction operation with respect to the second-type ranges 110B of the display video data 110 (Step ST14). More specifically, the reduction processing unit 37C in the control unit 30C performs the information volume reduction operation that includes generating the display video data 120C in which the volume of information of the second-type ranges 110B is reduced in proportion as an increase in the distance from the first-type range 110A of the display video data 110, and includes outputting the display video data 120C to the display control unit 40C. Moreover, the feature point extracting unit 38C in the control unit 30C can generate the display video data 130C in which the feature points of the captured objects are overlapped on the display video data 120C having a reduced volume of information, and can output the display video data 130C to the display control unit 40C. Furthermore, the control unit 30C can generate the display video data 140C in which the objects present in the display video data 120C, which has a reduced volume of information, are overlapped by the icons M; and can output the display video data 140C to the display control unit 40C.

The display control unit 40C of the control unit 30C causes the rearview monitor 3 to display either the display video data 110, or the display video data 120C, or the display video data 130C, or the display video data 140C (Step ST15).

More particularly, when the speed of the vehicle is lower than the predetermined speed, the display control unit 40C of the control unit 30C causes the rearview monitor 3 to display the display video data 110 as illustrated in FIG. 7. When the speed of the vehicle is lower than the predetermined speed, the driver can obtain information from a wider range than the convention optical rearview mirror R.

More particularly, when the speed of the vehicle is equal to or higher than the predetermined speed, the display control unit 40C of the control unit 30C causes the rearview monitor 3 to display the display video data 120C having a reduced volume of information of the second-type ranges 120B as illustrated in FIG. 30.

Alternatively, more particularly, when the speed of the vehicle is equal to or higher than the predetermined speed, the display control unit 40C of the control unit 30C can cause the rearview monitor 3 to display the display video data 130C as illustrated in FIG. 32 in which the first-type range 130A is not subjected to reduction in the volume of information but in which the second-type ranges 130B are subjected to reduction in the volume of information and are overlapped by the feature points.

Still alternatively, more particularly, when the speed of the vehicle is equal to or higher than the predetermined speed, the display control unit 40C of the control unit 30C causes the rearview monitor 3 to display the display video data 140C as illustrated in FIG. 33 in which the first-type range 140A is not subjected to reduction in the volume of information but in which the second-type ranges 140B are subjected to reduction in the volume of information and have the objects overlapped by the icons M.

The control unit 30C repeatedly performs such operations, for example, on a frame-by-frame basis or at predetermined intervals such as after every predetermined number of frames.

As described above, according to the sixth embodiment, when the speed of the vehicle is equal to or higher than the predetermined speed, either the display video data 120C in which the volume of information of the second-type ranges 120B is reduced in proportion as an increase in the distance from the first-type range 110A is displayed in the rearview monitor 3, or the display video data 130C in which the volume of information of the second-type ranges 130B is reduced in proportion as an increase in the distance from the first-type range 110A is displayed in the rearview monitor 3, or the display video data 140C in which the volume of information of the second-type ranges 140B is reduced in proportion as an increase in the distance from the first-type range 110A is displayed in the rearview monitor 3. Hence, even if the speed of the vehicle is equal to or higher than the predetermined speed, either the display video data 120C, or the display video data 130C, or the display video data 140C having the volume of information reduced to an easily-recognizable level for the driver is appropriately displayed in the rearview monitor 3. In this way, according to the sixth embodiment, the surroundings of the vehicle can be confirmed in a proper manner.

According to the sixth embodiment, when the speed of the vehicle is equal to or higher than the predetermined speed, the information volume reduction operation is performed with respect to the second-type ranges 110B of the display video data 110. In other words, according to the sixth embodiment, the first-type range 110A that is viewable when the driver looks straight at the conventional optical rearview mirror R is not subjected to reduction in the volume of information regardless of the speed of the vehicle. Hence, in the sixth embodiment, the rearward portion can be confirmed at any time in an identical manner to the case of looking at the conventional optical rearview mirror R.

According to the sixth embodiment, when the speed of the vehicle is lower than the predetermined speed, the information volume reduction operation is not performed. Hence, when the speed of the vehicle is lower than the predetermined speed, the second-type ranges 110B that are wider toward the outer side than the first-type range 110A, which is viewable when the driver looks straight at the conventional optical rearview mirror R, are also not subjected to reduction in the volume of information and are displayed without modification in the rearview monitor 3. In this way, according to the sixth embodiment, when the speed of the vehicle is lower than the predetermined speed, the rearward portion can be displayed over a wider range than in the conventional optical rearview mirror R. Hence, according to the sixth embodiment, the surroundings of the vehicle can be confirmed in a proper manner.

According to the sixth embodiment, when the speed of the vehicle is equal to or higher than the predetermined speed; the display video data 130C, which is generated by drawing the feature points using the dashed lines D on the display video data 120C having a reduced volume of information, is displayed in the rearview monitor 3. Thus, the display video data 130C, in which the volume of information of the second-type ranges 130B is reduced and the dashed lines D representing the feature points of the objects are overlapped, is displayed in the rearview monitor 3. Hence, in the sixth embodiment, the objects present in the second-type ranges 130B, which have a reduced volume of information, can be displayed in an easily-recognizable manner. As a result, in the sixth embodiment, even if the color information or the brightness is reduced, the captured objects can be made to be easily recognizable. In this way, according to the sixth embodiment, the surroundings of the vehicle can be confirmed in a proper manner.

According to the sixth embodiment, when the vehicle speed is equal to or higher than the predetermined speed, the display video data 140C, which is generated by overlapping the icons M on the display video data 120C having a reduced volume of information, is displayed in the rearview monitor 3. Thus, the display video data 140C, in which the volume of information of the second-type ranges 140B is reduced and the icons M are overlapped, is displayed in the rearview monitor 3. Hence, in the sixth embodiment, the objects present in the second-type ranges 140B, which have a reduced volume of information, can be displayed in an easily-recognizable manner. As a result, in the sixth embodiment, even if the color information or the brightness is reduced, the captured objects can be made to be easily recognizable. In this way, according to the sixth embodiment, the surroundings of the vehicle can be confirmed in a proper manner.

Seventh Embodiment

Figure 34:
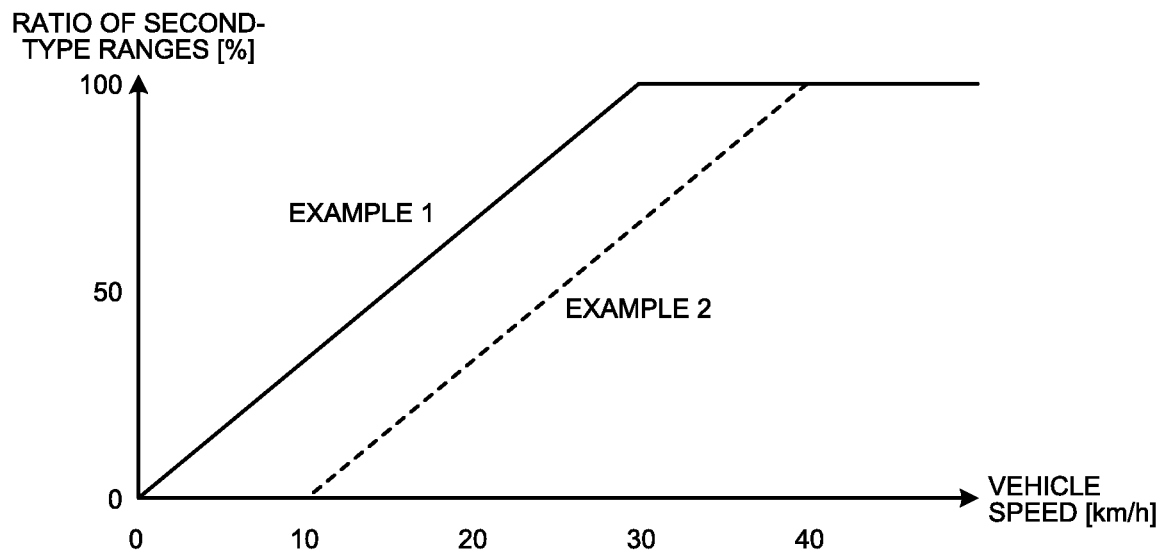
FIG. 34 is a diagram illustrating an example of a second-type range ratio table in the in-vehicle display system according to a seventh embodiment.
Figure 35:
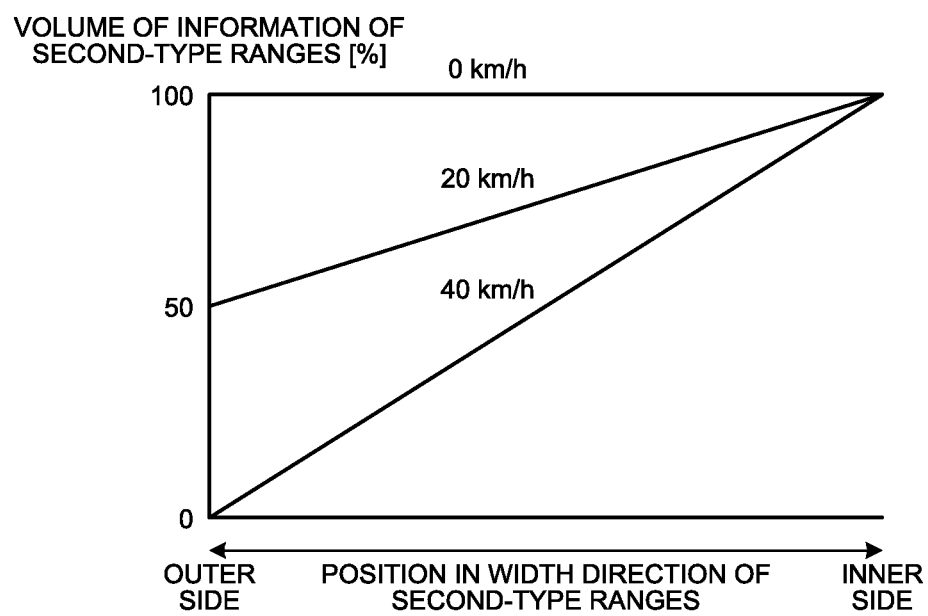
FIG. 35 is a diagram illustrating an example of a reduction degree table in the in-vehicle display system according to the seventh embodiment.
Figure 36:
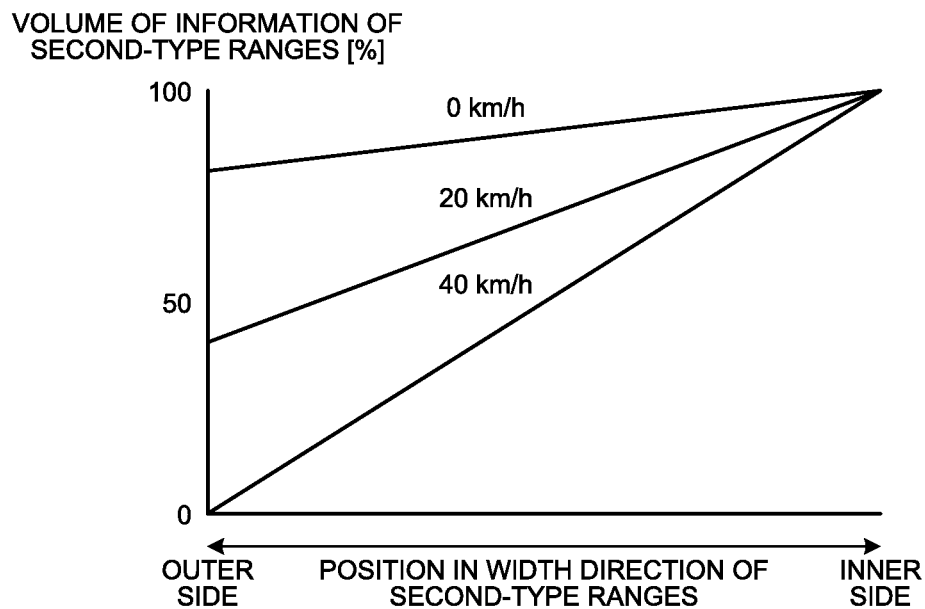
FIG. 36 is a diagram illustrating an example of the reduction degree table in the in-vehicle display system according to the seventh embodiment.
Figure 37:
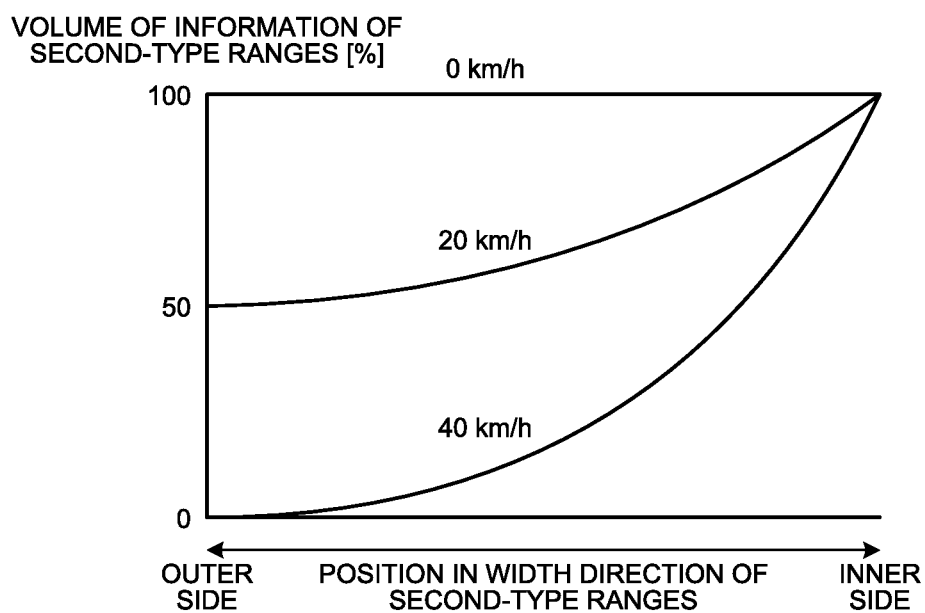
FIG. 37 is a diagram illustrating an example of the reduction degree table in the in-vehicle display system according to the seventh embodiment.
Figure 38:
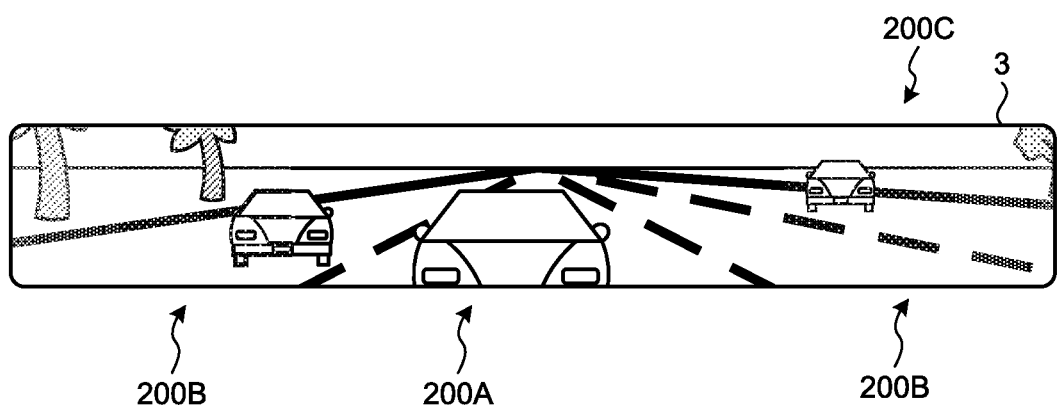
FIG. 38 is a diagram illustrating an example of the video displayed in the rearview monitor of the in-vehicle display system according to the seventh embodiment.
Figure 39:
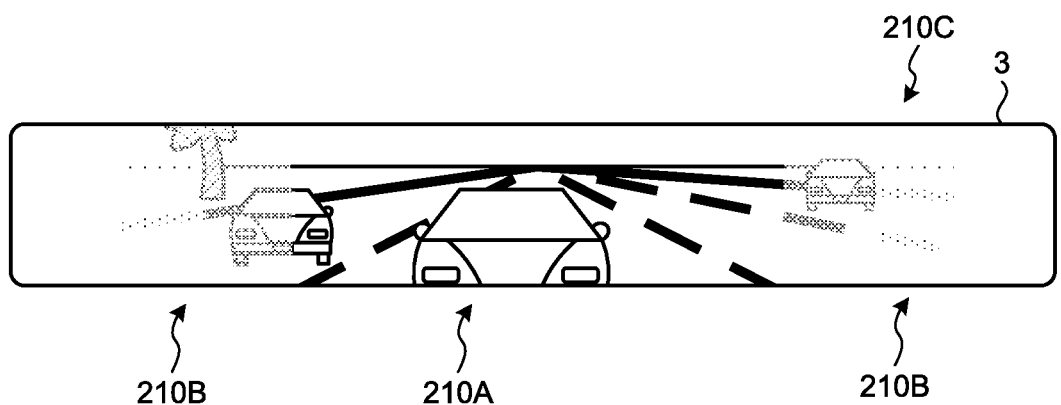
FIG. 39 is a diagram illustrating another example of the video displayed in the rearview monitor of the in-vehicle display system according to the seventh embodiment.
Figure 40:
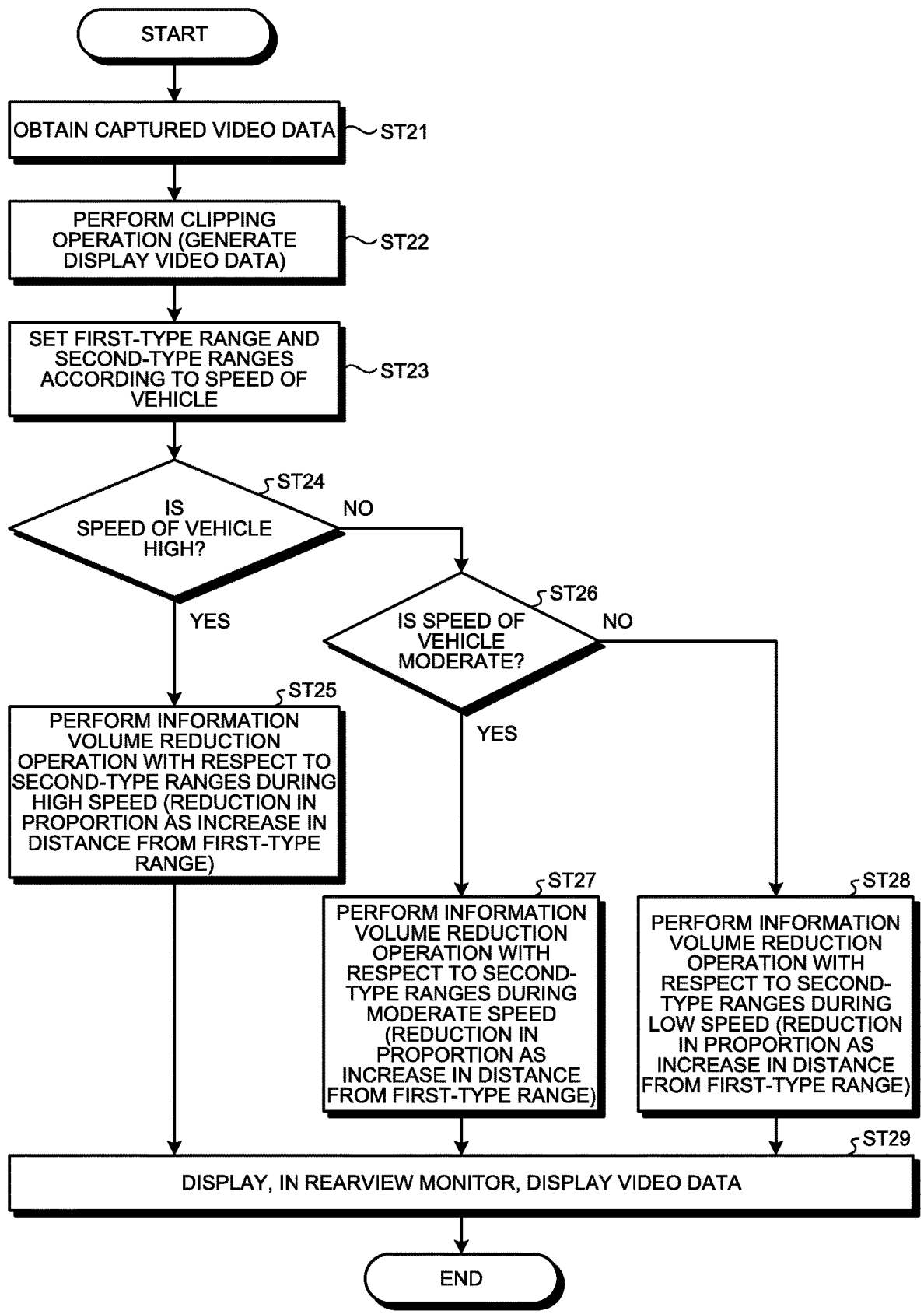
FIG. 40 is a flowchart for explaining a flow of operations performed in the in-vehicle display system according to the seventh embodiment.

Explained below with reference to FIGS. 34 to 40 is an in-vehicle display system according to a seventh embodiment. FIG. 34 is a diagram illustrating an example of a second-type range ratio table in the in-vehicle display system according to the seventh embodiment. FIG. 35 is a diagram illustrating an example of a reduction degree table in the in-vehicle display system according to the seventh embodiment. FIG. 36 is a diagram illustrating an example of the reduction degree table in the in-vehicle display system according to the seventh embodiment. FIG. 37 is a diagram illustrating an example of the reduction degree table in the in-vehicle display system according to the seventh embodiment. FIG. 38 is a diagram illustrating an example of the video displayed in the rearview monitor of the in-vehicle display system according to the seventh embodiment. FIG. 39 is a diagram illustrating another example of the video displayed in the rearview monitor of the in-vehicle display system according to the seventh embodiment. FIG. 40 is a flowchart for explaining a flow of operations performed in the in-vehicle display system according to the seventh embodiment.

In the in-vehicle display system according to the seventh embodiment, the operations performed by the control unit 30C are different than the operations performed in the in-vehicle display system 1C according to the sixth embodiment. Apart from that, the configuration is identical to the in-vehicle display system 1C according to the sixth embodiment.

The range setting unit 35 sets the first-type range 110A and the second-type ranges 110B of the display video data 110 according to the speed of the vehicle. Based on the vehicle speed information obtained by the information obtaining unit 34, the range setting unit 35 sets the first-type range 110A to be wider in proportion as a decrease in the speed of the vehicle. More specifically, the range setting unit 35 sets the ratio of the second-type ranges 110B based on the second-type range ratio table stored in advance in the memory unit 20.

The second-type range ratio table indicates the relationship between the speed of the vehicle and the ratio of the second-type ranges 110B. In the seventh embodiment, the ratio of the second-type ranges 110B of the display video data 110 is assumed to be 0% when the second-type ranges 110B have the width of 0 mm in the vehicle width direction and is assumed to be 100% when the second-type ranges 110B have the width of 100 mm in the vehicle width direction. As the second-type ranges 110B become smaller, the first-type range 110A becomes wider toward the outer side in the vehicle width direction. More specifically, when the ratio of the second-type ranges 110B is 0%, the first-type range 110A has the width of 400 mm in the vehicle width direction. When the ratio of the second-type ranges 110B is 100%, the first-type range 110A has the width of 200 mm in the vehicle width direction.

Explained below with reference to FIG. 34 is an example of the second-type range ratio table. In the second-type range ratio table illustrated in FIG. 34, a relationship of two patterns of the speed of the vehicle, namely, a pattern example 1 and a pattern example 2, with the ratio of the second-type ranges 110B is defined. More specifically, in the pattern example 1, in the range from 0 km/h to 30 km/h of the speed of the vehicle, the ratio of the second-type ranges 110B undergoes linear variation between 0% and 100%. At the vehicle speed equal to or higher than 30 km/h, the ratio of the second-type ranges 110B becomes constant at 100%. In the pattern example 2, in the range from 10 km/h to 40 km/h of the speed of the vehicle, the ratio of the second-type ranges 110B undergoes linear variation between 0% and 100%. At the vehicle speed equal to or higher than 40 km/h, the ratio of the second-type ranges 110B becomes constant at 100%.

Alternatively, in the second-type range ratio table, the vehicle speed and the ratio of the second-type ranges 110B can undergo variation in a staircase pattern. Still alternatively, in the second-type range ratio table, the vehicle speed and the ratio of the second-type ranges 110B can undergo nonlinear variation.

For example, the range setting unit 35 selects, according to the running condition of the vehicle and the characteristics of the driver, the pattern example 1 or the pattern example 2 from the second-type range ratio table illustrated in FIG. 34; and, based on the relationship between the speed of the vehicle and the second-type ranges 110B in the selected pattern, sets the first-type range 110A and the second-type ranges 110B according to the speed of the vehicle.

The range setting unit 35 can have different ratios of the second-type ranges 110B at the time of deceleration and at the time of acceleration. For example, the range setting unit 35 can select the pattern example 1 in the second-type range ratio table illustrated in FIG. 34 at the time of deceleration;

can select the pattern example 2 in the second-type range ratio table illustrated in FIG. 34 at the time of acceleration; and can set the first-type range 110A and the second-type ranges 110B according to the speed of the vehicle.

Based on the vehicle speed information obtained by the information obtaining unit 34, the video processing unit 36C performs the information volume reduction operation in such a way that, higher the speed of the vehicle, the greater is the degree of reduction by which the volume of information of the second-type ranges 110B is reduced in proportion as an increase in the distance from the first-type range 110A of the display video data 110.

The reduction processing unit 37C generates the display video data 120C by reducing, by the degree of reduction according to the speed of the vehicle, the volume of information of the second-type ranges 110B of the display video data 110 in proportion as an increase in the distance from the first-type range 110A; and outputs the display video data 120C to the display control unit 40C. More specifically, based on the reduction degree table stored in advance in the memory unit 20 and illustrated in, for example, FIGS. 35 to 37, the reduction processing unit 37C sets the degree of reduction in the vehicle width direction for reducing the volume of information of the second-type ranges 110B.

In the reduction degree table, the relationship between the positions in the vehicle width direction in the second-type ranges 110B and the volume of information of the second-type ranges 110B (i.e., the degree of reduction of the volume of information of the second-type ranges 110B with respect to the vehicle width direction) is illustrated for each speed of the vehicle. In the seventh embodiment, the volume of information of the second-type ranges 110B is assumed to be 100% when not subjected to reduction, and is assumed to be 0% when reduced to be equal to zero as non-displayable information.

Explained below with reference to 35 is an example of the reduction degree table. In the reduction degree table illustrated in FIG. 35, the relationship between the positions in the vehicle width direction (the width direction) of the second-type ranges 110B and the volume of information of the second-type ranges 110B is defined for the vehicle speeds of 0 km/h, 20 km/h, and 40 km/h. More specifically, in the pattern of having the vehicle speed of 0 km/h, the volume of information of the second-type ranges 110B is constant at 100% regardless of the positions in the vehicle width direction of the second-type ranges 110B. In the pattern of having the vehicle speed of 20 km/h, the volume of information undergoes linear variation between 50% and 100% from the outer side toward the inner side of the second-type ranges 110B. In the pattern of having the vehicle speed of 40 km/h, the volume of information undergoes linear variation between 0% and 100% from the outer side toward the inner side of the second-type ranges 110B.

Explained below with reference to FIG. 36 is an example of the reduction degree table. In the reduction degree table illustrated in FIG. 36, the relationship between the positions in the vehicle width direction (the width direction) of the second-type ranges 110B and the volume of information of the second-type ranges 110B is defined for the vehicle speeds of 0 km/h, 20 km/h, and 40 km/h. More specifically, in the pattern of having the vehicle speed of 0 km/h, the volume of information of the second-type ranges 110B undergoes linear variation between 80% and 100% from the outer side toward the inner side in the vehicle width direction of the second-type ranges 110B. In the pattern of having the vehicle speed of 20 km/h, the volume of information of the second-type ranges 110B undergoes linear variation between 40% and 100% from the outer side toward the inner side in the vehicle width direction of the second-type ranges 110B. In the pattern of having the vehicle speed of 40 km/h, the volume of information of the second-type ranges 110B undergoes linear variation between 0% and 100% from the outer side toward the inner side in the vehicle width direction of the second-type ranges 110B.

Explained below with reference to FIG. 37 is an example of the reduction degree table. In the reduction degree table illustrated in FIG. 37, the relationship between the positions in the vehicle width direction (the width direction) of the second-type ranges 110B and the volume of information of the second-type ranges 110B is defined for the vehicle speeds of 0 km/h, 20 km/h, and 40 km/h. More specifically, in the pattern of having the vehicle speed of 0 km/h, the volume of information of the second-type ranges 110B is constant at 100% regardless of the positions in the vehicle width direction of the second-type ranges 110B. In the pattern of having the vehicle speed of 20 km/h, the volume of information undergoes linear variation between 50% and 100% from the outer side toward the inner side of the second-type ranges 110B. In the pattern of having the vehicle speed of 40 km/h, the volume of information undergoes linear variation between 0% and 100% from the outer side toward the inner side of the second-type ranges 110B.

Meanwhile, alternatively, in the reduction degree table, the positions in the vehicle width direction of the second-type ranges 110B and the volume of information of the second-type ranges 110B can undergo variation in a staircase pattern. Still alternatively, in the reduction degree table, the positions in the vehicle width direction of the second-type ranges 110B and the volume of information of the second-type ranges 110B can undergo nonlinear variation.

For example, the reduction processing unit 37C selects, according to the running condition of the vehicle and the characteristics of the driver, the reduction degree table illustrated in any one of FIGS. 35 to 37 and, based on the selected table, sets the degree of reduction of the volume of information of the second-type ranges 110B with respect to the vehicle width direction according to the speed of the vehicle.

The reduction processing unit 37C can set different variations, at the time of deceleration and at the time of acceleration, in the degree of reduction of the volume of information of the second-type ranges 110B with respect to the vehicle width direction. For example, the reduction processing unit 37C can select the reduction degree table illustrated in FIG. 35 at the time of deceleration; can select the reduction degree table illustrated in FIG. 36 at the time of deceleration; and can set the degree of reduction of the volume of information of the second-type ranges 110B with respect to the vehicle width direction according to the speed of the vehicle.

More particularly, the following explanation is given for a case in which, at the time of setting the degree of reduction of the volume of information of the second-type ranges 110B with respect to the vehicle width direction according to the speed of the vehicle, the reduction processing unit 37C uses the reduction degree table illustrated in FIG. 35.

For example, when the speed of the vehicle is equal to 0 km/h, the reduction processing unit 37C sets the volume of information of the second-type ranges 110B to 100%. In this case, as illustrated in FIG. 7, there is no reduction in the volume of information of the second-type ranges 110B of the display video data 110.

For example, when the speed of the vehicle is equal to 20 km/h, the reduction processing unit 37C reduces the volume of information of the second-type ranges 110B with respect to the vehicle width direction from 100% to 50% in proportion as an increase in the distance from the first-type range 110A. In this case, as illustrated in FIG. 38, in display video data 200C, the volume of information of the second-type ranges 200B is reduced from 100% to 50% in proportion as an increase in the distance from a first-type range 110A.

For example, when the speed of the vehicle is equal to 40 km/h, the reduction processing unit 37C reduces the volume of information of the second-type ranges 110B with respect to the vehicle width direction from 100% to 0% in proportion as an increase in the distance from the first-type range 110A. In this case, as illustrated in FIG. 39, in display video data 210C, the volume of information of the second-type ranges 210B is reduced from 100% to 50% in proportion as an increase in the distance from a first-type range 110A. In the display video data 210C, the degree of reduction of the volume of information of the second-type ranges 210B with respect to the vehicle width direction is greater as compared to the second-type ranges 200B of the display video data 200C.

Explained below with reference to FIG. 40 is a flow of operations performed by the control unit 30.

The video data obtaining unit 32 of the control unit 30 obtains the captured video data 100 (Step ST21). The operation performed at Step ST21 is identical to the operation performed at Step ST11.

The clipping unit 33 of the control unit 30 performs a clipping operation (Step ST22). The operation performed at Step ST22 is identical to the operation performed at Step ST12.

The range setting unit 35 of the control unit 30 sets the first-type range 110A and the second-type ranges 110B of the display video data 110 according to the speed of the vehicle (Step ST23). More specifically, based on the second-type range ratio table and based on the information obtained by the information obtaining unit 34, the range setting unit 35 of the control unit 30 obtains the ratio of the second-type ranges 110B corresponding to the speed of the vehicle. Then, the range setting unit 35 of the control unit 30 sets the second-type ranges 110B of the display video data 110 to have the obtained ratio of the second-type ranges 110B.

More particularly, using the pattern example 1 in the second-type range ratio table illustrated in FIG. 34, when the speed of the vehicle is 0 km/h, the range setting unit 35 sets the ratio of the second-type ranges 110B of the display video data 110 to 0%.

More particularly, using the pattern example 1 in the second-type range ratio table illustrated in FIG. 34, when the speed of the vehicle is 20 km/h, the range setting unit 35 sets the ratio of the second-type ranges 110B of the display video data 110 to 60%.

More particularly, using the pattern example 1 in the second-type range ratio table illustrated in FIG. 34, when the speed of the vehicle is 40 km/h, the range setting unit 35 sets the ratio of the second-type ranges 110B of the display video data 110 to 100%.

The video processing unit 36C of the control unit 30 determines whether or not the speed of the vehicle is high (Step ST24). In the seventh embodiment, a speed of 30 km/h or higher is considered to be a high speed.

If the video processing unit 36C of the control unit 30 determines that the speed of the vehicle is high (Yes at Step ST24), then the system control proceeds to Step ST25.

If the video processing unit 36C of the control unit 30 determines that the speed of the vehicle is not high (No at Step ST24), then the system control proceeds to Step ST26.

The video processing unit 36C of the control unit 30 performs the information volume reduction operation with respect to the second-type images 110B of the display video data 110 during a high speed (Step ST25). More specifically, based on the relationship between the positions in the vehicle width direction in the second-type ranges 110B and the volume of information of the second-type ranges 110B as stored in the memory unit 20, the reduction processing unit 37C in the control unit 30 sets the degree of reduction of the volume of information of the second-type ranges 110B with respect to the vehicle width direction during a high speed. Then, the reduction processing unit 37C in the control unit 30 performs the information volume reduction operation that includes generating display video data in which the volume of information of the second-type ranges 110B of the display video data 110 is reduced based on the values set in proportion as an increase in the distance from the first-type range 110A, and includes outputting the display video data to the display control unit 40C. Moreover, the feature point extracting unit 38C in the control unit 30 can generate display video data by overlapping the feature points of the second-type ranges 110B of the display video data 110, and output the display video data to the display control unit 40C. Furthermore, the control unit 30 can generate display video data by overlapping the icons M on the objects present in the second-type ranges of the video data recognized by the object recognizing unit 39C, and output the display video data to the display control unit 40C.

The video processing unit 36C of the control unit 30 determines whether or not the speed of the vehicle is moderate (Step ST26). In the seventh embodiment, for example, a speed equal to or higher than 20 km/h but lower than 30 km/h is considered to be a moderate speed.

If the video processing unit 36C of the control unit 30 determines that the speed of the vehicle is moderate (Yes at Step ST26), then the system control proceeds to Step ST27.

If the video processing unit 36C of the control unit 30 determines that the speed of the vehicle is not moderate (No at Step ST26), then the system control proceeds to Step ST28.

The reduction processing unit 37C in the control unit 30 performs the information volume reduction operation with respect to the second-type ranges 110B of the display video data 110 during a moderate speed (Step ST27). More specifically, based on the relationship between the positions in the vehicle width direction in the second-type ranges 110B and the volume of information of the second-type ranges 110B as stored in the memory unit 20, the reduction processing unit 37C in the control unit 30 sets the degree of reduction of the volume of information of the second-type ranges 110B with respect to the vehicle width direction during a moderate speed. Then, the reduction processing unit 37C in the control unit 30 performs the information volume reduction operation that includes generating display video data in which the volume of information of the second-type ranges 110B of the display video data 110 is reduced based on the values set in proportion as an increase in the distance from the first-type range 110A, and includes outputting the display video data to the display control unit 40C. Moreover, the feature point extracting unit 38C in the control unit 30 can generate display video data by overlapping the feature points of the second-type ranges 110B of the display video data 110, and output the display video data to the display control unit 40C. Furthermore, the control unit 30 can generate display video data by overlapping the icons M on the objects present in the second-type ranges of the video data recognized by the object recognizing unit 39C, and output the display video data to the display control unit 40C.

The reduction processing unit 37C in the control unit 30 performs the information volume reduction operation with respect to the second-type ranges 110B of the display video data 110 during a low speed (Step ST28). More specifically, based on the relationship between the positions in the vehicle width direction in the second-type ranges 110B and the volume of information of the second-type ranges 110B as stored in the memory unit 20, the reduction processing unit 37C in the control unit 30 sets the degree of reduction of the volume of information of the second-type ranges 110B with respect to the vehicle width direction during a low speed. Then, the reduction processing unit 37C in the control unit 30 performs the information volume reduction operation that includes generating display video data in which the volume of information of the second-type ranges 110B of the display video data 110 is reduced based on the values set in proportion as an increase in the distance from the first-type range 110A, and includes outputting the display video data to the display control unit 40C. Moreover, the feature point extracting unit 38C in the control unit 30 can generate display video data by overlapping the feature points of the second-type ranges 110B of the display video data 110, and output the display video data to the display control unit 40C. Furthermore, the control unit 30 can generate display video data by overlapping the icons M on the objects present in the second-type ranges of the video data recognized by the object recognizing unit 39C, and output the display video data to the display control unit 40C.

The display control unit 40C of the control unit 30 causes the rearview monitor 3 to display the display video data (Step ST29). The operation performed at Step ST29 is identical to the operation performed at Step ST15.

As described above, in the seventh embodiment, the degree of reduction of the volume of information of the second-type ranges 110B of the display video data 110 with respect to the vehicle width direction is varied according to the speed of the vehicle so that, higher the speed of the vehicle, the greater becomes the degree of reduction thereby resulting in reduction in the volume of information of the second-type ranges 110B in proportion as an increase in the distance from the first-type range 110A. Hence, according to the seventh embodiment, the display video data of an easily-recognizable volume of information for the driver can be appropriately displayed in the rearview monitor 3 according to the speed of the vehicle. In other words, in the seventh embodiment, according to the speed of the vehicle, an appropriate volume of information can be provided to the driver for enabling the driver to recognize the situation and take decisions. In this way, according to the seventh embodiment, an excessive volume of information is prevented from being provided to the driver, thereby enabling achieving reduction in the load of the driver. Thus, according to the seventh embodiment, the driver can confirm the surroundings of the vehicle in a proper manner.

Eighth Embodiment

Figure 41:
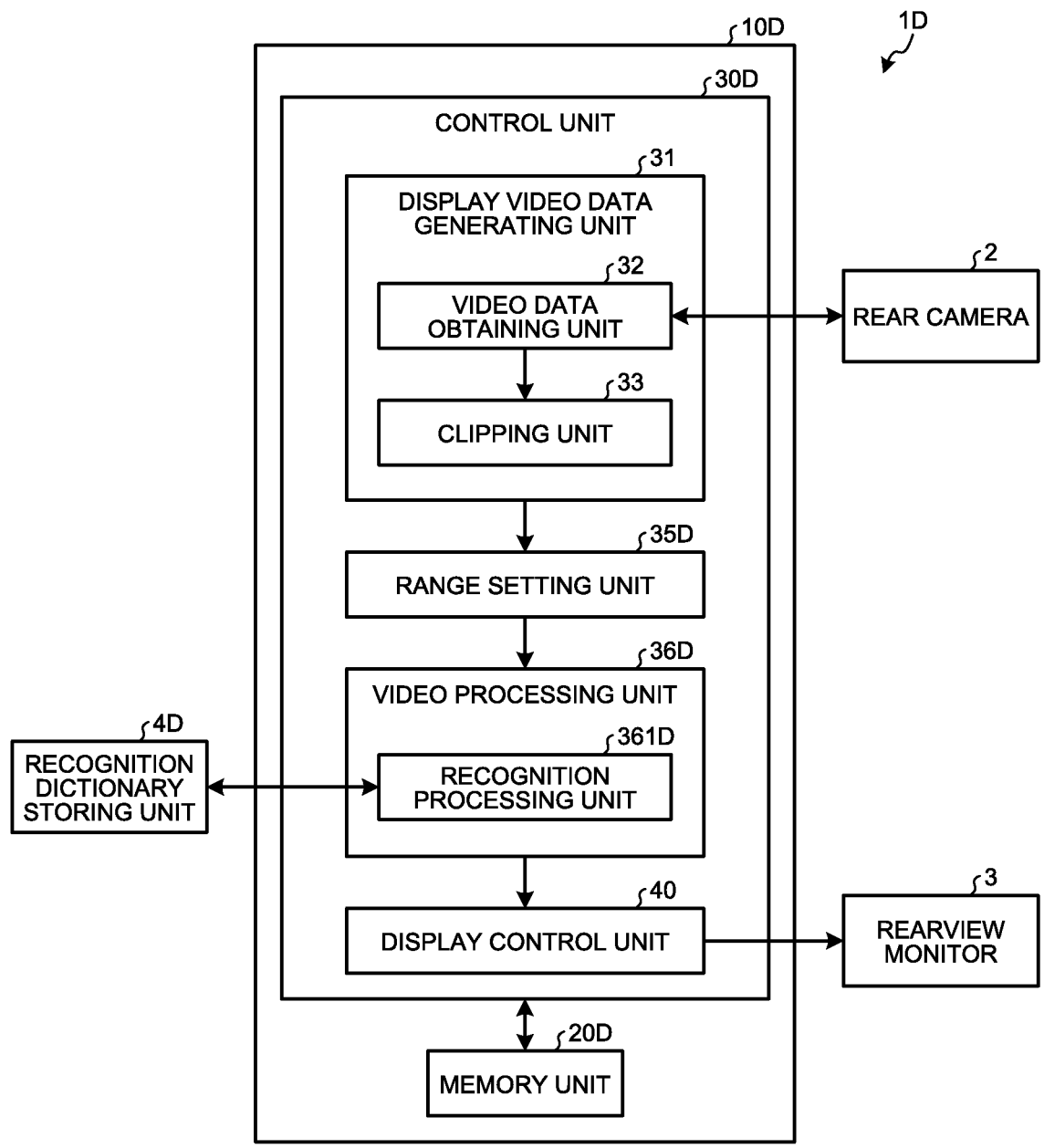
FIG. 41 is a block diagram illustrating an exemplary configuration of the in-vehicle display system according to an eighth embodiment.
Figure 42:
FIG. 42 is a diagram illustrating an example of an operation definition table in the in-vehicle display system according to the eighth embodiment.
Figure 43:
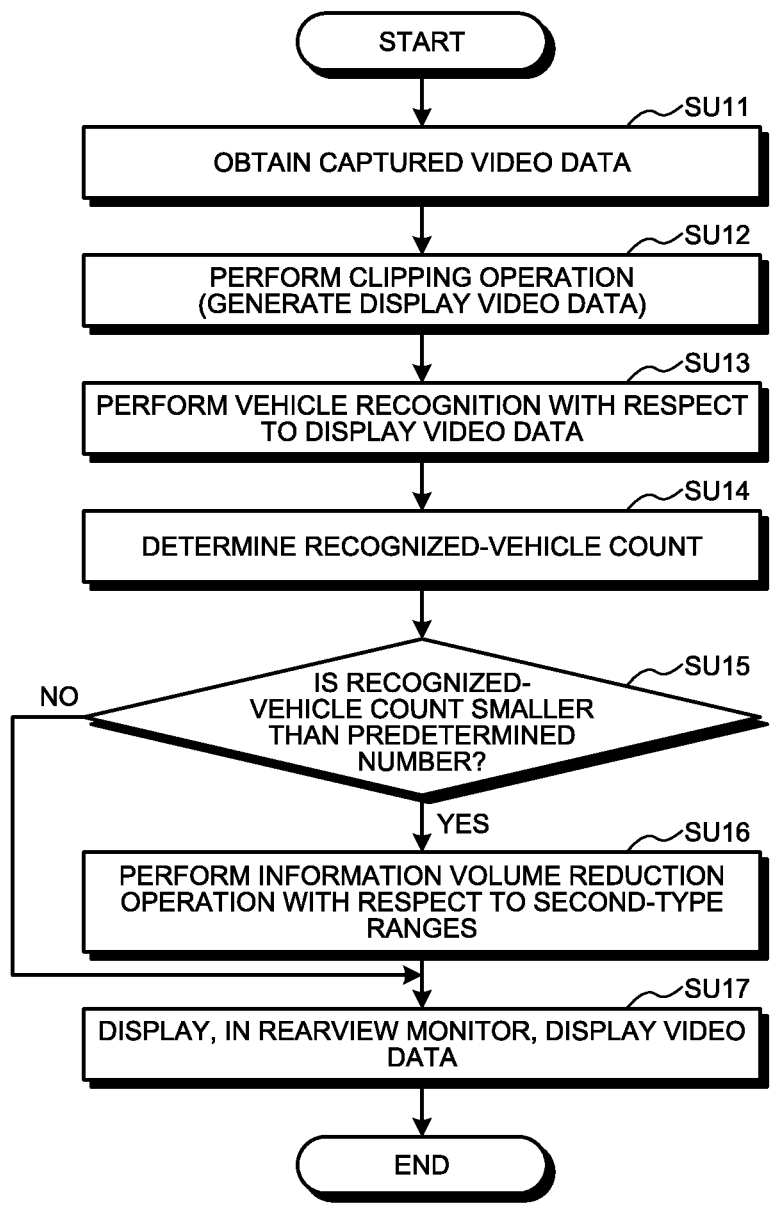
FIG. 43 is a flowchart for explaining a flow of operations performed in the in-vehicle display system according to the eighth embodiment.
Figure 44:
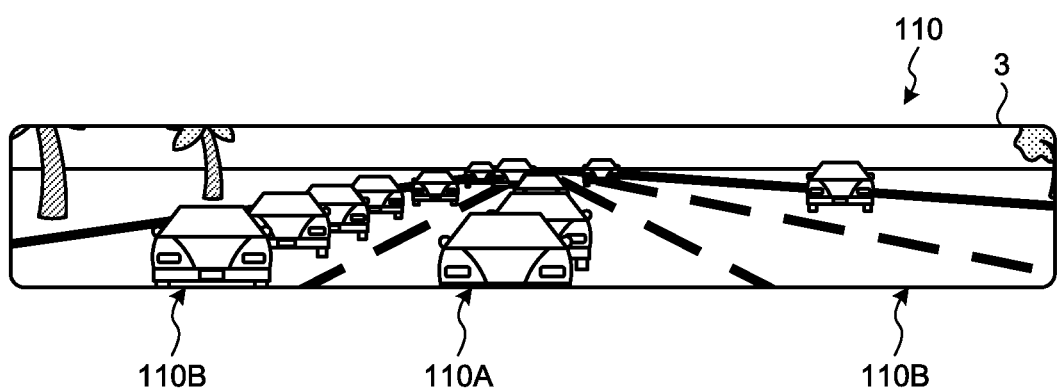
FIG. 44 is a diagram illustrating an example of the video displayed in the rearview monitor of the in-vehicle display system according to the eighth embodiment.
Figure 45:
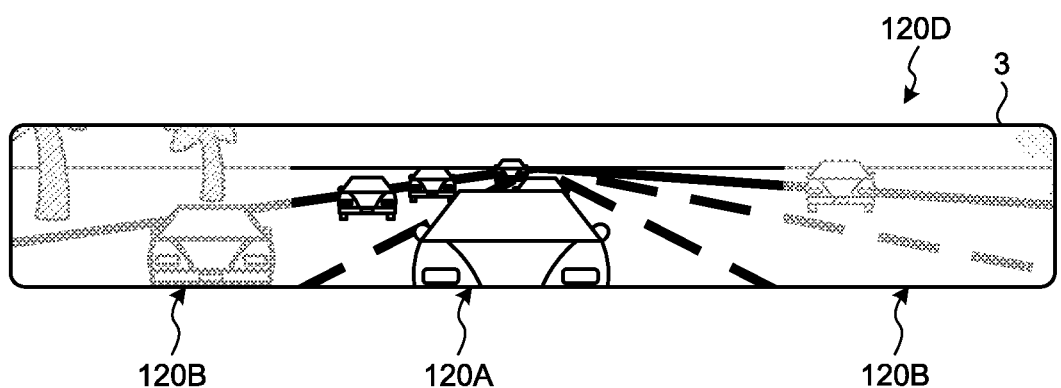
FIG. 45 is a diagram illustrating an example of the video displayed in the rearview monitor of the in-vehicle display system according to the eighth embodiment.

Explained below with reference to FIGS. 41 to 46 is an in-vehicle display system according to an eighth embodiment. FIG. 41 is a block diagram illustrating an exemplary configuration of the in-vehicle display system according to the eighth embodiment. FIG. 42 is a diagram illustrating an example of an operation definition table in the in-vehicle display system according to the eighth embodiment. FIG. 43 is a flowchart for explaining a flow of operations performed in the in-vehicle display system according to the eighth embodiment. FIG. 44 is a diagram illustrating an example of the video displayed in the rearview monitor of the in-vehicle display system according to the eighth embodiment. FIG. 45 is a diagram illustrating an example of the video displayed in the rearview monitor of the in-vehicle display system according to the eighth embodiment. FIG. 46 is a diagram illustrating an example of the video displayed in the rearview monitor of the in-vehicle display system according to the eighth embodiment.

A recognition dictionary storing unit 4D is referable by a recognition processing unit 361D.

A memory unit 20D is used to store an operation definition table 21.

In the operation definition table 21, an information volume reduction operation to be performed with respect to the second-type ranges 110B is defined for each count of the vehicles recognized in the display video data 110 (i.e., defined for each recognized-vehicle count). In the operation definition table 21, it is defined that, smaller the recognized-vehicle count, greater is the increase in the degree of reduction in the volume of information of the second-type ranges 110B.

It is a known fact that, while driving a vehicle, the driver can properly recognize only a limited volume of information. In that regard, the information volume reduction operation for reducing the volume of information obtained from the rearview monitor 3 is performed to ensure that the driver is not provided with an excessive volume of information from the rearview monitor 3. More specifically, when a large number of captured objects appear in the rearview monitor 3, the range within which the driver can properly recognize the rearward portion has the optimum size of the range recognizable in the conventional optical rearview mirror R, that is, the first-type range 110A in the display video data 110. In other words, when only a smaller number of captured objects appear in the rearview monitor 3, even if the display dimensions increase to be greater than the conventional optical rearview mirror R, the driver can recognize the rearward portion in a proper manner. In that regard, the information volume reduction degree is varied according to the number of captured objects. In the eighth embodiment, for each recognized-vehicle count, it is determined whether or not to perform the information volume reduction operation with respect to the second-type ranges 110B. The information volume reduction operation includes the operation of making the second-type ranges 110B non-displayable. Alternatively, in the eighth embodiment, the information volume reduction degree with respect to the second-type ranges 110B is varied for each recognized-vehicle count.

For example, in the operation definition table 21 as illustrated in FIG. 42, three patterns are defined. In a pattern example 1, when the recognized-vehicle count in the display video data 110 is "zero" or "one or more but less than 10", it is defined "to perform" the information volume reduction operation with respect to the second-type ranges 110B; and, when the recognized-vehicle count is "10 or more", it is defined "to not perform" the information volume reduction operation. In a pattern example 2, when the recognized-vehicle count is "zero", it is defined to have a "large reduction degree" in the information volume reduction operation. When the recognized-vehicle count is "one or more but less than 10", it is defined to have a "moderate reduction degree" in the information volume reduction operation. When the recognized-vehicle count is "10 or more", it is defined "to not perform" the information volume reduction operation. Herein, a large reduction degree implies reducing the volume of information of the second-type ranges 110B by 50%, for example. A moderate reduction degree implies that the volume of information of the second-type ranges 110B has a lower degree of reduction than in the case of the large reduction degree. For example, a moderate reduction degree implies reducing the volume of information of the second-type ranges 110B by 25%. In a pattern example 3, when the recognized-vehicle count is "zero", it is defined "to not display (second-type ranges)". When the recognized-vehicle count is "one or more but less than 10", it is defined "to perform" the information volume reduction operation. When the recognized-vehicle count is "10 or more", it is defined "to not perform" the information volume reduction operation. However, the operation definition table 21 is not limited to this example. Moreover, from among the patterns in the operation definition table 21, the pattern to be used is set in advance.

A video processing unit 36D includes the display video data generating unit 31, the range setting unit 35, a video processing unit 36D having the recognition processing unit 361D, and the display control unit 40.

In the eighth embodiment, the clipping unit 33 clips, as the display video data 110, the central part of the captured video data 100 as illustrated to be enclosed by dashed lines in FIG. 4. The clipping unit 33 then outputs the clipped display video data 110 to a range setting unit 35D.

The recognition processing unit 361D performs vehicle recognition with respect to the display video data 110 and determines the number of recognized vehicles. More specifically, the recognition processing unit 361D performs pattern matching with respect to the display video data 110 using the recognition dictionary stored in the recognition dictionary storing unit 4D, and detects the existence of vehicles. If a predetermined ratio or more of the total dimensions of the image of a vehicle stored in the recognition dictionary is detected, then the recognition processing unit 361D can determine that the vehicle is present. Subsequently, the recognition processing unit 361D counts and determines the number of detected vehicles.

According to the vehicle count determined by the recognition processing unit 361D, the video processing unit 36D performs operations with respect to the video data of the second-type ranges 110B of the display video data 110 for reducing the volume of information to be provided to the driver. More specifically, the video processing unit 36D performs an information volume reduction operation that includes generating display video data 120D in which the information volume reduction degree with respect to the second-type ranges 110B of the display video data 110 is varied according to the vehicle count determined by the recognition processing unit 361D, and includes outputting the display video data 120D to the display control unit 40. The display video data 120D contains the first-type range 120A not subjected to reduction in the volume of information, and contains the second-type ranges 120B having a reduced volume of information.

In that regard, according to the number of vehicles representing the captured objects appearing in the rearview monitor 3, the video processing unit 36D generates the display video data 120D by reducing the volume of information of the second-type ranges 110B with the aim of narrowing down on the recognizable information that is required by the driver. More specifically, based on the vehicle count determined by the recognition processing unit 361D, the video processing unit 36D performs an information volume reduction operation that includes referring to the operation definition table 21; generating the display video data 120D by reducing the volume of information of the second-type ranges 110B of the display video data 110; and outputting the display video data 120D to the display control unit 40. Except for the case of making the display video data 120D non-displayable, the display video data 120D has the volume of information reduced to such an extent that the driver can recognize the presence or absence of captured objects from the second-type ranges 120B. For that reason, even if the volume of information of the second-type ranges 120B is reduced, the driver can obtain the desired information from the second-type ranges 120B as may be necessary.

The information volume reduction operation includes, for example, a color information reduction operation for reducing color information and a brightness reduction operation for reducing brightness.

The video processing unit 36D either can perform the color information reduction operation, or can perform the brightness reduction operation, or can perform the color information reduction operation and the brightness reduction operation in combination.

When the vehicle count determined by the recognition processing unit 361D is not smaller than a predetermined number, the video processing unit 36D does not perform the information volume reduction operation with respect to the video data of the second-type ranges 110B of the display video data 110, and outputs the display video data 110 to the display control unit 40.

Explained below with reference to FIG. 43 is a flow of operations performed by the video processing unit 36D.

The video processing unit 36D makes the video data obtaining unit 32 obtain the captured video data 100 (Step SU11).

The video processing unit 36D makes the clipping unit 33 perform the clipping operation (Step SU12). More specifically, the video processing unit 36D makes the clipping unit 33 clip, from the captured video data 100, the range to be displayed in the rearview monitor 3 as the display video data 110.

The recognition processing unit 361D of the video processing unit 36D performs vehicle recognition with respect to the display video data 110 (Step SU13).

The recognition processing unit 361D of the video processing unit 36D determines the recognized-vehicle count (Step SU14). More specifically, the recognition processing unit 361D of the video processing unit 36D determines the number of vehicles recognized from the display video data 110.

The video processing unit 36D determines whether or not the recognized-vehicle count is smaller than a predetermined number (Step SU15). More specifically, the video processing unit 36D determines whether or not the recognized-vehicle count in the display video data 110 as determined by the recognition processing unit 361D is smaller than a predetermined number. In the eighth embodiment, the threshold value of the recognized-vehicle count is set to 10, and it is determined whether or not the recognized-video count in the display video data 110 is smaller than 10. The threshold value of the recognized-vehicle count represents the boundary value for either reducing or not reducing the information volume of the second-type ranges 110B. More specifically, when the number of vehicles appearing in the display video data 110 exceeds the threshold value of the recognized-vehicle count, the threshold value is set to a value at which it is estimated to have a large volume of traffic and a low vehicle speed. Meanwhile, when the speed of the vehicle is low, the driver can properly recognize the information even if there is no reduction in the volume of information of the second-type ranges 110B. For example, when the speed of the vehicle is low, the period for which the driver views the rearview monitor 3 is longer than in the case of driving at high speeds, and the information about the second-type ranges 110B is required more often. When the number of vehicles appearing in the display video data 110 is smaller than the threshold value, it is estimated that the volume of traffic is small and the speed of the vehicle is high. When the speed of the vehicle is high, the period of viewing the rearview monitor 3 also becomes shorter than the period of viewing in the case of driving at low speeds or during traffic congestion, and the information about the second-type ranges 110B is not required as often.

If the video processing unit 36D determines that the recognized-vehicle count is not smaller than the predetermined number (No at Step SU15), then the system control proceeds to Step SU17. Moreover, the video processing unit 36D outputs the display video data 110 to the display control unit 40.

If the video processing unit 36D determines that the recognized-video count is smaller than the predetermined number (Yes at Step SU15), then the system control proceeds to Step SU16.

The video processing unit 36D performs the information volume reduction operation with respect to the second-type ranges 110B of the display video data 110 (Step SU16). More specifically, based on the recognized-vehicle count determined by the recognition processing unit 361D, the video processing unit 36D refers to the operation definition table 21 and obtains the type of the information volume reduction operation. Then, based on the obtained type of the information volume reduction operation with respect to the second-type ranges 110B corresponding to the recognized-vehicle count, the video processing unit 36D performs the information volume reduction operation that includes generating the display video data 120D by reducing the volume of information of the second-type ranges 110B of the display video data 110, and includes outputting the display video data 120D to the display control unit 40.

Alternatively, for example, the video processing unit 36D can generate the display video data 120D by setting, for example, simple colors or black and white colors of low chromatic values in the second-type ranges 110B of the display video data 110, and can output the display video data 120D to the display control unit 40.

Still alternatively, for example, the video processing unit 36D can output a control signal meant for setting the first-type range 110A to have the normal brightness and meant for reducing the brightness of the second-type ranges 110B than the normal brightness, and the control signal can be output along with the display video data 110 to the display control unit 40.

The display control unit 40 in the video processing unit 36D causes the rearview monitor 3 to display the display video data 110 or the display video data 120D (Step SU17).

More particularly, the following explanation is given for a case in which the operations by the video processing unit 36D are performed using a pattern example 3 in the operation definition table 21 illustrated in FIG. 42.

For example, the following explanation is given about the case in which the recognized-vehicle count in the display video data 110 is 11. The video processing unit 36D refers to the operation definition table 21 and obtains "to not perform" as the type of the information volume reduction operation with respect to the second-type ranges 110B corresponding to the recognized-vehicle count of "10 or more". Then, the video processing unit 36D does not perform the information volume reduction operation with respect to the second-type ranges 110B, and the display control unit 40 causes the rearview monitor 3 to display the display video data 110 as illustrated in FIG. 44. In this case, it is estimated that a large number of vehicles are present and the speed of the vehicles is slow. When a large number of vehicles are present, the driver desires to secure visibility over a wide range. Hence, the video processing unit 36D does not perform the information volume reduction operation with respect to the second-type ranges 110B, and ensures that the display video data 110 is displayed in the rearview monitor 3. Since the speed of the vehicle is low, the driver can properly recognize the rearward portion even if a large volume of information is obtained from the rearview monitor 3.

For example, the following explanation is given about a case in which the recognized-vehicle count in the display video data 110 is six. The video processing unit 36D refers to the operation definition table 21 and obtains "to perform" as the type of the information volume reduction operation with respect to the second-type ranges 110B corresponding to the recognized-vehicle count of "one or more but less than 10". Then, the video processing unit 36D performs the information volume reduction operation with respect to the second-type ranges 110B and the display control unit 40 causes the rearview monitor 3 to display the display video data 120D, which has a reduced volume of information and which is illustrated in FIG. 45. In this case, it is estimated that there is no traffic congestion and the speed of the vehicle is high. Hence, the video processing unit 36D ensures that the display video data 120D, which is generated by reducing the volume of information of the second-type ranges 110B with the aim of narrowing down on the recognizable information that is required by the driver, is displayed in the rearview monitor 3. Since the volume of information is reduced, the driver is able to confirm the rearward portion in a proper manner.

For example, the following explanation is given about the case in which the recognized-vehicle count in the display video data 110 is zero. The video processing unit 36D refers to the operation definition table 21 and obtains "to not display (second-type ranges)" as the type of the information volume reduction operation with respect to the second-type ranges 110B corresponding to the recognized-vehicle count of "zero". Then, the display control unit 40 causes the rearview monitor 3 to display the display video data 120D in which the second-type ranges 110B are made non-displayable as illustrated in FIG. 46. In this case, it is estimated that there is no traffic congestion and the speed of the vehicle is high. In this way, when there are no other vehicles around the concerned vehicle, there is less need to confirm the rearward portion. Hence, the video processing unit 36D ensures that the display video data 120D in which the second-type ranges 110B are made non-displayable is displayed in the rearview monitor 3. Since no other vehicles are appearing in the second-type ranges 110B that are made non-displayable, the driver is able to confirm the rearward portion in a proper manner.

The video processing unit 36D repeatedly performs such operations, for example, on a frame-by-frame basis or at predetermined intervals such as after every predetermined number of frames.

As described above, according to the eighth embodiment, when the recognized-vehicle count in the display video data 110 is smaller than the predetermined number, the display video data 120D having a reduced volume of information is displayed in the rearview monitor 3. Moreover, when the recognized-vehicle count in the display video data 110 is smaller than the predetermined number, the display video data 120D having the information volume reduction degree varied according to the recognized-vehicle count is displayed in the rearview monitor 3. When the recognized-vehicle count in the display video data 110 is not smaller than the predetermined number, the display video data 110 in which the volume of information of the second-type ranges 110B is not reduced is displayed in the rearview monitor 3. Thus, in the rearview monitor 3, according to the recognized-vehicle count in the display video data 110, either the display video data 110 or the display video data 120D having an easily-recognizable volume of information for the driver is displayed in the rearview monitor 3. In this way, according to the eighth embodiment, an appropriate volume of information for the driver can be displayed according to the recognized-vehicle count in the display video data 110. Hence, according to the eighth embodiment, the driver can confirm the surroundings of the vehicle in a proper manner.

According to the eighth embodiment, when the recognized-vehicle count in the display video data 110 is smaller than the predetermined number, the information volume reduction operation is performed with respect to the second-type ranges 110B of the display video data 110. In other words, according to the eighth embodiment, the first-type range 110A that is recognizable when the driver looks straight at the conventional optical rearview mirror R is not subjected to reduction in the volume of information regardless of the recognized-vehicle count in the display video data 110. Hence, in the eighth embodiment, the rearward portion can be confirmed at any time in an identical manner to the case of looking at the conventional optical rearview mirror R.

According to the eighth embodiment, the second-type ranges 120B of the display video data 120D is subjected to reduction in the volume of information to such an extent that the driver can still recognize the presence or absence of the captured objects in the second-type ranges 120B as well as can recognize the difference between the volume of information of the first-type range 120A and the volume of information of the second-type ranges 120B. For that reason, in the eighth embodiment, even if the volume of information of the second-type ranges 120B is reduced, the driver can obtain the desired information from the second-type ranges 120B as may be necessary. Hence, the driver is able to take a proper evasive action as may be necessary.

Ninth Embodiment

Figure 48:
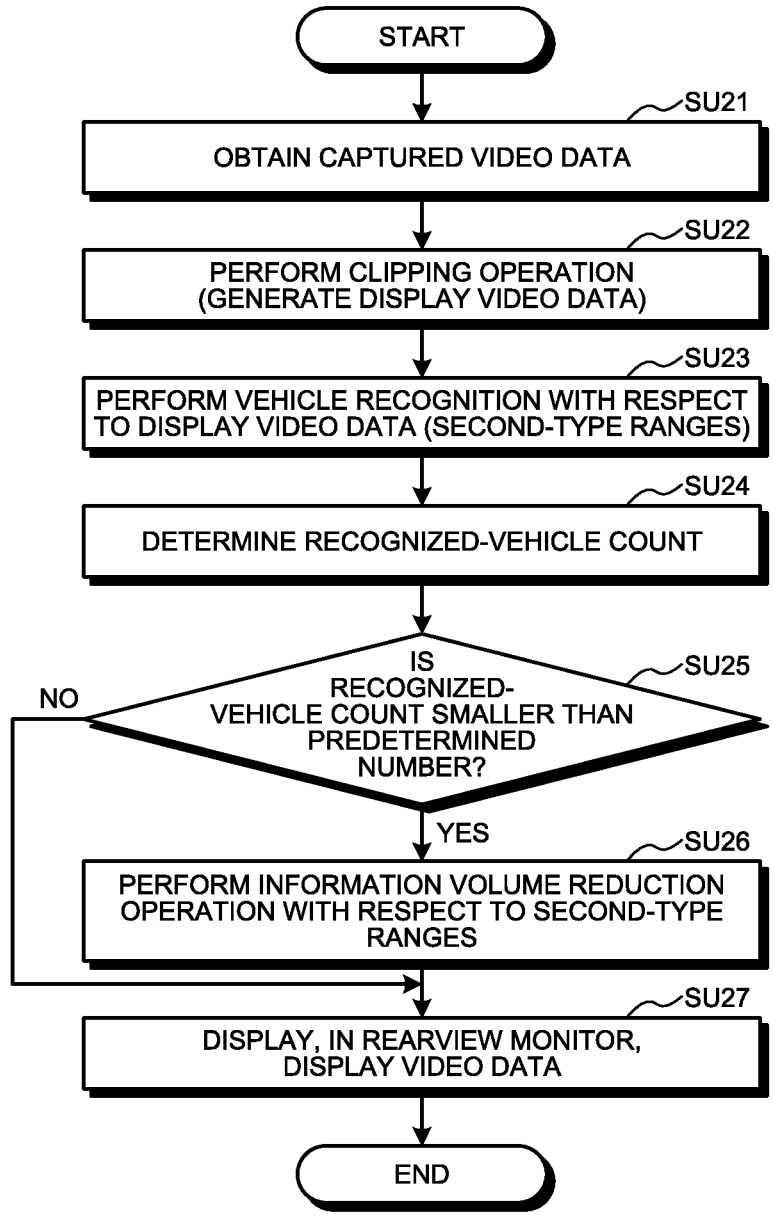
FIG. 48 is a flowchart for explaining a flow of operations performed in the in-vehicle display system according to the ninth embodiment.
Figure 49:
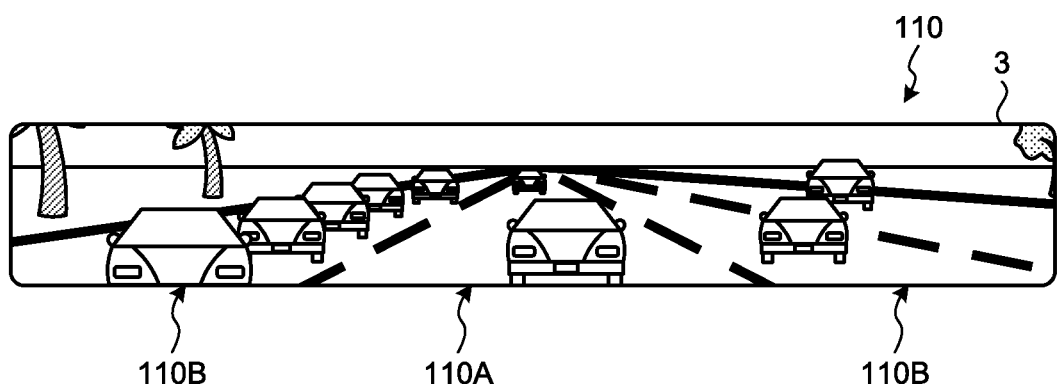
FIG. 49 is a diagram illustrating an example of the video displayed in the rearview monitor of the in-vehicle display system according to the ninth embodiment.
Figure 50:
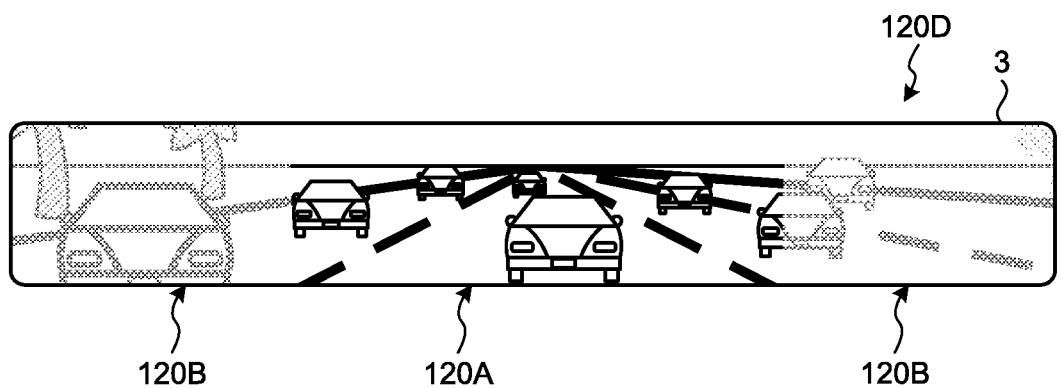
FIG. 50 is a diagram illustrating another example of the video displayed in the rearview monitor of the in-vehicle display system according to the ninth embodiment.

Explained below with reference to FIGS. 47 to 51 is an in-vehicle display system 1D according to a ninth embodiment. FIG. 47 is a diagram illustrating an example of an operation definition table in the in-vehicle display system according to the ninth embodiment. FIG. 48 is a flowchart for explaining a flow of operations performed in the in-vehicle display system according to the ninth embodiment. FIG. 49 is a diagram illustrating an example of the video displayed in the rearview monitor of the in-vehicle display system according to the ninth embodiment. FIG. 50 is a diagram illustrating another example of the video displayed in the rearview monitor of the in-vehicle display system according to the ninth embodiment. FIG. 51 is a diagram illustrating another example of the video displayed in the rearview monitor of the in-vehicle display system according to the ninth embodiment.

The in-vehicle display system 1D has an identical fundamental configuration to the in-vehicle display system 1D according to the eighth embodiment. In the in-vehicle display system 1D according to the ninth embodiment, the information processing performed by the video processing unit 36D of the in-vehicle display device 10D is different than the information processing performed in the in-vehicle display system 1D according to the eighth embodiment.

Explained below with reference to FIG. 47 is an example of an operation definition table 21A according to the ninth embodiment. In the operation definition table 21A, for each recognized-vehicle count in the second-type ranges 110B of the display video data 110, the type of the information volume reduction operation to be performed with respect to the second-type ranges 110B is defined. Herein, the recognized-vehicle count in the second-type ranges 110B represents the total of the recognized-vehicle count in the left-side second-type range 110B and the recognized-vehicle count in the right-side second-type range 110B. In the second-type ranges 110B, the other traffic lanes other than the traffic lane of the concerned vehicle are captured. The vehicles travelling in the other traffic lanes, that is, the vehicles appearing in the second-type ranges 110B are the vehicles likely to come side by side to the concerned vehicle as a result of overtaking.

For example, in the operation definition table 21A illustrated in FIG. 47, three patterns are defined. In a pattern example 1, when the recognized-vehicle count in the second-type ranges 110B is "zero" or "one or more but less than three", it is defined "to perform" the information volume reduction operation with respect to the second-type ranges 110B; and, when the recognized-vehicle count is "three or more", it is defined "to not perform" the information volume reduction operation. In a pattern example 2, when the recognized-vehicle count is "zero", it is defined to have a "large reduction degree" in the information volume reduction operation. When the recognized-vehicle count is "one or more but less than three", it is defined to have a "moderate reduction degree" in the information volume reduction operation. When the recognized-vehicle count is "three or more", it is defined "to not perform" the information volume reduction operation. In a pattern example 3, when the recognized-vehicle count is "zero", it is defined "to not display (second-type ranges)". When the recognized-vehicle count is "one or more but less than three", it is defined "to perform" the information volume reduction operation. When the recognized-vehicle count is "three or more", it is defined "to not perform" the information volume reduction operation. Meanwhile, the operation definition table 21A is not limited to this example.

The recognition processing unit 361D performs vehicle recognition with respect to the second-type ranges 110B of the display video data 110, and determines the number of recognized vehicles. More specifically, with respect to the second-type ranges 110B of the display video data 110, the recognition processing unit 361D performs pattern matching using the recognition dictionary stored in the recognition dictionary storing unit 4D, and detects the existence of vehicles.

According to the number of vehicles in the second-type ranges 110B of the display video data 110 as determined by the recognition processing unit 361D, the video processing unit 36D performs an information volume reduction operation that includes generating the display video data 120D by reducing the volume of information of the second-type ranges 110B of the display video data 110, and includes outputting the display video data 120D to the display control unit 40.

Explained below with reference to FIG. 48 is a flow of operations performed by the video processing unit 36D. At Steps SU21, SU22, and SU27; the operations are identical to the operations performed at Steps SU11, SU12, and SU17, respectively, according to the eighth embodiment.

The recognition processing unit 361D of the video processing unit 36D performs vehicle recognition with respect to the second-type ranges 110B of the display video data 110 (Step SU23).

The recognition processing unit 361D of the video processing unit 36D determines the recognized-vehicle count (Step SU24). More specifically, the recognition processing unit 361D of the video processing unit 36D determines the number of vehicles recognized from the second-type ranges 110B of the display video data 110.

The video processing unit 36D determines whether or not the recognized-vehicle count is smaller than a predetermined number (Step SU25). More specifically, the video processing unit 36D determines whether or not the recognized-vehicle count in the second-type ranges 110B of the display video data 110 as determined by the recognition processing unit 361D is smaller than a predetermined number. In the ninth embodiment, the threshold value of the recognized-vehicle count is set to three, and it is determined whether or not the recognized-video count is smaller than three.

If the video processing unit 36D determines that the recognized-vehicle count is not smaller than the predetermined number (No at Step SU25), then the system control proceeds to Step SU27. Moreover, the video processing unit 36D outputs the display video data 110 to the display control unit 40.

If the video processing unit 36D determines that the recognized-video count is smaller than the predetermined number (Yes at Step SU25), then the system control proceeds to Step SU26.

The video processing unit 36D performs the information volume reduction operation with respect to the second-type ranges 110B of the display video data 110 (Step SU26). More specifically, based on the recognized-vehicle count in the second-type ranges 110B as determined by the recognition processing unit 361D, the video processing unit 36D refers to the operation definition table 21A. Then, based on the information volume reduction operation with respect to the second-type ranges 110B corresponding to the obtained recognized-vehicle count, the video processing unit 36D generates the display video data 120D by reducing the volume of information of the second-type ranges 110B of the display video data 110, and outputs the display video data 120D to the display control unit 40.

More particularly, the explanation is given for a case in which the video processing unit 36D performs operations when the pattern example 3 in the operation definition table 21A illustrated in FIG. 47 is used.

For example, the explanation is given for a case in which the recognized-vehicle count in the second-type ranges 110B is three. The video processing unit 36D refers to the operation definition table 21A and obtains "to not perform" as the type of the information volume reduction operation with respect to the second-type ranges 110B corresponding to the recognized-vehicle count of "three or more". Thus, the video processing unit 36D does not perform the information volume reduction operation with respect to the second-type ranges 110B, and the display control unit 40 causes the rearview monitor 3 to display the display video data 110 as illustrated in FIG. 49. In this case, it is estimated that a large number of vehicles are present and the speed of the vehicles is slow. When a large number of vehicles are present, the driver desires to secure visibility over a wide range. Hence, the video processing unit 36D does not perform the information volume reduction operation with respect to the second-type ranges 110B, and ensures that the display video data 110 is displayed in the rearview monitor 3. Since the speed of the vehicle is low, the driver can properly recognize the rearward portion even if a large volume of information is obtained from the rearview monitor 3.

For example, the following explanation is given about a case in which the recognized-vehicle count in the second-type ranges 110B is two. The video processing unit 36D refers to the operation definition table 21A and obtains "to perform" as the type of the information volume reduction operation with respect to the second-type ranges 110B corresponding to the recognized-vehicle count of "one or more but less than three". Then, the video processing unit 36D performs the information volume reduction operation with respect to the second-type ranges 110B and the display control unit 40 causes the rearview monitor 3 to display the display video data 120D, which has a reduced volume of information as illustrated in FIG. 50. In this case, it is estimated that there is no traffic congestion and the speed of the vehicle is high. Hence, the video processing unit 36D ensures that the display video data 120D, which is generated by reducing the volume of information of the second-type ranges 110B with the aim of narrowing down on the recognizable information that is required by the driver, is displayed in the rearview monitor 3. Since the volume of information is reduced, the driver is able to confirm the rearward portion in a proper manner.

For example, the following explanation is given about the case in which the recognized-vehicle count in the second-type ranges 110B is zero. The video processing unit 36D refers to the operation definition table 21A and obtains "to not display (second-type ranges)" as the type of the information volume reduction operation with respect to the second-type ranges 110B corresponding to the recognized-vehicle count of "zero". Then, the display control unit 40 causes the rearview monitor 3 to display the display video data 120D in which the second-type ranges 110B are made non-displayable as illustrated in FIG. 51. In this case, it is estimated that there is no traffic congestion and the speed of the vehicle is high. In this way, when there are no other vehicles around the concerned vehicle, there is less need to confirm the rearward portion. Hence, the video processing unit 36D ensures that the display video data 120D in which the second-type ranges 110B are made non-displayable is displayed in the rearview monitor 3. Even when the second-type ranges 110B are made non-displayable, since no other vehicles are appearing in the second-type ranges 110B that are made non-displayable, the driver is able to confirm the rearward portion in a proper manner.

As described above, according to the ninth embodiment, when the recognized-vehicle count in the second-type ranges 110B of the display video data 110 is smaller than the predetermined number, the display video data 120D having a reduced volume of information of the second-type ranges 120B is displayed in the rearview monitor 3. Moreover, when the recognized-vehicle count in the second-type ranges 110B of the display video data 110 is smaller than the predetermined number, the display video data 120D having the information volume reduction degree varied according to the recognized-vehicle count is displayed in the rearview monitor 3. When the recognized-vehicle count in the second-type ranges 110B of the display video data 110 is not smaller than the predetermined number, the display video data 110 in which the volume of information is not reduced is displayed in the rearview monitor 3. Thus, according to the recognized-vehicle count in the second-type ranges 110B of the display video data 110, either the display video data 110 or the display video data 120D having an easily-recognizable volume of information for the driver is displayed in the rearview monitor 3. In this way, according to the ninth embodiment, according to the recognized-vehicle count of the second-type ranges 110B having a reduced volume of information in the display video data 110, an appropriate volume of information for the driver can be displayed.

According to the ninth embodiment, according to the recognized-vehicle count of the second-type ranges 110B, in other words, according to the number of vehicles that are running in the other traffic lanes other than the traffic lane of the concerned vehicle and that are likely to come side by side to the concerned vehicle; it is determined whether or not to perform the information volume reduction operation with respect to the second-type ranges 110B. Hence, according to the ninth embodiment, the driver is able to confirm the surroundings of the vehicle in a more proper manner.

10-Th Embodiment

Figure 53:
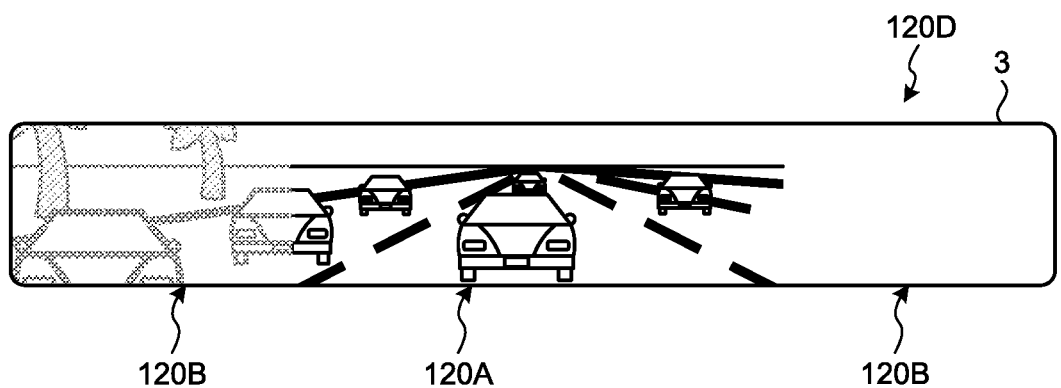
FIG. 53 is a diagram illustrating an example of the video displayed in the rearview monitor of the in-vehicle display system according to the 10-th embodiment.
Figure 54:
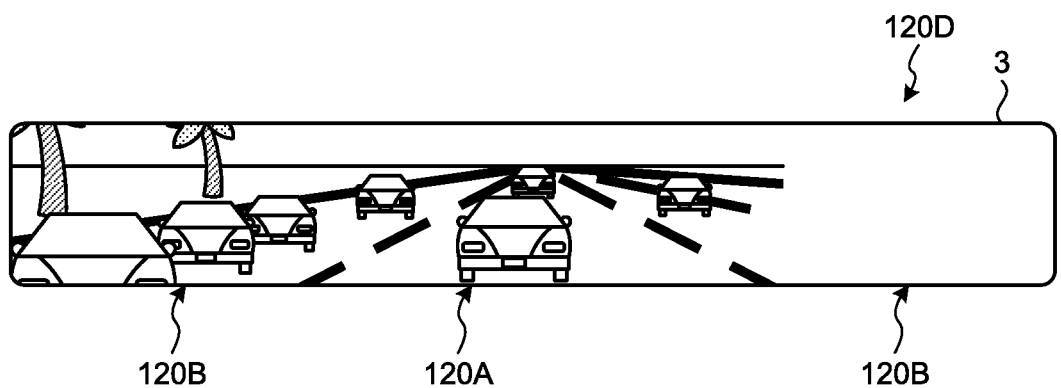
FIG. 54 is a diagram illustrating another example of the video displayed in the rearview monitor of the in-vehicle display system according to the 10-th embodiment.

Explained below with reference to FIGS. 52 to 54 is the in-vehicle display system 1D according to a 10-th embodiment. FIG. 52 is a diagram illustrating an example of an operation definition table in the in-vehicle display system according to the 10-th embodiment. FIG. 53 is a diagram illustrating an example of the video displayed in the rearview monitor of the in-vehicle display system according to the 10-th embodiment. FIG. 54 is a diagram illustrating another example of the video displayed in the rearview monitor of the in-vehicle display system according to the 10-th embodiment.

As compared to the in-vehicle display system 1D according to the ninth embodiment, the in-vehicle display system 1D according to the 10-th embodiment differs in the way that the determination about whether or not to perform an information volume reduction operation is performed with respect to the left-side second-type range 110B and the right-side second-type range 110B according to the respective recognized-vehicle counts, and that the information volume reduction operation is performed with respect to the left-side second-type range 110B or the right-side second-type range 110B.

Explained below with reference to FIG. 52 is an example of an operation definition table 21B according to the 10-th embodiment. In the operation definition table 21B, for each recognized-vehicle count in either the left-side second-type range 110B or the right-side second-type range 110B of the display video data 110, the type of the information volume reduction operation to be performed with respect to the concerned second-type range 110B is defined. For example, in the operation definition table 21B illustrated in FIG. 52, three patterns are defined. In a pattern example 1, when the recognized-vehicle count in either the left-side second-type range 110B or the right-side second-type range 110B is "zero" or "one or more but less than three", it is defined "to perform" the information volume reduction operation with respect to the concerned second-type range 110B; and, when the recognized-vehicle count is "three or more", it is defined "to not perform" the information volume reduction operation. In a pattern example 2, when the recognized-vehicle count is "zero", it is defined to have a "large reduction degree" in the information volume reduction operation. When the recognized-vehicle count is "one or more but less than three", it is defined to have a "moderate reduction degree" in the information volume reduction operation. When the recognized-vehicle count is "three or more", it is defined "to not perform" the information volume reduction operation. In a pattern example 3, when the recognized-vehicle count is "zero", it is defined "to not display (second-type range)". When the recognized-vehicle count is "one or more but less than three", it is defined "to perform" the information volume reduction operation. When the recognized-vehicle count is "three or more", it is defined "to not perform" the information volume reduction operation. Meanwhile, the operation definition table 21B is not limited to this example.

The recognition processing unit 361D performs vehicle recognition with respect to the left-side second-type range 110B and the right-side second-type range 110B of the display video data 110, and determines the respective numbers of recognized vehicles. More specifically, the recognition processing unit 361D performs vehicle recognition with respect to the left-side second-type range 110B of the display video data 110, and determines the number of recognized vehicles. Moreover, the recognition processing unit 361D performs vehicle recognition with respect to the right-side second-type range 110B of the display video data 110, and determines the number of recognized vehicles.

Regarding each of the left-side second-type range 110B and the right-side second-type range 110B of the display video data 110, the video processing unit 36D performs an information volume reduction operation that includes generating the display video data 120D in which the information volume reduction degree with respect to the concerned second-type range 110B of the display video data 110 is varied according to the corresponding vehicle count determined by the recognition processing unit 361D, and includes outputting the display video data 120D to the display control unit 40. More specifically, according to the number of vehicles in the left-side second-type range 110B of the display video data 110, the video processing unit 36D reduces the information volume of the left-side second-type range 110B of the display video data 110. Similarly, according to the number of vehicles in the right-side second-type range 110B of the display video data 110, the video processing unit 36D reduces the information volume of the right-side second-type range 110B of the display video data 110.

The video processing unit 36D performs the information processing from Step SU23 to Step SU26 illustrated in FIG. 48 with respect to each of the left-side second-type range 110B and the right-side second-type range 110B of the display video data 110.

More particularly, the explanation is given for a case in which the video processing unit 36D when the pattern example 3 in the operation definition table 21B illustrated in FIG. 52 is used.

For example, the explanation is given for a case in which the recognized-vehicle count in the left-side second-type range 110B is two and the recognized-vehicle count in the right-side second-type range 110B is zero. Regarding the left-side second-type range 110B, the video processing unit 36D refers to the operation definition table 21B and obtains "to perform" as the type of the information volume reduction operation with respect to the left-side second-type range 110B corresponding to the recognized-vehicle count of "one or more but less than three". Then, the video processing unit 36D performs the information volume reduction operation with respect to the left-side second-type range 110B. Similarly, regarding the right-side second-type range 110B, the video processing unit 36D refers to the operation definition table 21B and obtains "to not display (second-type range)" as the type of the information volume reduction operation with respect to the right-side second-type range 110B corresponding to the recognized-vehicle count of "zero". Then, the video processing unit 36D makes the right-side second-type range 110B non-displayable. Subsequently, the display control unit 40 causes the rearview monitor 3 to display the display video data 120D as illustrated in FIG. 53. In this case, the right-side second-type range 110B in which oncoming traffic lanes appear almost over the entire range is made non-displayable, and thus has low priority as far as confirmation of the rearward portion while driving is concerned. Hence, even if the right-side second-type range 110B is made non-displayable, it does not affect the confirmation of the rearward portion.

For example, the explanation is given for a case in which the recognized-vehicle count in the left-side second-type range 110B is three and the recognized-vehicle count in the right-side second-type range 110B is zero. Regarding the left-side second-type range 110B, the video processing unit 36D refers to the operation definition table 21B and obtains "to not perform" as the type of the information volume reduction operation with respect to the left-side second-type range 110B corresponding to the recognized-vehicle count of "three or more". Thus, the video processing unit 36D does not perform the information volume reduction operation with respect to the left-side second-type range 110B. Similarly, regarding the right-side second-type range 110B, the video processing unit 36D refers to the operation definition table 21B and obtains "to not display (second-type range)" as the type of the information volume reduction operation with respect to the right-side second-type range 110B corresponding to the recognized-vehicle count of "zero". Then, the video processing unit 36D makes the right-side second-type range 110B non-displayable. Subsequently, the display control unit 40 causes the rearview monitor 3 to display the display video data 120D as illustrated in FIG. 54. In this case too, the right-side second-type range 110B in which oncoming traffic lanes appear almost over the entire range is made non-displayable, and thus has low priority as far as confirmation of the rearward portion while driving is concerned. Hence, even if the right-side second-type range 110B is made non-displayable, it does not affect the confirmation of the rearward portion.

As described above, according to the 10-th embodiment, regarding each of the left-side second-type range 110B and the right-side second-type range 110B of the display video data 110, the determination about whether or not to perform the information volume reduction operation is performed according to the corresponding recognized-vehicle count; and the information volume reduction operation is independently performed with respect to the left-side second-type range 110B and the right-side second-type range 110B. In this way, according to the 10-th embodiment, regarding each of the left-side second-type range 110B and the right-side second-type range 110B having a reduced volume of information in the display video data 110, an appropriate volume of information for the driver can be displayed according to the corresponding recognized-vehicle count.

11-Th Embodiment

Figure 55:
FIG. 55 is a diagram illustrating an example of a range definition table in the in-vehicle display system according to an 11-th embodiment.
Figure 56:
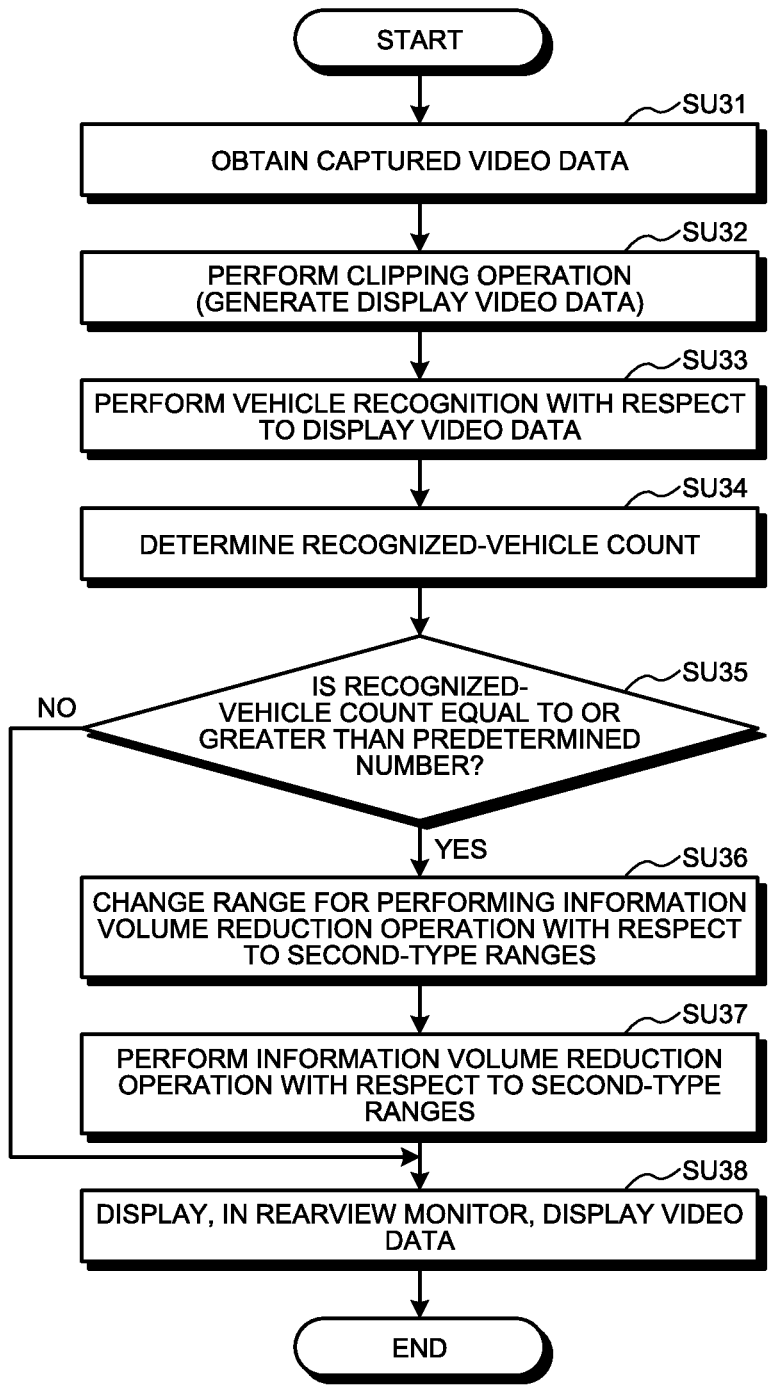
FIG. 56 is a flowchart for explaining a flow of operations performed in the in-vehicle display system according to the 11-th embodiment.
Figure 57:
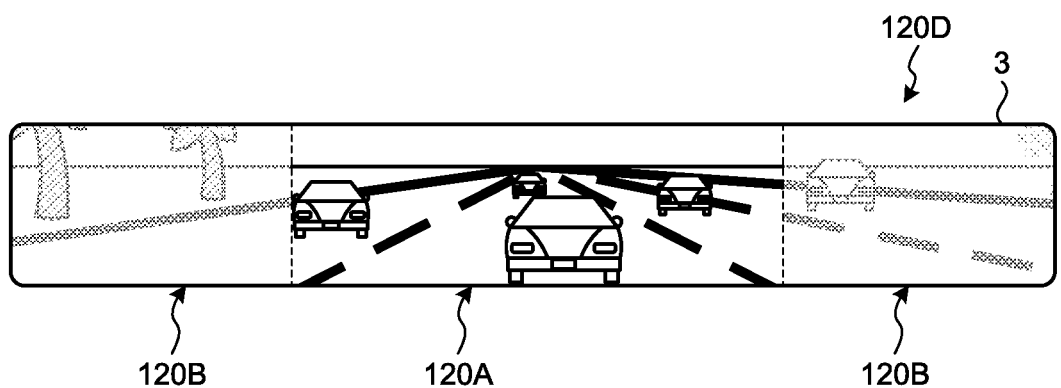
FIG. 57 is a diagram illustrating an example of the video displayed in the rearview monitor of the in-vehicle display system according to the 11-th embodiment.
Figure 58:
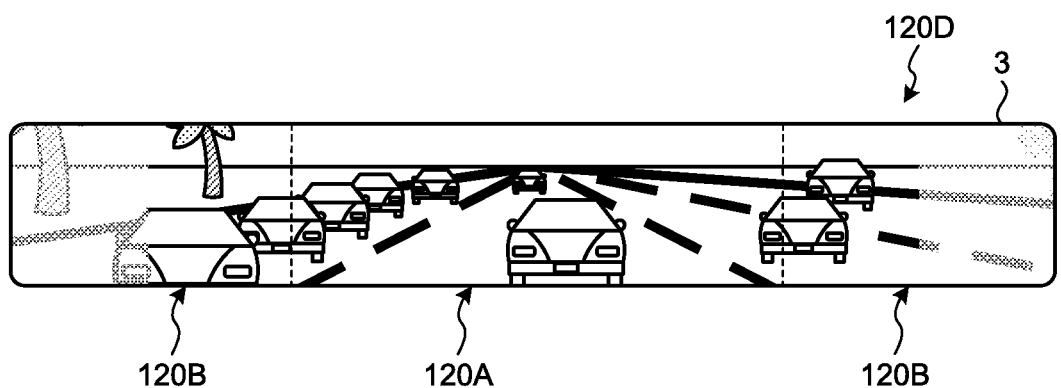
FIG. 58 is a diagram illustrating another example of the video displayed in the rearview monitor of the in-vehicle display system according to the 11-th embodiment.

Explained below with reference to FIGS. 55 to 58 is an in-vehicle display system according to an 11-th embodiment. FIG. 55 is a diagram illustrating an example of a range definition table in the in-vehicle display system according to the 11-th embodiment. FIG. 56 is a flowchart for explaining a flow of operations performed in the in-vehicle display system according to the 11-th embodiment. FIG. 57 is a diagram illustrating an example of the video displayed in the rearview monitor of the in-vehicle display system according to the 11-th embodiment. FIG. 58 is a diagram illustrating another example of the video displayed in the rearview monitor of the in-vehicle display system according to the 11-th embodiment.

In the in-vehicle display system 1D according to the 11-th embodiment, the operations performed by the video processing unit 36D are different than the operations performed in the in-vehicle display system 1D according to the eighth embodiment.

The memory unit 20D is used to store a range definition table 22.

Explained below with reference to FIG. 55 is an example of the range definition table 22 according to the 11-th embodiment. In the range definition table, for each recognized-vehicle count in the display video data 110, the range over which the information volume reduction operation is performed with respect to the second-type ranges 110B is defined. In the range definition table 22, it is defined that, greater the recognition-vehicle count, the narrower is the range over which the information volume reduction operation is performed with respect to the second-type ranges 110B.

For example, in the range definition table 22 illustrated in FIG. 55, two patterns are defined. In a pattern example 1, when the recognized-vehicle count is either "zero" or "one or more but less than eight" in the display vide data 110, "no change" is defined for the range for performing the information volume reduction operation with respect to the second-type ranges 110B. When the recognition vehicle count is "eight or more", "moderate narrowing degree" is defined for the range for performing the information volume reduction operation with respect to the second-type ranges 110B. In a pattern example 2, when the recognized-vehicle count is "zero", "no change" is defined for the range for performing the information volume reduction operation with respect to the second-type ranges 110B. When the recognition vehicle count is "one or more but less than eight", "moderate narrowing degree" is defined for the range for performing the information volume reduction operation with respect to the second-type ranges 110B. When the recognition vehicle count is "eight or more", "large narrowing degree" is defined for the range for performing the information volume reduction operation with respect to the second-type ranges 110B. However, the range definition table 22 is not limited to this example.

According to the recognized-vehicle count of the display video data 110, the range setting unit 35D sets a range over which the information volume reduction operation is to be performed with respect to the second-type ranges 110B of the display video data 110. Based on the recognized-vehicle count, greater the recognized-vehicle count, the narrower is the range set by the range setting unit 35D for performing the information volume reduction operation with respect to the second-type ranges 110B. For example, the range setting unit 35D can set the ratio of the second-type ranges 110B in a corresponding manner to the range definition table 22 stored in advance in the memory unit 20D. In the 11-th embodiment, when "no change" is defined in the range definition table 22 for the range for performing the information volume reduction operation with respect to the second-type ranges 110B, the information volume reduction operation is performed with respect to the entire second-type ranges 110B. In the 11-th embodiment, when "moderate narrowing range" is defined in the range definition table 22 for the range for performing the information volume reduction operation with respect to the second-type ranges 110B, the information volume reduction operation is performed over half of the range from the outer side of the second-type ranges 110B. In the 11-th embodiment, when "large narrowing range" is defined in the range definition table 22 for the range for performing the information volume reduction operation with respect to the second-type ranges 110B, the range for performing the information volume reduction operation with respect to the second-type ranges 110B is narrowed as compared to the case in which "moderate narrowing range" is defined. For example, when "large narrowing range" is defined in the range definition table 22 for the range for performing the information volume reduction operation with respect to the second-type ranges 110B, the information volume reduction operation is performed over a quarter of the range from the outer side of the second-type ranges 110B. In other words, in the 11-th embodiment, when "moderate narrowing range" or "large narrowing range" is defined in the range definition table 22 for the range for performing the information volume reduction operation with respect to the second-type ranges 110B, the information volume reduction operation is not performed with respect to the inner side of the second-type ranges 110B, that is, not performed with respect to the portion of the second-type ranges 110B on the side of the first-type range 110A.

For example, the range setting unit 35D selects, according to the running condition of the vehicle and the characteristics of the driver, the pattern example 1 or the pattern example 2 from the range definition table 22 illustrated in FIG. 55; and, based on the relationship between the recognized-vehicle count of the selected pattern and the range for performing the information volume reduction operation, sets the range for performing the information volume reduction operation according to the recognized-vehicle count.

Explained below with reference to FIG. 56 is a flow of operations performed by the video processing unit 36D. The operations performed from Step SU31 to Step SU34 and performed at Step SU38 are identical to the operations performed from Step SU11 to Step SU14 and performed at Step SU17, respectively, according to the eighth embodiment.

The video processing unit 36D determines whether or not the recognized-vehicle count is equal to or greater than a predetermined number (Step SU35). More specifically, the video processing unit 36D determines whether or not the recognized-vehicle count in the display video data 110 is equal to or greater than a predetermined number. In the 11-th embodiment, the threshold value of the recognized-vehicle count is set to eight, and it is determined whether or not the recognized-vehicle count in the display video data 110 is equal to or greater than eight. The threshold value of the recognized-vehicle count represents the boundary value for either changing or not changing the range for performing the information volume reduction operation with respect to the second-type ranges 110B.

The video processing unit 36D makes the range setting unit 35D change the information volume reduction range with respect to the second-type ranges 110B (Step SU36). More specifically, based on the range definition table 22, the video processing unit 36D makes the range setting unit 35D obtain the range for performing the information volume reduction operation with respect to the second-type ranges 110B corresponding to the recognized-vehicle count in the display video data 110. Then, the video processing unit 36D makes the range setting unit 35D set, with respect to the second-type ranges 110B of the display video data 110, the obtained range for performing the information volume reduction operation with respect to the second-type ranges 110B.

The video processing unit 36D performs the information volume reduction operation with respect to the second-type ranges 110B of the display video data 110 (Step SU37). More specifically, the video processing unit 36D reduces the volume of information in the range for performing the information volume reduction operation with respect to the second-type ranges 110B of the display video data 110. Then, the video processing unit 36D outputs the generated display video data 120D to the display control unit 40.

More particularly, the following explanation is given for a case in which the video processing unit 36D performs operations when the pattern example 1 in the range definition table 22 illustrated in FIG. 55 is used.

For example, the following explanation is given for a case in which the recognized-vehicle count in the display video data 110 is four. The video processing unit 36D refers to the range definition table 22 and obtains "no change" for the range for performing the information volume reduction operation with respect to the second-type ranges 110B corresponding to the recognized-vehicle count of "one or more but less than eight". Then, the video processing unit 36D performs the information volume reduction operation with respect to the entire second-type ranges 110B, and the display control unit 40 causes the rearview monitor 3 to display the display video data 120D as illustrated in FIG. 57. Even if the information volume reduction operation is performed with respect to the entire second-type ranges 110B, since there are only a small number of vehicles in the display video data 110, the driver can recognize the vehicles moving from the first-type range 120A to the second-type ranges 120B at the time of overtaking done by the vehicles recognized in the first-type range 120A, and can confirm the rearward portion in a proper manner. Meanwhile, in FIG. 57, although the boundaries between the first-type range 120A and the second-type ranges 120B are illustrated using dashed lines, the boundaries are not displayed in reality.

For example, the following explanation is given for a case in which the recognized-vehicle count in the display video data 110 is eight. The video processing unit 36D refers to the range definition table 22 and obtains "moderate narrowing degree" for the range for performing the information volume reduction operation with respect to the second-type ranges 110B corresponding to the recognized-vehicle count of "eight or more". Then, the video processing unit 36D performs the information volume reduction operation with respect to half of the range from the outer side of the second-type ranges 110B, and the display control unit 40 causes the rearview monitor 3 to display the display video data 120D as illustrated in FIG. 58. Since the second-type ranges 120B from which the volume of information is to be reduced are narrowed, the driver can recognize the vehicles moving from the first-type range 120A to the second-type ranges 120B at the time of overtaking done by the vehicles recognized in the first-type range 120A, and can confirm the rearward portion in a proper manner. Meanwhile, in FIG. 58, although the boundaries between the first-type range 120A and the second-type ranges 120B are illustrated using dashed lines, the boundaries are not displayed in reality.

As described above, according to the 11-th embodiment, according to the recognized-vehicle count of the display video data 110, the range over which the information volume reduction operation is to be performed with respect to the second-type ranges 110B of the display video data 110 is varied. In the 11-th embodiment, greater the recognized-vehicle count of the display video data 110, the greater is the narrowing degree of the range for performing the information volume reduction operation with respect to the second-type ranges 110B of the display video data 110. In this way, according to the 11-th embodiment, the narrowing degree is varied according to the recognized-vehicle count of the display video data 110, and the volume of information can be reduced over an appropriate range for the driver and then displayed. As a result, according to the 11-th embodiment, the driver can confirm the surroundings of the vehicle in an appropriate manner.

12-Th Embodiment

Figure 60:
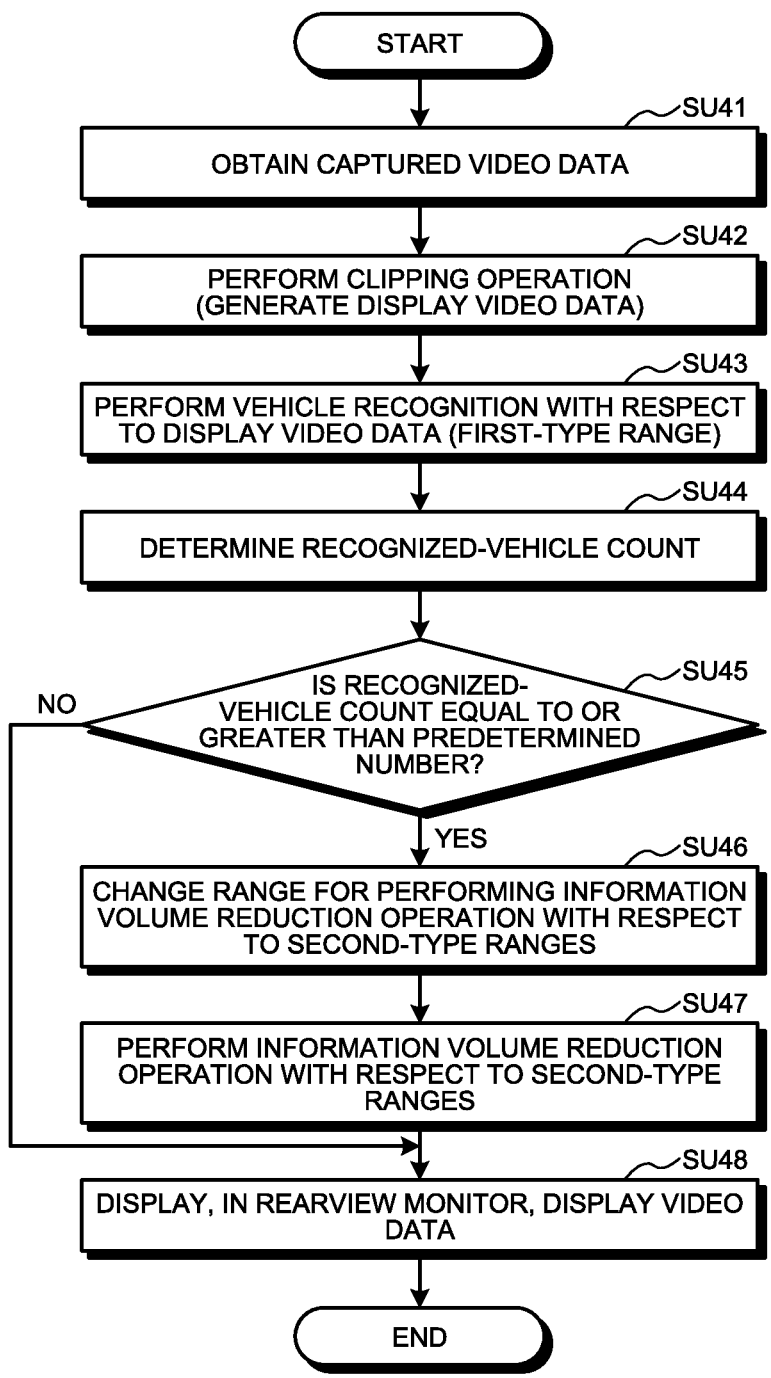
FIG. 60 is a flowchart for explaining a flow of operations performed in the in-vehicle display system according to the 12-th embodiment.
Figure 61:
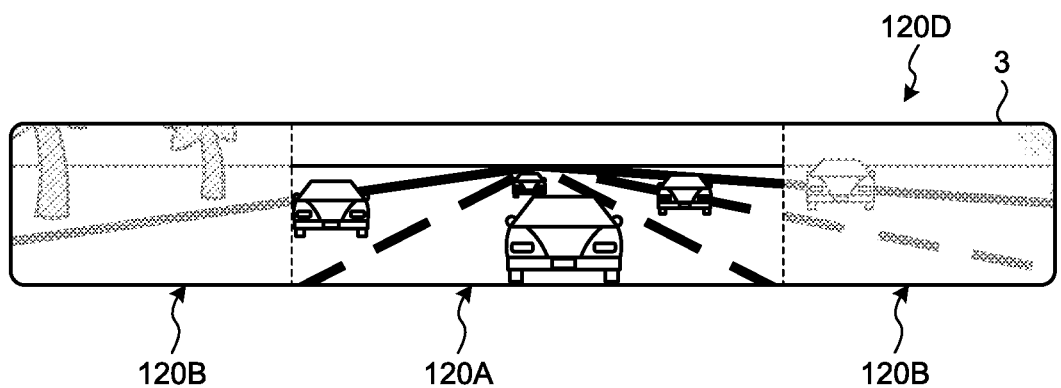
FIG. 61 is a diagram illustrating an example of the video displayed in the rearview monitor of the in-vehicle display system according to the 12-th embodiment.
Figure 62:
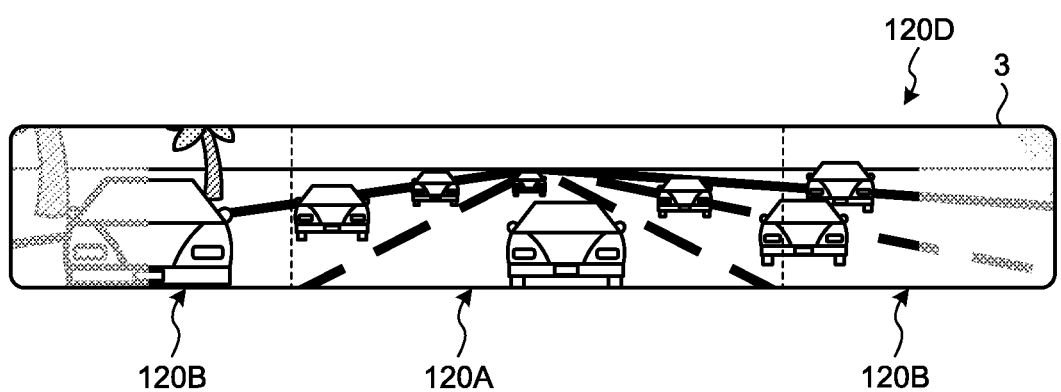
FIG. 62 is a diagram illustrating another example of the video displayed in the rearview monitor of the in-vehicle display system according to the 12-th embodiment.

Explained below with reference to FIGS. 59 to 62 is an in-vehicle display system according to the 12-th embodiment. FIG. 59 is a diagram illustrating an example of a range definition table in the in-vehicle display system according to the 12-th embodiment. FIG. 60 is a flowchart for explaining a flow of operations performed in the in-vehicle display system according to the 12-th embodiment. FIG. 61 is a diagram illustrating an example of the video displayed in the rearview monitor of the in-vehicle display system according to the 12-th embodiment. FIG. 62 is a diagram illustrating another example of the video displayed in the rearview monitor of the in-vehicle display system according to the 12-th embodiment.

As compared to the in-vehicle display system 1D according to the 11-th embodiment, the in-vehicle display system 1D according to the 12-th embodiment differs in the way that the determination about whether or not to perform the information volume reduction operation is performed according to the recognized-vehicle count of the first-type range 110A of the display video data 110, and the range for performing the information volume reduction operation with respect to the second-type ranges 110B is set.

Explained below with reference to FIG. 59 is an example of a range definition table 22A according to the 12-th embodiment. In the range definition table 22A, for each recognized-vehicle count in the first-type range 110A of the display video data 110, the range for performing the information volume reduction operation with respect to the second-type ranges 110B is defined. For example, in the range definition table 22A illustrated in FIG. 59, two patterns are defined. In a pattern example 1, when the recognized-vehicle count in the display video data 110 is either "zero" or "one or more but less than five", "no change" is defined for the range for performing the information volume reduction operation with respect to the second-type ranges 110B. When the recognized-vehicle count in the display video data 110 is "five or more", "moderate narrowing degree" is defined for the range for performing the information volume reduction operation. In a pattern example 2, when the vehicle-recognition count is "zero", "no change" is defined for the range for performing the information volume reduction operation. When the recognized-vehicle count is "one or more but less than five", "moderate narrowing degree" is defined for the range for performing the information volume reduction operation. When the recognized-vehicle count is "five or more", "large narrowing degree" is defined for the range for performing the information volume reduction operation. Meanwhile, the range definition table 22A is not limited to this example.

According to the recognized-vehicle count in the first-type range 110A of the display video data 110, the range setting unit 35D sets the range for performing the information volume reduction operation with respect to the second-type ranges 110B of the display video data 110.

Explained below with reference to FIG. 60 is a flow of operations performed by the video processing unit. Herein, the operations performed at Step SU41, Step SU42, and Steps SU46 to SU48 are identical to the operations performed at Step SU31, Step SU32, and Steps SU36 to SU38, respectively, according to the 11-th embodiment.

The recognition processing unit 361D of the video processing unit 36D performs vehicle recognition with respect to the first-type range 110A of the display video data 110 (Step SU43).

The recognition processing unit 361D of the video processing unit 36D determines the recognized-vehicle count in the first-type range 110A of the display video data 110 (Step SU44).

The video processing unit 36D determines whether or not the recognized-vehicle count in the first-type range 110A of the display video data 110 is equal to or greater than a predetermined number (Step SU45).

More particularly, the explanation is given for a case in which the video processing unit 36D performs operations when the pattern example 1 in the range definition table 22A illustrated in FIG. 59 is used.

For example, the explanation is given for a case in which the recognized-vehicle count in the first-type range 110A of the display video data 110 is four. The video processing unit 36D refers to the range definition table 22A and obtains "no change" as the information volume reduction range with respect to the second-type ranges 110B corresponding to the recognized-vehicle count of "one or more but less than five". Then, the video processing unit 36D performs the information volume reduction operation with respect to the entire second-type ranges 110B, and the display control unit 40 causes the rearview monitor 3 to display the display video data 120D as illustrated in FIG. 61. Even if the information volume reduction operation is performed with respect to the entire second-type ranges 110B, since there are only a small number of vehicles in the display video data 110, the driver can recognize the vehicles moving from the first-type range 120A to the second-type ranges 120B at the time of overtaking done by the vehicles recognized in the first-type range 120A, and can confirm the rearward portion in a proper manner. Meanwhile, in FIG. 61, although the boundaries between the first-type range 120A and the second-type ranges 120B are illustrated using dashed lines, the boundaries are not displayed in reality.

For example, the explanation is given for a case in which the recognized-vehicle count in the first-type range 110A of the display video data 110 is five. The video processing unit 36D refers to the range definition table 22A and obtains "moderate narrowing degree" as the range for performing the information volume reduction operation with respect to the second-type ranges 110B corresponding to the recognized-vehicle count of "five or more". Then, the video processing unit 36D performs the information volume reduction operation with respect to some part of the second-type ranges 110B, and the display control unit 40 causes the rearview monitor 3 to display the display video data 120D as illustrated in FIG. 62. Since the second-type ranges 120B from which the volume of information is reduced are narrowed, the driver can recognize the vehicles moving from the first-type range 120A to the second-type ranges 120B at the time of overtaking done by the vehicles recognized in the first-type range 120A, and can confirm the rearward portion in a proper manner. Meanwhile, in FIG. 62, although the boundaries between the first-type range 120A and the second-type ranges 120B are illustrated using dashed lines, the boundaries are not displayed in reality.

As described above, according to the 12-th embodiment, the range for performing the information volume reduction operation with respect to the second-type ranges 110B of the display video data 110 is varied according to the recognized-vehicle count in the first-type range 110A of the display video data 110. In the 12-th embodiment, greater the recognized-vehicle count in the first-type range 110A of the display video data 110, the greater is the increase in the narrowing degree of the range for performing the information volume reduction operation with respect to the second-type ranges 110B of the display video data 110. In this way, according to the 12-th embodiment, the narrowing degree is varied according to the recognized-vehicle count in the first-type range 110A of the display video data 110, and the volume of information can be reduced over an appropriate range for the driver and then displayed. As a result, according to the 12-th embodiment, the driver can confirm the surroundings of the vehicle in an appropriate manner.

For example, either the 11-th embodiment or the 12-th embodiment can be combined with either the eighth embodiment or the 10-th embodiment. For example, the explanation is given for a case of combining the 11-th embodiment and the eighth embodiment. In this case, at Step SU37 in the flowchart illustrated in FIG. 56, the operations at Steps SU15 and SU16 in the flowchart illustrated in FIG. 43 are performed. More specifically, based on the recognized-vehicle count determined by the recognition processing unit 361D, the video processing unit 36D refers to the operation definition table 21 and obtains the type of the information volume reduction operation to be performed with respect to the second-type ranges 110B corresponding to the recognized-vehicle count. Then, based on the obtained type of the information volume reduction operation to be performed with respect to the second-type range 110B corresponding to the recognized-vehicle count, the video processing unit 36D reduces the volume of information of the range over which the information volume reduction operation is to be performed with respect to the second-type range 110B of the display video data 110. Subsequently, the video processing unit 36D outputs the display video data 120D to the display control unit 40. In this way, according to the recognized-vehicle count in the display video data 110, the range for performing the information volume reduction operation with respect to the second-type ranges 110B of the display video data 110 is varied as well as the information volume reduction degree is varied, so that an appropriate volume of information for the driver can be displayed.

At the time of recognizing a vehicle, the number of vehicles running in the same direction as the concerned vehicle can also be determined. In this case, the recognition dictionary storing unit 4D is used to store patterns such as the front shapes of vehicles, the sizes of vehicles, and the colors of vehicles as a collatable dictionary. Then, the recognition processing unit 361D performs pattern matching with respect to the display video data 110 using the recognition dictionary stored in the recognition dictionary storing unit 4D and detects the existence of vehicles running in the same direction as the concerned vehicle. With that, since the vehicles in the opposite direction of the concerned vehicles are excluded, a more appropriate volume of information for the driver can be displayed according to the embodiments.

In the operation definition table 21, for example, the type of the information volume reduction operation to be performed with respect to the second-type ranges 110B can be defined for each recognized-vehicle count in the first-type range 110A of the display video data 110.

In the range definition table 22, for example, the type of the information volume reduction operation to be performed with respect to the second-type ranges 110B can be defined for each recognized-vehicle count in the second-type ranges 110B of the display video data 110. Herein, the recognized-vehicle count in the second-type ranges 110B represents the total of the recognized-vehicle count in the left-side second-type range 110B and the recognized-vehicle count in the right-side second-type range 110B.

Alternatively, in the range definition table 22, for example, for each recognized-vehicle count in either the left-side second-type range 110B or the right-side second-type range 110B of the display video data 110, the range for performing the information volume reduction operation with respect to the concerned second-type range 110B can be defined. In this case, regarding each of the left-side second-type range 110B and the right-side second-type range 110B of the display video data 110, the video processing unit 36D sets the range for performing the information volume reduction operation according to the corresponding recognized-vehicle count.

In the operation definition table 21, for example, the type of the information volume reduction operation to be performed with respect to the second-type ranges 110B can be defined for each recognized-vehicle count in each traffic lane. In this case, the recognition processing unit 361D of the video processing unit 36D performs image analysis with respect to the display video data 110 and detects the traffic lanes. Then, for each detected traffic lane, the video processing unit 36D performs pattern matching using the recognition dictionary stored in the recognition dictionary storing unit 4D, and detects the existence of vehicles. Then, based on the recognized-vehicle count in each traffic lane determined by the recognition processing unit 361D, the video processing unit 36D refers to the operation definition table 21 and obtains the type of the information volume reduction operation to be performed with respect to the second-type range 110B corresponding to the recognized-vehicle count in each traffic line. Then, based on the type of the information volume reduction operation to be performed with respect to the second-type range 110B corresponding to the recognized-vehicle count in each traffic line, the video processing unit 36D reduces the volume of information in the concerned second-type range 110B of the display video data 110. Subsequently, the video processing unit 36D outputs the generated display video data 120D to the display control unit 40. As a result, according to the recognized-vehicle count for each traffic lane in the display video data 110, the information volume reduction degree can be varied and an appropriate volume of information for the driver can be displayed.

In the range definition table 22, for example, the range for performing the information volume reduction with respect to the second-type ranges 110B can be defined for each recognized-vehicle count in each traffic lane. In this case, the recognition processing unit 361D of the video processing unit 36D performs image analysis with respect to the display video data 110, and detects the traffic lanes. Then, for each traffic lane, the video processing unit 36D performs pattern matching using the recognition dictionary stored in the recognition dictionary storing unit 4D and detects the existence of vehicles. Then, based on the recognized-vehicle count determined for each traffic lane by the recognition processing unit 361D, the video processing unit 36D refers to the range definition table 22 and obtains the range for performing the information volume reduction operation with respect to the second-type range 110B corresponding to the recognized-vehicle count in each traffic lane. Then, based on the range of the information volume reduction operation to be performed with respect to the second-type range 110B corresponding to the recognized-vehicle count in each traffic lane, the video processing unit 36D reduces the volume of information in the range for performing the information volume reduction operation with respect to the second-type ranges 110B of the display video data 110. Then, the video processing unit 36D outputs the generated display video data 120D to the display control unit 40. As a result, the range for performing the information volume reduction operation with respect to the second-type ranges 110B of the display video data 110 is varied according to the recognized-vehicle count of each traffic lane in the display video data 110, and an appropriate volume of information for the driver can be displayed.

In the operation definition table 21 and the range definition table 22, for example, the definitions can be made on a road-by-road basis. In the operation definition table 21 and the range definition table 22, for example, the definitions can be made for each traffic lane count. In the operation definition table 21 and the range definition table 22, for example, the definitions can be made for each road width. In the operation definition table 21 and the range definition table 22, for example, the definitions can be made for each road type such as express highway, national highway, and prefectural highway. In this case, the video processing unit 36D performs image analysis with respect to current location information of the concerned vehicle, as obtained using a GPS (Global Positioning System) receiver, and with respect to the captured video data 100; and determines the road on which the concerned vehicle is running. Then, the video processing unit 36D refers to the operation definition table 21 or the range definition table 22 corresponding to the road on which the concerned vehicle is running, and either obtains the type of the information volume reduction operation to be performed with respect to the second-type ranges 110B corresponding to the recognized-vehicle count or obtains the range for performing the information volume reduction operation with respect to the second-type ranges 110B.

The constituent elements of the in-vehicle display system 1 illustrated in the drawings are merely conceptual, and need not be physically configured as illustrated. That is, the specific configurations of the constituent elements are not limited to the illustrated configurations and the constituent elements, as a whole or in part, can be separated or integrated either functionally or physically based on various types of loads or use condition.

For example, the configuration of the in-vehicle display system 1 can be implemented using a program as software loaded in a memory. In the embodiments described above, the explanation is given about the functional blocks implemented using cooperation of hardware and software. That is, the functional blocks can be implemented in various forms using either only hardware, or only software, or a combination of hardware and software.

The constituent elements described above include constituent elements that may easily occur to one skilled in the art and include equivalent constituent elements. Moreover, the constituent elements described above can be appropriately combined. Furthermore, the present invention is to be construed as embodying various deletions, alternative constructions, and modifications that may occur to one skilled in the art that fairly fall within the basic teaching herein set forth.

According to the present invention, it becomes possible to display an appropriate volume of information for the driver.

What is claimed is:

1. An in-vehicle display control device comprising:
a display video data generating unit that obtains captured video data from a rear camera used in capturing a rearward portion of a vehicle, and generates display video data to be displayed in a display device meant for displaying a rearward video of the vehicle;
a range setting unit that sets a first-type range of a range of the display video data and a second-type range of the range of the display video data, the second-type range being placed on either side of the first-type range and positioned in each side portion of the display video data;
a video processing unit that, with respect to the video data in the second-type range set by the range setting unit, performs an information volume reduction for reducing a volume of information to be provided to a driver;
a display control unit that causes the display device to display the display video data containing the second-type range which has been subjected to the information volume reduction; and
a recognition processing unit that performs vehicle recognition with respect to the display video data and determines a number of recognized vehicles, wherein
according to the number of recognized vehicles as determined by the recognition processing unit, the video processing unit performs the information volume reduction with respect to the video data in the second-type range set by the range setting unit, the information volume reduction being for reducing the volume of information to be provided to the driver.

2. The in-vehicle display control device according to claim 1, further comprising an information obtaining unit that obtains vehicle speed information of the vehicle, wherein
when the vehicle speed information obtained by the information obtaining unit indicates that a speed of the vehicle is equal to or higher than a predetermined speed, the video processing unit performs the information volume reduction with respect to the video data in the second-type range.

3. The in-vehicle display control device according to claim 2, wherein, based on the vehicle speed information obtained by the information obtaining unit being lower than the predetermined speed, the first-type range set by the range setting unit comprises a wider range as compared to another range of an optical rearview mirror.

4. The in-vehicle display control device according to claim 2, wherein, based on the vehicle speed information obtained by the information obtaining unit being higher than the predetermined speed, the video processing unit performs the information volume reduction in which a degree of reduction of the volume of information of the video data in the second-type range is higher than the degree of reduction in the first-type range.

5. The in-vehicle display control device according to claim 1, wherein the video processing unit performs the information volume reduction in which, based on a determination by the recognition processing unit that the number of recognized vehicles is less than a predefined number, a degree of reduction of the volume of information of the video data in the second-type range is higher than the degree of reduction in the first-type range.

6. The in-vehicle display control device according to claim 1, wherein
the recognition processing unit performs the vehicle recognition with respect to the second-type range in the display video data, and
the video processing unit performs the information volume reduction in which, based on a determination by the recognition processing unit that the number of recognized vehicles in the second-type range is less than a predefined number, a degree of reduction of the volume of information of the video data in the second-type range is higher than the degree of reduction in the first-type range.

7. The in-vehicle display control device according to claim 1, wherein, based on a determination by the recognition processing unit that the number of recognized vehicles is more than a predefined number, a range set by the video processing unit for performing the information volume reduction with respect to the video data in a second-type image is narrower than the range for a first-type image.

8. The in-vehicle display control device according to claim 1, wherein
the recognition processing unit performs the vehicle recognition with respect to the first-type range in the display video data, and
based on a determination by the recognition processing unit that the number of recognized vehicles in the first-type range is greater than a predefined number, a range set by the video processing unit for performing the information volume reduction with respect to the video data in the second-type range is narrower than the range for the first-type range.

9. The in-vehicle display control device according to claim 1, wherein the recognition processing unit determines a number of the recognized vehicles present in the display video data that are running in a same direction as the vehicle.

10. The in-vehicle display control device according to claim 1, wherein the video processing unit performs the information volume reduction with respect to the video data in the second-type range set by the range setting unit, in such a way that the volume of information to be provided to the driver decreases in proportion to an increase in distance from the first-type range.

11. The in-vehicle display control device according to claim 10, further comprising an information obtaining unit that obtains vehicle speed information of the vehicle, wherein
when the vehicle speed information obtained by the information obtaining unit indicates that a speed of the vehicle is equal to or higher than a predetermined speed, the video processing unit performs the information volume reduction with respect to the video data in the second-type range.

12. The in-vehicle display control device according to claim 11, wherein, based on the vehicle speed information obtained by the information obtaining unit, the video processing unit performs the information volume reduction in such a way that, based on the speed of the vehicle being equal to or higher than the predetermined speed, a degree of reduction in the volume of information is greater in proportion to an increase in distance from the first-type range.

13. The in-vehicle display control device according to claim 1, further comprising a feature point extracting unit that extracts a feature point from the video data, wherein
the video processing unit performs an operation of overlapping the feature point on the video data of the second-type range that has been subjected to the information volume reduction.

14. The in-vehicle display control device according to claim 1, further comprising an object recognizing unit that performs object recognition with respect to the video data, wherein
the object recognizing unit recognizes another vehicle from the video data of the second-type range, resulting in a recognized vehicle, and
the video processing unit performs an operation of overlapping the display of the recognized vehicle on the video data of the second-type range that has been subjected to the information volume reduction.

15. An in-vehicle display system comprising:
the in-vehicle display control device according to claim 1; and
at least either the rear camera or the display device having a display width in which at least either the first-type range or the second-type range is displayable.

16. An in-vehicle display control method comprising:
a display video data generation step that includes obtaining captured video data from a rear camera used in capturing a rearward portion of a vehicle, and generating display video data to be displayed in a display device that displays a rearward video of the vehicle;
a video processing step that includes performing an information volume reduction with respect to video data in a second-type range which is placed on either side of a first-type range of the display video data and which is positioned in each side portion of the display video data, the information volume reduction reduces a volume of information to be provided to a driver;
a display control step that causes the display device to display the display video data containing the second-type range which has been subjected to the information volume reduction; and
a recognition processing step that performs vehicle recognition with respect to the display video data and determines a number of recognized vehicles, wherein
according to the number of recognized vehicles as determined by the recognition processing step, the video processing step performs the information volume reduction with respect to the video data in the second-type range, the information volume reduction reduces the volume of information provided to the driver.

17. A non-transitory computer readable recording medium storing therein a program that causes a computer operating as an in-vehicle display control device, to execute:
a display video data generation step that includes obtaining captured video data from a rear camera that captures a rearward portion of a vehicle, and generating display video data to be displayed in a display device that displays a rearward video of the vehicle;
a video processing step that includes performing an information volume reduction with respect to video data in a second-type range which is placed on either side of a first-type range of the display video data and which is positioned in each side portion of the display video data, the information volume reduction reduces a volume of information to be provided to a driver;

a display control step that causes the display device to display the display video data containing the second-type range which has been subjected to the information volume reduction; and a recognition processing step that performs vehicle recognition with respect to the display video data and determines a number of recognized vehicles, wherein according to the number of recognized vehicles as determined by the recognition processing step, the video processing step performs the information volume reduction with respect to the video data in the second-type range, the information volume reduction reduces the volume of information to be provided to the driver.

\* \* \* \* \*